US010224589B2

(12) United States Patent
Corum et al.

(10) Patent No.: US 10,224,589 B2

(45) Date of Patent: Mar. 5, 2019

(54) EXCITATION AND USE OF GUIDED SURFACE WAVE MODES ON LOSSY MEDIA

(71) Applicant: CPG Technologies, LLC, Italy, TX (US)

(72) Inventors: James F. Corum, Morgantown, WV (US); Kenneth L. Corum, Plymouth, NH (US)

(73) Assignee: CPG Technologies, LLC, Italy, TX (US)

( * ) Notice: Subject to any disclaimer, the term of this patent is extended or adjusted under 35 U.S.C. 154(b) by 0 days.

(21) Appl. No.: 15/915,507

(22) Filed: Mar. 8, 2018

(65) Prior Publication Data

US 2018/0198183 A1 Jul. 12, 2018

Related U.S. Application Data

(63) Continuation of application No. 14/483,089, filed on Sep. 10, 2014, now Pat. No. 9,941,566.

(51) Int. Cl.

| | |
|---|---|
| ***H01P 3/00*** | (2006.01) |
| ***H04B 3/52*** | (2006.01) |
| ***H01Q 1/04*** | (2006.01) |
| ***H01Q 1/36*** | (2006.01) |
| ***H01Q 9/32*** | (2006.01) |
| ***H01Q 13/20*** | (2006.01) |

(52) U.S. Cl.

CPC ................. *H01P 3/00* (2013.01); *H01Q 1/04* (2013.01); *H01Q 1/36* (2013.01); *H01Q 9/32* (2013.01); *H01Q 13/20* (2013.01)

(58) Field of Classification Search

CPC .......... H04B 3/52; H04B 5/0037; H04B 7/00; H02J 17/00; H02J 50/20; H01P 3/00; H01P 5/00; H01Q 9/30; H01Q 1/04

See application file for complete search history.

(56) References Cited

U.S. PATENT DOCUMENTS

| | | | |
|---|---|---|---|
| 645,576 | A | 3/1900 | Tesla |
| 649,621 | A | 5/1900 | Tesla |
| 685,012 | A | 10/1901 | Tesla |
| 685,953 | A | 11/1901 | Tesla |
| 685,954 | A | 11/1901 | Tesla |
| 685,955 | A | 11/1901 | Tesla |
| 685,956 | A | 11/1901 | Tesla |

(Continued)

FOREIGN PATENT DOCUMENTS

| | | |
|---|---|---|
| CA | 142352 | 8/1912 |
| CO | 15220552 | 2/2016 |

(Continued)

OTHER PUBLICATIONS

Miyakoshi, Junji, Cellular and Molecular Responses to Radio-Frequency Electromagnetic Fields, Proceedings of the IEEE, Jun. 2013, pp. 1494-1502, vol. 101, No. 6.

(Continued)

*Primary Examiner* — Dean Takaoka

*Assistant Examiner* — Alan Wong

(74) *Attorney, Agent, or Firm* — Thomas Horstemeyer, LLP

(57) ABSTRACT

Disclosed are various embodiments for transmitting energy conveyed in the form of a guided surface-waveguide mode along the surface of a lossy medium such as, e.g., a terrestrial medium by exciting a guided surface waveguide probe.

20 Claims, 23 Drawing Sheets

(56) References Cited

U.S. PATENT DOCUMENTS

| | | | |
|---|---|---|---|
| 723,188 | A | 3/1903 | Tesla |
| 725,605 | A | 4/1903 | Tesla |
| 787,412 | A | 4/1905 | Tesla |
| 851,336 | A | 4/1907 | Von Arco |
| 1,119,732 | A | 12/1914 | Tesla |
| 1,452,849 | A | 4/1923 | Round |
| 1,652,516 | A | 12/1927 | Conrad |
| 1,691,338 | A | 11/1928 | Conrad |
| 1,947,256 | A | 2/1934 | Friis |
| 2,685,068 | A | 7/1954 | Goubau |
| 2,921,277 | A | 1/1960 | Goubau |
| 3,123,767 | A | 3/1964 | Ghose |
| 3,219,954 | A | 11/1965 | Rutelli |
| 3,445,844 | A | 5/1969 | Grossi et al. |
| 3,582,838 | A | 6/1971 | DeVries |
| 3,670,247 | A | 6/1972 | Gutton et al. |
| 3,742,509 | A | 6/1973 | De Bettencourt et al. |
| 3,742,511 | A | 6/1973 | Smith et al. |
| 4,751,515 | A | 6/1988 | Corum |
| 4,808,950 | A | 2/1989 | Apostolos et al. |
| 5,045,825 | A | 9/1991 | McJunkin |
| 5,074,489 | A | 12/1991 | Gamzon |
| 5,155,495 | A | 10/1992 | Hately et al. |
| 5,293,308 | A | 3/1994 | Boys et al. |
| 5,301,096 | A | 3/1994 | Klontz et al. |
| 5,714,917 | A | 2/1998 | Ella |
| 5,835,067 | A | 11/1998 | Goodman |
| 5,920,261 | A | 7/1999 | Hughes |
| 6,025,813 | A | 2/2000 | Hately et al. |
| 6,075,498 | A | 6/2000 | Talwar |
| 6,104,107 | A | 8/2000 | Avramenko et al. |
| 6,107,791 | A | 8/2000 | Lee |
| 6,486,846 | B1 | 11/2002 | Hart |
| 6,515,878 | B1 | 2/2003 | Meins et al. |
| 6,650,556 | B2 | 11/2003 | Dinh |
| 6,864,849 | B2 | 3/2005 | Hart |
| 6,956,535 | B2 | 10/2005 | Hart |
| 7,113,138 | B2 | 9/2006 | Hately |
| 7,307,589 | B1 | 12/2007 | Gregoire |
| 7,561,096 | B2 | 7/2009 | Hellsten |
| 7,741,734 | B2 | 6/2010 | Joannopoulos et al. |
| 7,775,112 | B2 | 8/2010 | Amemiya |
| 7,782,264 | B1 | 8/2010 | Vincent |
| 7,825,543 | B2 | 11/2010 | Karalis et al. |
| 7,890,053 | B2 | 2/2011 | Washiro |
| 7,894,770 | B2 | 2/2011 | Washiro |
| 8,063,717 | B2 | 11/2011 | Bradley et al. |
| 8,076,801 | B2 | 12/2011 | Karalis et al. |
| 8,084,889 | B2 | 12/2011 | Joannopoulos et al. |
| 8,097,983 | B2 | 1/2012 | Karalis et al. |
| 8,299,936 | B2 | 10/2012 | Papadopoulos |
| 8,338,991 | B2 | 12/2012 | Von Novak et al. |
| 8,350,769 | B1 | 1/2013 | Crawley |
| 8,378,524 | B2 | 2/2013 | Mita |
| 8,384,247 | B2 | 2/2013 | Yerazunis et al. |
| 8,395,282 | B2 | 3/2013 | Joannopoulos et al. |
| 8,536,738 | B2 | 9/2013 | Bella |
| 8,587,490 | B2 | 11/2013 | Niver et al. |
| 8,890,472 | B2 | 11/2014 | Mashinsky |
| 8,897,697 | B1 | 11/2014 | Bennett et al. |
| 8,941,448 | B2 | 1/2015 | Yu et al. |
| 9,030,363 | B2 | 5/2015 | Kenington et al. |
| 9,042,812 | B1 | 5/2015 | Bennett et al. |
| 9,154,966 | B2 | 10/2015 | Bennett et al. |
| 9,156,364 | B2 | 10/2015 | Miller et al. |
| 9,178,504 | B2 | 11/2015 | Komori |
| 9,941,566 | B2 | 4/2018 | Corum et al. |
| 2004/0227667 | A1 | 11/2004 | Sievenpiper |
| 2004/0263409 | A1 | 12/2004 | Hart |
| 2005/0111533 | A1 | 5/2005 | Berkman |
| 2005/0128154 | A1 | 6/2005 | Hately |
| 2006/0281423 | A1 | 12/2006 | Caimi |
| 2007/0035356 | A1 | 2/2007 | Ranta |
| 2007/0132489 | A1 | 6/2007 | Corum |
| 2008/0122449 | A1 | 5/2008 | Besser et al. |
| 2008/0273201 | A1 | 11/2008 | Brooks et al. |
| 2010/0194206 | A1 | 8/2010 | Burdo |
| 2010/0259111 | A1 | 10/2010 | Ruocco et al. |
| 2010/0260076 | A1 | 10/2010 | Corman |
| 2010/0264748 | A1 | 10/2010 | Tucker |
| 2011/0049997 | A1 | 3/2011 | Urano |
| 2011/0062916 | A1 | 3/2011 | Farahani |
| 2011/0080050 | A1 | 4/2011 | Thundat et al. |
| 2011/0133564 | A1 | 6/2011 | Ted |
| 2011/0133565 | A1 | 6/2011 | Teo et al. |
| 2011/0156494 | A1 | 6/2011 | Mashinsky |
| 2011/0169336 | A1 | 7/2011 | Yerazunis |
| 2012/0119575 | A1 | 5/2012 | Kurs |
| 2012/0169568 | A1 | 7/2012 | Oh et al. |
| 2012/0248889 | A1 | 10/2012 | Fukushi |
| 2012/0249449 | A1 | 10/2012 | Tseng |
| 2013/0029595 | A1 | 1/2013 | Widmer et al. |
| 2013/0049674 | A1 | 2/2013 | Davis |
| 2013/0064311 | A1 | 3/2013 | Turner et al. |
| 2013/0099584 | A1 | 4/2013 | Von Novak |
| 2014/0015344 | A1 | 1/2014 | Mohamadi |
| 2014/0062813 | A1 | 3/2014 | Alrabadi |
| 2014/0104132 | A1 | 4/2014 | Bakalski et al. |
| 2014/0252865 | A1 | 9/2014 | Corum et al. |
| 2014/0252886 | A1 | 9/2014 | Corum et al. |
| 2014/0308901 | A1 | 10/2014 | Turner et al. |
| 2014/0319922 | A1 | 10/2014 | Shinohara |
| 2015/0109181 | A1 | 4/2015 | Hyde |
| 2015/0145339 | A1 | 5/2015 | Chiyo et al. |
| 2015/0207334 | A1 | 7/2015 | Mitcheson et al. |
| 2015/0207335 | A1 | 7/2015 | Madawala |
| 2015/0280444 | A1 | 10/2015 | Smith et al. |
| 2017/0005529 | A1 | 1/2017 | Bulling Paul |
| 2017/0018852 | A1 | 1/2017 | Adriazola et al. |

FOREIGN PATENT DOCUMENTS

| | | |
|---|---|---|
| EP | 0639301 | 2/1995 |
| EP | 1898532 | 3/2008 |
| EP | 1965223 | 9/2008 |
| EP | 2221743 | 8/2010 |
| EP | 2568528 | 3/2013 |
| GB | 20981 | 11/1896 |
| GB | 24421 | 3/1898 |
| GB | 11293 | 11/1901 |
| GB | 13563 | 11/1901 |
| GB | 14579 | 4/1902 |
| GB | 8200 | 4/1906 |
| GB | 1471860 | 4/1977 |
| GB | 20981 | 11/1986 |
| GB | 2215524 | 9/1989 |
| GB | 2330695 | 6/2002 |
| GB | 2330695 B | 6/2002 |
| GB | 2387969 B | 11/2005 |
| JP | S50-103642 A | 8/1975 |
| JP | S58-066428 A | 4/1983 |
| JP | H06225481 | 8/1994 |
| JP | 2007244015 | 9/2007 |
| RU | 2143775 | 12/1999 |
| RU | 2161850 | 1/2001 |
| RU | 2183376 | 6/2002 |
| RU | 2255406 | 6/2005 |
| RU | 2273939 | 4/2006 |
| RU | 2310964 | 11/2007 |
| RU | 2340064 | 11/2008 |
| RU | 2341860 | 12/2008 |
| RU | 2342761 | 12/2008 |
| RU | 2366057 | 8/2009 |
| RU | 2366058 | 8/2009 |
| RU | 2409883 | 1/2011 |
| RU | 2423772 | 7/2011 |
| RU | 2459340 | 8/2012 |
| RU | 2473160 | 1/2013 |
| RU | 2474031 | 1/2013 |
| RU | 2488207 | 7/2013 |
| RU | 2488208 | 7/2013 |
| RU | 2533060 | 11/2014 |
| RU | 2544380 | 3/2015 |
| RU | 2548571 | 4/2015 |

(56) References Cited

FOREIGN PATENT DOCUMENTS

| | | | |
|---|---|---|---|
| RU | 2554723 | | 6/2015 |
| WO | 9313495 | | 7/1993 |
| WO | WO9323907 | | 11/1993 |
| WO | 9529516 | A1 | 11/1995 |
| WO | 0191238 | | 11/2001 |
| WO | 0191238 | A1 | 11/2001 |
| WO | 2007146164 | | 12/2007 |
| WO | 2010020813 | | 2/2010 |
| WO | 2010111541 | | 9/2010 |
| WO | 2010129369 | | 11/2010 |
| WO | 2011097046 | | 8/2011 |
| WO | 2013093922 | | 6/2013 |

OTHER PUBLICATIONS

Kim, Jiseong et al., Coil Design and Shielding Methods for a Magnetic Resonant Wireless Power Transfer System, Proceedings of the IEEE, Jun. 2013, pp. 1332-1342, vol. 101, No. 6.
Shoki, Hiroki, Issues and Initiatives for Practical Deployment of Wireless Power Transfer Technologies in Japan, Proceedings of the IEEE, Jun. 2013, pp. 1312-1320, vol. 101, No. 6.
Covic, Grant A. et al., Inductive Power Transfer, Proceedings of the IEEE, Jun. 2013, pp. 1276-1289, vol. 101, No. 6.
Strassner, Bernd et al., Microwave Power Transmission: Historical Milestones and System Components, Proceedings of the IEEE, Jun. 2013, pp. 1379-1396, vol. 101, No. 6.
Christ, Andreas et al., Assessing Human Exposure to Electromagnetic Fields from Wireless Power Transmission Systems, Proceedings of the IEEE, Jun. 2013, pp. 1482-1493, vol. 101, No. 6.
Jaffe, Paul et al., Energy Conversion and Transmission Modules for Space Solar Power, Proceedings of the IEEE, Jun. 2013, pp. 1424-1437, vol. 101, No. 6.
Tesla, Nikola, The Transmission of Electrical Energy Without Wires, Electrical World & Engineer, Mar. 5, 1904, pp. 429-431.
Hui, S. Y., Planar Wireless Charging Technology for Portable Electronic Products and Qi, Proceedings of the IEEE, Jun. 2013, pp. 1290-1301, vol. 101, No. 6.
Sasaki, Susumu et al., Microwave Power Transmission Technologies for Solar Power Satellites, Proceedings of the IEEE, Jun. 2013, pp. 1438-1447, vol. 101, No. 6.
Wang, Bingnan et al., Wireless Power Transfer: Metamaterials and Array of Coupled Resonators, Proceedings of the IEEE, Jun. 2013, pp. 1359-1368, vol. 101, No. 6.
Sample, Alanson P. et al., Enabling Seamless Wireless Power Delivery in Dynamic Environments, Proceedings of the IEEE, Jun. 2013, pp. 1343-1358, vol. 101, No. 6.
Visser, Hubregt J. et al., RF Energy Harvesting and Transport for Wireless Sensor Network Applications: Principles and Requirements, Proceedings of the IEEE, Jun. 2013, pp. 1410-1423, vol. 101, No. 6.
Popovic, Zoya et al., Low-Power Far-Field Wireless Powering for Wireless Sensors, Proceedings of the IEEE, Jun. 2013, pp. 1397-1409, vol. 101, No. 6.
Mayordomo, Iker et al., An Overview of Technical Challenges and Advances of Inductive Wireless Power Transmission, Proceedings of the IEEE, Jun. 2013, pp. 1302-1311, vol. 101, No. 6.
Garnica, Jaime et al., Wireless Power Transmission: From Far Field to Near Field, Proceedings of the IEEE, Jun. 2013, pp. 1321-1331, vol. 101, No. 6.
Ho, John S. et al., Midfield Wireless Powering for Implantable Systems, Proceedings of the IEEE, Jun. 2013, pp. 1369-1378, vol. 101, No. 6.
O'Neill, John J., Prodigal Genius: The Life of Nikola Tesla, 2008, pp. 121-217, Adventures Unlimited Press, Kempton, Illinois.
Cheney, Margaret, Tesla: Man Out of Time, 1981, pp. 171-191, Touchstone, New York, NY.
Burrows, C. R., The Surface Wave in Radio Transmission, Bell Laboratories Record, Jun. 1937, pp. 321-324, vol. 15.
Valone, Thomas, Harnessing the Wheelwork of Nature, Tesla's Science of Energy, 2002, pp. 147-269, Adventures Unlimited Press, Kempton, Illinois.
Tesla, Nikola, My Inventions, The Autobiography of Nikola Tesla, 2013, pp. 61-72, Lexington, KY.
Tesla, Nikola, From Colorado Springs to Long Island, Research Notes: Colorado Springs 1899-1900 New York 1900-1901, 2008, Nikola Tesla Museum.
McMichael, I., A Note on the Brewster Angle in Lossy Dielectric Media, Night Vision and Electronic Sensors Directorate, Oct. 2010, pp. 1-11, US Army RDECOM CERDEC NVESD, Fort Belvior, Virginia.
Karalis, A., et al., Efficient Wireless Non-radiative Mid-range Energy Transfer, Annals of Physics, 2008, pp. 34-48, No. 323, Elsevier, Inc. (also made available online on Apr. 27, 2007).
Wadsworth, D., Approximate Integration Methods Applied to Wave Propagation (Thesis), Department of Geology and Geophysics, Massachusetts Institute of Technology, Thesis Submitted in Feb. 1958, pp. 1-128, Massachusetts Institute of Technology, Cambridge, Massachusetts, United States.
Pover, B., Report on the Performance of the Silsden 8 Metre Crossed Field Antenna, Published on the Internet at ok1mjo.com/all/ostatni/t-dab_dvb-t.../CFA_antena_silsden-report.pdf, Oct. 2009, pp. 1-28.
Corum, J. et al., The Application of Transmission Line Resonators to High Voltage RF Power Processing: History, Analysis and Experiment, IEEE 19th Southeastern Symposium on System Theory, Mar. 1987, pp. 45-50, Held at Clemson University, Clemson, South Carolina, United States.
Search Report and Written Opinion, PCT/US2014/019477, International Publication No. WO 2014/137817, entitled Excitation and Use of Guided Surface Waves on Lossy Media, International Publication Date: Sep. 12, 2014, International Filing Date: Feb. 28, 2014.
Wait, J. R., Excitation of Surface Waves on Conducting, Stratified, Dielectric-clad and Corrugated Surfaces, Research of the National Bureau of Standards, Dec. 1957, pp. 365-377, vol. 59, No. 6.
Marincic, A. S., Nikola Tesla and the Wireless Transmission of Energy, IEEE Transactions on Power Apparatus and Systems, Oct. 1982, pp. 58-59, vol. PAS-101, No. 10, IEEE, University of Belgrade, Belgrade, Yugoslavia.
Valentinuzzi, M.E., Nikola Tesla: Why Was He So Much Resisted and Forgotten?, IEEE Engineering in Medicine and Biology Magazine, Jul./Aug. 1998, pp. 74-75, vol. 17, No. 4, IEEE, Inst. de Bioingenieria, Univ. Nacional de Tucuman, Mexico.
Leyh, G.E. et al., Efficient Wireless Transmission of Power Using Resonators with Coupled Electric Fields, Power Symposium, 2008. NAPS '08. 40th North American, pp. 1-4, IEEE, Nevada Lightning Lab., NV, USA.
Marincic, A. et al., Tesla's Contribution to Radiowave Propagation, Telecommunications in Modern Satellite, Cable and Broadcasting Service, Sep. 2001, pp. 327-331, vol. 1, IEEE, Belgrade, Serbia.
Garnica, J. et al., Wireless Power Transmission: From Far Field to Near Field, Proceedings of the IEEE, Apr. 4, 2013, pp. 1321-1331, vol. 101, No. 6, IEEE, Gainesville, FL, USA.
Poljak, D. et al., Full Wave Model versus Transmission Line Representation of Tesla's Wave Propagation: 155th Anniversary of Birth of Nikola Tesla, 2011 19th International Conference on Software, Telecommunications and Computer Networks (SoftCOM), Sep. 15-17, 2011, pp. 1-5, IEEE, Split, Croatia.
Li, Joshua Le-Wei et al., Keynote Speakers: Wireless Power Transfer: From Long-Distance Transmission to Short-Range Charging, 2013 IEEE International RF and Microwave Conference (RFM), Dec. 9-11, 2013, IEEE, Penang, Malaysia.
Keller, J. B. et al., Surface Waves Excitation and Propagation, Journal of Applied Physics, Jun. 1960, pp. 1039-1046, vol. 31, No. 6., AIP Publishing.
Chu, L. J., Physical Limitations on Omni-Directional Antennas, Journal of Applied Physics, Dec. 1948, pp. 1163-1175, vol. 19, AIP Publishing.
Wise, W. H., Note on Dipole Radiation Theory, Journal of Applied Physics, Oct. 1933, pp. 354-358, vol. 4, AIP Publishing.

(56) References Cited

OTHER PUBLICATIONS

Van Der Pol, B., Theory of the Reflection of the Light from a Point Source by a Finitely Conducting Flat Mirror, with an Application to Radiotelegraphy, Physica, Aug. 1935, pp. 843-853, vol. 2.
Friedman, B., Excitation of Surface Waves, The Institution of Electrical Engineers, Jan. 1958, pp. 252-258, Monograph No. 277 R.
Kabbary, F. M., Extremely Small High Power MW Broadcasting Antennas, IEE International Broadcasting Convention, Sep. 12-16, 1997, Conference Publication No. 447, Amsterdam.
Jordan, E. C. et al., Electromagnetic Waves and Radiating Systems, Second Edition, 1968, pp. 558-560, 730-734, Prentice-Hall, Inc., Englewood Cliffs, New Jersey.
Smythe, W. R., Static and Dynamic Electricity, 1950, pp. 542-547, McGraw-Hill Book Company, Inc., New York.
Hendry et al., Surface Waves for Communication Systems, 3rd SEAS DTC Technical Conference, 2008, A18, Edinburgh, Scotland.
Watson, W.H., The Physical Principles of Wave Guide Transmission and Antenna Systems, 1947, p. 25, Oxford at the Clarendon Press.
Pover et al., The Silsden Crossed Field Antenna, Extracts from the report on the performance of an elevated 8 Metre CFA constructed and tested at Silsden in West Yorkshire on Sep. 23-26, 2009.
Holland, Ralph, Egyptian Daytime Wave Pockets—Speculative Causes, antenneX Online, Apr. 2002, pp. 1-38, Issue No. 60.
Forum et al., Multiple Resonances in RF Coils and the Failure of Lumped Inductance Models, Sixth International Symposium Nikola Tesla, Oct. 18-20, 2006, Belgrade, SASA, Serbia.
Burrows, Charles R., The History of Radio Wave Propagation Up to the End of World War I, Proceedings of the IRE, May 1962, pp. 682-684, vol. 50, Issue 5.
Wolff, Edward A., Antenna Analysis, 1966, p. 33, John Wiley & Sons, Inc.
Vogler, L.E., A Note on the Attenuation Function for Propagation Over a Flat Layered Ground, IEEE Transactions on Antennas and Propagation, Mar. 1964, pp. 240-242, vol. AP-12, No. 2.
Banos, A., Dipole Radiation in the Presence of a Conducting Half-Space, 1966, pp. 148-158, Pergamon Press.
Barlow et al., Radio Surface Waves, 1962, pp. 1-5, 10-12, 29-33, Oxford University Press.
Brainerd et al., Ultra High Frequency Techniques, 1942, pp. 477-480, D. Van Nostrand Company, Inc., New York.
Bronwell et al., Theory and Application of Microwaves, 1947, pp. 384-387, 390, McGraw-Hill.
Clemmow, P.C., The Plane Wave Spectrum Representation of Electromagnetic Fields, 1966, pp. 30-31, Pergamon Press.
Collin, R.E., Field Theory of Guided Waves, 1960, pp. 453-454, McGraw-Hill.
Collin et al., Electromagnetic Fields, Antenna Theory—Part 1, 1969, p. 18, vol. 7, McGraw-Hill.
Collin, R.E., Antennas and Radiowave Propagation, 1985, pp. 377-385, McGraw-Hill.
Everitt et al., Communication Engineering, 3rd edition, 1956, p. 407, McGraw-Hill.
Felsen et al., Radiation and Scattering of Waves, 1973, pp. 506-513, 554-559, Prentice-Hall.
Friedman, B., Principles and Techniques of Applied Mathematics, 1956, pp. 213-214, 283-286, 290, 298-300, Wiley.
Hansen, R.C., Electrically Small, Superdirective, and Superconducting Antennas, 2006, pp. 62-64, Wiley Interscience.
Hansen et al., Small Antenna Handbook, 2011, pp. 147-150, Wiley, New Jersey.
Harrington, R.F., Time-Harmonic Electromagnetic Fields, 1961, pp. 460-463, McGraw-Hill.
Ishimaru, A., Jersey Electromagnetic Wave Propagation, Radiation and Scattering, 1991, pp. 456-461, Prentice-Hall, New Jersey.
Wise, W.H., The Grounded Condenser Antenna Radiation Formula, Proc. IRE, Sep. 1931, pp. 1684-1689, vol. 19, No. 9.
Kraus, J.D., Antennas, 1950, pp. 33-34, 452-453, 461-463, McGraw-Hill.
Wise, W.H., Asymptotic Dipole Radiation Formulas, Bell System Technical Journal, Oct. 1929, pp. 662-671, vol. 8.
Ramo et al., Fields and Waves in Communication Electronics, 3rd Edition, 1994, pp. 435-437, Wiley.
Ryder, J.D., Networks, Lines and Fields, 1949, pp. 422-425, Prentice Hall, New York.
Reich et al., Microwave Theory and Techniques, 1953, pp. 291-293, Van Nostrand.
Sarbacher et al., Hyper and Ultrahigh Frequency Engineering, 1943, pp. 201-202, Wiley & Sons, Inc.
Schelkunoff, S.A., Electromagnetic Waves, 1943, pp. 49, 428-437, Van Nostrand Company, New York.
Tesla, N., The Problem of Increasing Human Energy with Special References to the Harnessing of the Sun's Energy, The Century Illustrated Monthly Magazine, Jun. 1900, pp. 1-35
Van Der Pol, B., On Discontinuous Electromagnetic Waves and the Occurrence of a Surface Wave, IEEE Transactions on Antennas and Propagation, Jul. 1956, pp. 288-293, vol. AP-4.
Eckert, Robert P., Modern Methods for Calculating Ground-Wave Field Strength Over a Smooth Spherical Earth, Report to the Federal Communications Division, Feb. 1986.
Wait et al., Radiation from a Vertical Dipole over a Stratified Ground (Part II), IRE Transactions on Antennas and Propagation, Oct. 1954, pp. 144-146, vol. AP-3, No. 4.
Tesla, N., From Colorado Springs to Long Island, Nikola Tesla Museum, 2008, pp. 485, 487, Nikola Tesla Museum.
Cross et al., An Advanced VHF/UHF Short Range, Groundwave Propagation Model for Paths with Near-Earth Antennas, MegaWave Corporation, Nov. 1, 2006, Boylston, MA.
Tyras, G., Radiation and Propagation of Electromagnetic Waves, 1969, pp. 33-36, Academic Press.
Wait, J.R., Wave Propagation Theory, 1981, pp. 67-75, 117-127, Pergamon Press.
Wait, J.R., Electromagnetic Wave Theory, 1985, pp. 254-259, Harper and Row, Publishers, New York.
Wait, J.R., Electromagnetic Waves in Stratified Media, 1996, pp. 8-10, IEEE Press, Reprint from 1962 edition, Pergamon Press.
Hessel, A., General Characteristics of Traveling-Wave Antennas, Antenna Theory—Part 2, Chapter 19, Appendix B, 1969, pp. 238-241, McGraw-Hill Book Company, New York.
Sarkar et al., Electromagnetic Macro Modeling of Propagation in Mobile Wireless Communication: Theory and Experiment, IEEE Antennas and Propagation Magazine, Dec. 2012, pp. 17-43, vol. 54, No. 6.
Wait, J.R., Characteristics of Antennas over Lossy Earth, Antenna Theory—Part 2, Chapter 23, 1969, pp. 386-391, McGraw-Hill Book Company, New York.
Wait, J.R., Theory of Ground Wave Propagation, Electromagnetic Probing in Geophysics, Chapter 5, 1971, pp. 163-172, 204-207, Golem Press, Boulder, Colorado.
Smith, M.S., Conventional Explanation for Crossed-Field Antenna, Electronics Letters, Feb. 13, 1992, pp. 360-361, vol. 28, No. 4.
Tesla, N., The Transmission of Electrical Energy Without Wires as a Means of Furthering Peace, Electrical World and Engineer, Jan. 7, 1905, pp. 21-24.
Wait et al., Excitation of the HF Surface Wave by Vertical and Horizontal Antennas, Radio Science, Sep.-Oct. 1979, pp. 767-780, vol. 14, No. 5.
Wait, J.R., A Note on Surface Waves and Ground Waves, IEEE Transactions on Antennas and Propagation, Nov. 1965, pp. 996-997, vol. AP-13.
Niikola Tesla, Nikola Tesla on His Work With Alternating Currents and Their Application to Wireless Telegraphy, Telephony, and Transmission of Power, 2002, pp. 1-240, Twenty First Century Books, Breckenridge, Colorado.
Tesla, N., Colorado Springs Notes: 1899-1900, 1978, pp. 1-437, Nolit, Beograd, Yugoslavia.
Jahnke et al., Tables of Functions with Formulae and Curves, 1945, p. 145, 4th Edition, Dover Publications, New York.
Milligan, T., Modern Antenna Design, 1985, pp. 8-9, 1st Edition, McGraw-Hill, New York.

(56) References Cited

OTHER PUBLICATIONS

Reinartz, J. L., 1XAM's transmitter, QST, Jan. 1924, pp. 26-27.
Sommerfeld, A., Problems of Radio, Partial Differential Equations in Physics—Lectures on Theoretical Physics, 1949, pp. 246-257, vol. VI, Academic Press, New York.
Stratton, J. A., Electromagnetic Theory, 1941, p. 516, McGraw-Hill, New York
Stutzman et al., Antenna Theory and Design, 1981, p. 82, 92-93, Wiley & Sons, New York.
Wait, J. R., Complex Image Theory—Revisited, IEEE Antennas and Propagation Magazine, Aug. 1991, pp. 27-29, vol. 33, No. 4.
Counterpoises, QST, Sep. 1920, pp. 24-25.
Ashe, G. B., A Counterpoise Investigation, QST, Dec. 1924, pp. 34-35.
Bannister, P. R., Summary of Image Theory Expressions for the Quasi-Static Fields of Antennas at or Above the Earth's Surface, Jul. 1979, pp. 1001-1008, vol. 67, No. 7, Proceedings of the IEEE.
Banos et al., Sommeifeld Surface Wave, Summary of Normal Mode Theory Symposium, IRE Transactions on Antennas and Propagation, Jan. 1956, p. 92, vol. AP-4, No. 1.
Barlow, H. M., Launching a Surface Wave over the Earth, Electronics Letters, Jul. 1967, pp. 304-305, vol. 3, No. 7.
Westman, H. P., Antenna—Counterpoise Fundamentals, QST, May 1926, p. 46.
Beverage, H.H., Improving the CW Ground System, OST, Nov. 1921, pp. 25-26.
Bucher, E. E., The Alexanderson System for Radio Communication, General Electric Review, Oct. 1920, pp. 813-839 (See Fig. 11, p. 820.) vol. 23, No. 10.
Paknys, R., Evaluation of Hankel Functions with Complex Argument and Complex Order, IEEE Transactions on Antennas and Propagation, May 1992, pp. 569-578, vol. 40, No. 5.
Burrows, C. R., Radio Propagation Over Spherical Earth, Proc. IRE, May 1935, pp. 470-480, vol. 23, No. 5; Reprinted in Bell System Tech. Jour., Jul. 1935, pp. 477-488, vol. 14, No. 3.
Wise, W. H., the Physical Reality of Zenneck's Surface Wave, Bell System Technical Journal, No. 1, Jan. 1937, pp. 35-44, vol. 16, No. 1.
Burrows, C. R., Addendum to the Effect of the Earth's Curvature on Ground Wave Propagation, IEEE Transactions on Antennas and Propagation, Nov. 1964, pp. 789-791, vol. 12, No. 6.
Burrows, C. R., Radio Gain, IEEE Transactions on Antennas and Propagation, May 1967, pp. 404-410, vol. AP-15, No. 3.
Chu et al., Electromagnetic Waves in Hollow Metal Tubes of Rectangular Cross Section, Proceedings of the IRE, Dec. 1938, pp. 1520-1555, vol. 26, No. 12.
Ufimtsev et al., Transformation of Surface Waves in Homogeneous Absorbing Layers, IEEE Transactions on Antennas and Propagation, Feb. 2000, pp. 214-222, vol. 48, No. 2.
Corum et al., Toroidal Helix Antenna, IEEE Antennas and Propagation Society International Symposium, Jun. 14-19, 1987, pp. 832-835, vol. 25.
Pinzone et al., A Novel Structure for Improved Directivity, 1988 Antennas and Propagation Society International Symposium Digest, Jun. 1988, pp. 824-827, vol. 2, IEEE, Syracuse, NY.
Corum et al., Experimental Validation of the Improved Directivity Element—Elevation Plane Control, 1989 Antennas and Propagation Society International Symposium Digest, Jun. 1989, pp. 702-705, vol. 2, IEEE, San Jose, CA.
Corum et al., A Concentric Array for Low and Medium Frequencies, 1990 Antennas and Propagation Society International Symposium Digest, May 1990, pp. 832-835, vol. 2, IEEE, Dallas, Texas.
Deminco, N., Propagation Prediction Techniques and Antenna Modeling (150 to 1750 kHz) for Intelligent Transportation Systems (ITS) Broadcast Applications, IEEE Antennas and Propagation Magazine, Aug. 2000, pp. 9-34, vol. 42, No. 4.
Eckert, R. P., History of Ground Wave Propagation Prediction Curves for AM Standard Broadcast, IEEE Transactions on Broadcasting, Mar. 1986, pp. 1-4, vol. BC-32, No. 1.
Epstein, P., Radio-Wave Propagation and Electromagnetic Surface Waves, Proc. National Academy of Sciences, Jun. 1947, pp. 195-199, vol. 33, No. 6.
Epstein, P., On the Possibility of Electromagnetic Surface Waves, Proc. National Academy of Sciences, Dec. 1954, pp. 1158-1165, vol. 40, No. 12.
Norton, K. A., The Physical Reality of Space and Surface Waves in the Radiation Field of Radio Antennas, Proceedings of the IRE, Sep. 1937, pp. 1192-1202, vol. 25, No. 9.
Goubau, G., Single Conductor Surface Wave Transmission Lines, Proc. IRE, Jun. 1951, pp. 619-624, vol. 39, No. 6.
Norton, K.A., The Propagation of Radio Waves over the Surface of the Earth and in the Upper Atmosphere: Part II The Propagation from Vertical, Horizontal, and Loop Antennas Over a Plane Earth of Finite Conductivity, Proceedings of the IRE, Sep. 1937, pp. 1203-1236, vol. 25, No. 9.
Hately et al., CFA: Working Assumption, Electronics World + Wireless World, Dec. 1990, pp. 1094-1099, vol. 96.
Hill et al., Excitation of the Zenneck Surface Wave by a Vertical Aperture, Radio Science, Nov.-Dec. 1978, pp. 969-977, vol. 13, No. 6.
Kabbary et al., Maxwell's Equations and the Crossed-Field Antenna, Electronics World + Wireless World, Mar. 1989, pp. 216-218, vol. 95.
Trainotti et al., Short Low and Medium Frequency Antenna Performance, IEEE Antennas and Propagation Magazine, Oct. 2005, pp. 66-90, vol. 47, No. 5.
Kabbary et al., Four Egyptian Mw Broadcast Crossed-Field Antennas, Proceedings of the National Association of Broadcasters 1999 Engineering Conference, Apr. 1999, pp. 235-241, Las Vegas, Nevada.
Kahan et al., On the Existence of a Surface Wave in Dipole Radiation over a Plane Earth, Proc. IRE, Jul. 1950, pp. 807-812, vol. 38, No. 7.
Karbowiak, A. E., Theory of Composite Guides: Stratified Guides for Surface Waves, Proc. IEE (British), 1954, pp. 238-242, vol. 101, No. 72.
Tesla, N., The True Wireless, Electrical Experimenter, May 1919, pp. 1-13.
King et al., Groundwave Attenuation Function for Propagation Over a Highly Inductive Earth, Radio Science, Jul. 1967, pp. 687-693, vol. 2, No. 7.
Li, R. The Accuracy of Norton's Empirical Approximations for Ground Wave Attenuation, IEEE Trans. Antennas and Propagation, Jul. 1983, pp. 624-628, vol. AP-31, No. 4.
Lindell et al., Exact Image Theory for the Sommerfeld Half-Space Problem, Part I: Vertical Magnetic Dipole, IEEE Transactions on Antennas and Propagation, Feb. 1984, pp. 126-133, vol. AP-32, No. 2.
Lindell et al., Exact Image Theory for the Sommerfeld Half-Space Problem, Part II: Vertical Electric Dipole, IEEE Transactions on Antennas and Propagation, Aug. 1984, pp. 841-847, vol. AP-32, No. 8.
Lindell et al., Exact Image Theory for the Sommerfeld Half-Space Problem, Part III: General Formulation, IEEE Transactions on Antennas and Propagation, Oct. 1984, pp. 1027-1032, vol. AP-32, No. 10.
Lodge et al., Syntonic Wireless Telegraphy; with Specimens of Large-scale Measurements, Proceedings of the Royal Society—London, Series A, May 26, 1909, pp. 227-256, vol. 82, No. 554.
Marincic, A. S., Nikola Tesla and the Wireless Transmission of Energy, IEEE Transactions on Power Apparatus and Systems, Oct. 1982, pp. 4064-4068, vol. PAS-101, No. 10.
Mason, H. F., The Nodal Point Explained, QST, Sep. 1923, pp. 11-14.
Norton, K. A., The Calculation of Ground-Wave Field Intensity Over a Finitely Conducting Spherical Earth, Proceedings of the IRE, Dec. 1941, pp. 623-639, vol. 29, No. 12.
Mexican Office Action issued in Mexican Patent Office for Application No. MX/a/2017/003024 dated May 28, 2018.
Colombian Office Action issued in Colombian Patent and Trademark Office for Application No. NC2017/0003264 dated May 9, 2018.

(56) References Cited

OTHER PUBLICATIONS

N. Tesla, U.S. Pat. No. 685,954 issued on Nov. 5, 1901, entitled "Method of Utilizing Effects Transmitted Through Natural Media", 9 pages.
Ling et al., The Propagation and Excitation of Surface Waves in an Absorbing Layer, Progress in Electromagnetics Research, 1998, pp. 49-91, vol. 19.
Wise, W. Howard , Note on the Accuracy of Rolf's Graphs of Sommerfeld's Attenuation Formula, Proceedings of the Institute of Radio Engineers, Nov. 1930, pp. 1971-1972, vol. 18, No. 11.
Barlow et al., Surface Waves, The Proceedings of the Institution of Electrical Engineers, Nov. 1953, pp. 329-347, vol. 100, part III.
Barlow et al., An Investigation of the Characteristics of Cylindrical Surface Waves, The Proceedings of the Institution of Electrical Engineers, Nov. 1953, pp. 321-328, 100, Part III, No. 68.
Brown et al., The Launching of Radial Cylindrical Surface Waves by a Circumferential Slot, The Proceedings of the Institution of Electrical Engineers, Mar. 1959, pp. 123-128, vol. 106, Part B.
Burrows, Charles R., Radio Propagation Over Plane Earth-Field Strength Curves, Bell System Technical Journal, Jan. 1937, pp. 45-75, vol. 16, No. 1.
Burrows, Charles R., Addendum to: Radio Propagation Over Plane Earth-Field Strength Curves, Bell System Technical Journal, Oct. 1937, pp. 574-577, vol. 16, No. 4.
Burrows, Charles R., Existence of a Surface Wave in Radio Propagation, Nature, Aug. 15, 1936, p. 284, vol. 138, Nature Publishing Group.
Burrows, Charles R., The Surface Wave in Radio Propagation Over Plane Earth, Proceedings of the Institute of Radio Engineers, Feb. 1937, pp. 219-229, vol. 25, No. 2.
Collin, R.E., Hertzian Dipole Radiating Over a Lossy Earth or Sea: Some Early and Late 20th-Century Controversies, IEEE Antennas and Propagation Magazine, Apr. 2004, pp. 64-79, vol. 46, No. 2.
Jones, E.M.T., An Annular Corrugated-Surface Antenna, Proceedings of the IRE., Jun. 1952, pp. 721-725, vol. 40.
Fernando et al., An Investigation of the Properties of Radial Cylindrical Surface Waves Launched Over Flat Reactive Surfaces, The Proceedings of the Institution of Electrical Engineers, May 1956, pp. 307-318, vol. 103, Part B.
Belrose, John S., A Radioscientist's Reaction to Marconi's First Transatlantic Wireless Experiment—Revisited, Conference Digest, Jul. 2001, pp. 22-25, vol. 1, IEEE Antennas & Propagation Society International Symposium, Boston, MA, US.
Marconi, Guglielmo, Wireless Telegraphic Communication, Nobel Lecture, Dec. 11, 1909, pp. 196-222.
Norton, K.A., Propagation of Radio Waves Over a Plane Earth, Nature, Jun. 8, 1935, pp. 954-955, Nature Publishing Group.
Kukushkin, A.V., On the Existence and Physical Meaning of the Zenneck Wave, Physics—Uspekhi, 2009, pp. 755-756, vol. 52, No. 7, Uspekhi Fizicheskikh Nauk, Russian Academy of Sciences.
Michaels, Charles J., A Load-Tracking L Network, QST, Apr. 1992, p. 74, American Radio Relay League, Inc.
Feldman, C.B., The Optical Behavior of the Ground for Short Radio Waves, Proceedings of the IRE, Jun. 1933, pp. 764-801, vol. 21, No. 6.
Rolf, Bruno, Graphs to Prof. Sommerfeld's Attenuation Formula for Radio Waves, Proceedings of the Institute of Radio Engineers, Mar. 1930, pp. 391-402, vol. 18, No. 3.
Wait, James R., the Ancient and Modern History of EM Ground-Wave Propagation, IEEE Antennas and Propagation Magazine, Oct. 1998, pp. 7-24, vol. 40, No. 5.
Zucker, Francis J., Surface-Wave Antennas, Antenna Engineering Handbook, 2007, pp. 10.1-10.32, Chp. 10, McGraw-Hill.
Smith, Carl E., Short Low Loss AM Antenna, IEEE Transactions on Broadcasting, Jun. 1989, pp. 237-240, vol. 35, No. 2, IEEE.
Belrose, John S., An Electrically Small Umbrella Antenna for 160 Meters, ARRL Antenna Compendium, 2002, pp. 3-8, vol. 7.
Belrose, John S., Characteristics of the Crossed Field Antenna Obtained by Numerical and Experimental Modelling, IEEE Antennas and Propagation Society International Symposium, 2005, pp. 21-24, vol. 1B.
Belrose, John S., Radiation Characteristics of an Electrically Small MF Broadcast Antenna—by Simulation, 11th International Conference on Antennas and Propagation, Apr. 17-20, 2001, pp. 90-94, IEEE Conference Publication No. 480.
Cobos et al., A Modified Goubau-Type Antenna with Two Octaves of Impedance Bandwidth, Antennas and Propagation Society International Symposium, Jun. 2004, pp. 3051-3054, vol. 3, IEEE.
Goubau, Georg, Surface Waves and Their Application to Transmission Lines, Journal of Applied Physics, Nov. 1950, pp. 1119-1128, vol. 21.
Ravipati et al., The Goubau Multi Element Monopole Antenna—Revisited, Antennas and Propagation Society International Symposium, Jun. 2007, pp. 233-236, IEEE.
Pinzone et al., A New Low Profile Anti-Skywave Antenna for AM Broadcasting, NAB Engineering Conference Proceedings, 1988, 7-15.
Underhill, Mike, All sorts of small antennas—they are better than you think—heuristics shows why!, Lecture Presentation to the Adelaide Hills Amateur Radio Society, Feb. 2008, pp. 1-144.
Belrose, John S., The Crossed Field Antenna—Analyzed by Simulation and Experiment, ICAP-JINA Millennium Conference on Antennas and Propagation, Apr. 9-12, 2000, pp. 1-4, Davos, Switzerland.
Belrose, John S., The Truth and Untruth About Electrically Small Antennas, Amateur Radio Technical Session, QCWA 2004 International Convention, Oct. 15, 2004, pp. 1-8, Ottawa, ON, Canada.
Hately et al., An Operational MF Broadcast Antenna Using Poynting Vector Synthesis, IEEE ICAP Seventh International Conference 1991, Apr. 1991, pp. 645-648, Conference Publication 333, Part 2.
Kabbary et al., Phasing and Matching Units for the CFA, URSI Seventeenth National Radio Science Conference, Feb. 22-24, 2000, pp. B22.1-B622.8, Minufiya University, Egypt.
Underhill, M.J., The Estimation and Measurement of the Efficiency and Effectiveness of Small Antennas in an Environment, HF Radio 2003—Ninth International IEE Conference on HF Radio Systems and Techniques, Jun. 23-26, 2003, pp. 1-6, University of Bath, UK.
Trainotti et al., On the Crossed Field Antenna Performance, IEEE Transactions on Broadcasting, Sep. 2006, pp. 299-317, vol. 52, No. 3.
Trainotti, Valentin, Short Medium Frequency AM Antennas, IEEE Transactions on Broadcasting, Sep. 2001, pp. 263-284, vol. 47, No. 3.
Underhill, Mike, Tuneable Coupled (Multi-) Mode Small Antennas—CFA, CFL, EH etc?, Lecture Presentation at the Radio Society of Great Britain Convention, Oct. 2010, pp. 1-167.
Letter to James Corum from John Musselman regarding the Antenna Installation at Kodiak, Alaska, Jun. 2011.
Smith, Carl E., Antenna Coupling Unit Network Fig. 2.4, Installed at Radio Station KVOK, exact date unknown, installed some time around or before 1980, Kodiak, Alaska.
Rice, S.O., Series for the Wave Functions of a Radiating Dipole at the Earth's Surface, BSTJ, Jan. 1937, pp. 101-109, vol. 16, No. 1.
McDonald, Kirk T., "Crossed-Field" and "Eh" Antennas Including Radiation from the Feed Lines and Reflection from the Earth's Surface, Published at http://www.physics.princeton.edu/~mcdonald/examples/crossedfield.pdf, Jul. 2006; updated Mar. 2010, pp. 1-11.
McDonald, Kirk T., "Crossed-Field" and "EH" Antennas Including Radiation from the Feed Lines and Reflection from the Earth's Surface, Published at http://www.physics.princeton.edu/~mcdonald/examples/crossedfield.pdf, Jul. 2006; updated Jun. 2008, pp. 1-18.
Belrose, John S., On the EH Antenna, antenneX Online, Apr. 2003, pp. 1-4, Issue No. 72.
Stewart, Brian G., Planning Application submitted by Isle of Man International Broadcasting plc to construct a Crossed Field Antenna at Cranstal, near Bride, Isle of Man, Department of Engineering Glasgow Caledonian University, Aug. 2000, pp. 1-19.
Fujimoto et al., Small Antennas, Research Studies Press, 1987, p. 4.

(56) References Cited

OTHER PUBLICATIONS

Corum et al., Class Notes: Tesla Coils and the Failure of Lumped-Element Circuit Theory, published on the World Wide Web at http://www.teslatechnologyresearch.com/corum/, 1999.
Corum et al., RF Coils, Helical Resonators and Voltage Magnification by Coherent Spatial Modes, Microwave Review, Sep. 2001, pp. 36-45.
Burrows, Charles R., The Surface Wave in Radio Propagation, Proceedings of the Radio Club of America, Aug. 1937, pp. 15-18, vol. 14, No. 2.
Algerian Office Action dated Mar. 15, 2018 (Algerian Patent Application No. 170124).
Response to Algerian Office Action filed Jun. 11, 2018 (Algerian Patent Application No. 170124).
U.S. Appl. No. 14/849,643, filed Sep. 10, 2015, Non-Final Office Action dated Nov. 17, 2017.
Peterson, G., The Application of Electromagnetic Surface Waves to Wireless Energy Transfer, 2015 IEEE Wireless Power Transfer Conference (WPTC), May 1, 2015, pp. 1-4, Shoreham, Long Island, New York, USA.
Kukushkin, A. V., On the Existence and Physical Meaning of the Zenneck Wave, UFN, 2009, vol. 179, No. 7, 801-803.
Kistovich, Yu. V., On the Possibility of Observing Surface Zenneck Waves in the Radiation of a Source with a Small Vertical Aperture, Journal of Technical Physics, 1989, vol. 59(4), 16-21.
Datsko, V.N. and A.A. Kopylov, On Surface Electromagnetic Waves, UFN, 2008, vol. 178, No. 1, 109-110.
Baybakov et al., Experimental Discovery of Zenneck's Surface Electromagnetic Waves, UFN, 1989, vol. 157, 722-724.
Hesse et al., A Single Probe Spatial Averaging Technique for Guided Waves and Its Application to Surface Wave Rail Inspection, IEEE Transactions on Ultrasonics, Ferroelectrics, and Frequency Control, vol. 54, No. 11, Nov. 2007, 2344-2356.
Andriyas, T., Surface Wave Propagation in a Dielectric Waveguide Loaded with an Anistropic, Conductive, and Spatially Dispersive Substrate, Utah State University, May 2009, p. 12.
U.S. Appl. No. 14/483,089, filed Sep. 10, 2014, Non-Final Office Action dated Apr. 6, 2017.
U.S. Appl. No. 14/728,507, filed Jun. 2, 2015, Final Office Action dated Jul. 28, 2017.
Beaty, W., Tesla's Big Mistake?, Sep. 1999, http://amasci.com/tesla/tmistk.html.
Anonymous, Tesla Wireless Technology, Mar. 8, 2007, http://montalk.net/notes/tesla-wireless-technology.
Examination Report issued in Australian Application No. 2014226221 dated Sep. 20, 2017.
U.S. Appl. No. 14/848,653, filed Sep. 9, 2015, Final Office Action dated Sep. 25, 2017.
Patent Application PCT/US2016/047344 filed on Aug. 17, 2016, International Search Report dated Feb. 8, 2017.
Patent Application PCT/US2016/047676 filed on Aug. 19, 2016, International Search Report dated Jan. 31, 2017.
Patent Application PCT/US2016/047672 filed on Aug. 19, 2016, International Search Report dated Nov. 3, 2016.
Patent Application PCT/US2016/046488 filed on Aug. 11, 2016, International Search Report dated Dec. 19, 2016.
Patent Application PCT/US2016/047674 filed on Aug. 19, 2016, International Search Report dated Dec. 20, 2016.
Patent Application PCT/US2016/047167 filed on Aug. 16, 2016, International Search Report dated Oct. 27, 2016.
Patent Application PCT/US2016/047375 filed on Aug. 17, 2016, International Search Report dated Dec. 2, 2016.
Patent Application PCT/US2016/047599 filed on Aug. 18, 2016, International Search Report dated Nov. 23, 2016.
Patent Application PCT/US2016/047673 filed on Aug. 19, 2016, International Search Report dated Nov. 29, 2016.
Patent Application PCT/US2016/047446 filed on Aug. 18, 2016, International Search Report dated Nov. 3, 2016.
Patent Application PCT/US2016/047353 filed on Aug. 17, 2016, International Search Report dated Nov. 16, 2016.
Patent Application PCT/US2016/047170 filed on Aug. 16, 2016, International Search Report dated Nov. 11, 2016.
Patent Application PCT/US2016/047611 filed on Aug. 18, 2016, International Search Report dated Nov. 11, 2016.
Patent Application PCT/US2016/047455 filed on Aug. 18, 2016, International Search Report and Written Opinion dated Nov. 7, 2016.
Patent Application PCT/US2016/047452 filed on Aug. 18, 2016, International Search Report and Written Opinion dated Nov. 17, 2016.
Leonhard, W., Electrical Engineering Between Energy and Information, Power Electronics and Motion Control Conference, 2000. Proceedings. PI EMC 2000. The Third International Aug. 15-18, 2000, IEEE, vol. 1, Aug. 15, 2000, pp. 197-202, Piscataway, NJ, USA.
Patent Application PCT/US2016/047451 filed on Aug. 18, 2016, International Search Report and Written Opinion dated Nov. 17, 2016.
Patent Application PCT/US16/47986 filed on Aug. 22, 2016, International Search Report and Written Opinion dated Nov. 17, 2016.
Patent Application PCT/US2016/047954 filed on Aug. 22, 2016, International Search Report and Written Opinion dated Nov. 24, 2016.
Zoran, B. et al, Some Notes on Transmission Line Representations of Tesla's Transmitters, 16th International Conference on Software, Telecommunications and Computer Networks, SOFTCOM 2008, IEEE. Sep. 25, 2008, pp. 60-69, Piscataway. NJ, USA.
Patent Application PCT/US2016/047957 filed on Aug. 22, 2016, International Search Report and Written Opinion dated Nov. 17, 2016.
Patent Application PCT/US2016/048314 filed on Aug. 24, 2016, International Search Report and Written Opinion dated Nov. 17, 2016.
Patent Application PCT/US2016/047675 filed on Aug. 19, 2016, International Search Report and Written Opinion dated Nov. 25, 2016.
Patent Application PCT/US2016/047955 filed on Aug. 22, 2016, International Search Report and Written Opinion dated Nov. 17, 2016.
Patent Application PCT/US2016/047457 filed on Aug. 18, 2016, International Search and Written Opinion dated Nov. 18, 2016.
Patent Application PCT/US2016/047368 filed on Aug. 17, 2016, International Search Report and Written Opinion dated Nov. 4, 2016.
Patent Application PCT/US2016/047338 filed on Aug. 17, 2016, International Search Report and Written Opinion dated Nov. 17, 2016.
Patent Application PCT/US2016/047598 filed on Aug. 18, 2016, International Search Report and Written Opinion dated Nov. 3, 2016.
Patent Application PCT/US2015/049236 filed on Sep. 9, 2015, International Search Report and Written Opinion dated Jan. 4, 2016.
Patent Application PCT/US2015/049511 filed on Sep. 10, 2015, International Search Report and Written Opinion dated Jan. 5, 2016.
Patent Application PCT/US2015/049523 filed on Sep. 10, 2015, International Search Report and Written Opinion dated Jan. 7, 2016.
Patent Application PCT/US2015/049497 filed on Sep. 10, 2015, International Search Report and Written Opinion dated Dec. 23, 2015.
Patent Application PCT/US2015/049520 filed on Sep. 10, 2015, International Search Report and Written Opinion dated Jan. 15, 2016.
Rich, G. J., The Launching of a Plane Surface Wave, Proceedings of the IEEE—Part B: Radio and Electronic Engineering, Mar. 1, 1955, pp. 237-246, vol. 102, No. 2, US.
International Search Report and Written Opinion for PCT/US2015/049518 dated Dec. 18, 2015.
International Search Report and Written Opinion for PCT/US2015/049154 dated Dec. 15, 2015.
Hambling, David, "Skimming the Surface: the Return of Tesla's Surface Waves", Published by Popular Mechanics on the Internet at http://www.popularmechanics.com/technology/infrastructure/

(56) References Cited

OTHER PUBLICATIONS a8778/ skimming-the-surface-the-return-of-teslas-surface-waves-15322250/, Apr. 8, 2013, Popular Mechanics.
Barfield, R. H., "The Attenuation of Wireless Waves Over Land," Journal of the I.E.E. (British), Jan. 1928, pp. 204-214, vol. 66.
Michalski, K. A. et al., "The Sommerfeld half-space problem revisited: from radio frequencies and Zenneck waves to visible light and Fano modes," Journal of Electromagnetic Waves and Applications, Jan. 2016, pp. 1-42, vol. 30, No. 1, Taylor & Francis.
Noether, F., "Spreading of Electric Waves Along the Earth," published in the book translation Theory of Functions as Applied to Engineering Problems, Technology Press, 1942, pp. 167-184, Part 2, Section E, MIT [Originally published by Springer, Berlin, in 1931 under the title Funktionentheorie und Ihre Anwendung in der Technik, Part II, R. Rothe, F. Ollendorf, and K. Pohlhausen, editors.].
Zenneck, J., Wireless Telegraphy, Mar. 1918, McGraw-Hill Book Company, Inc., New York, NY, USA. (submitted in 2 parts).
Hendry, J. Surface Waves: what Are They? Why Are They Interesting?, Roke Manor Research Limited, 2009, pp. 1-10, Romsey, England.
Turner, J., Isolation of the Zenneck Surface Wave: Update, Roke Manor Research Limited, Romsey, England.
Schelkunoff, S. A., Modified Sommerfeld's Integral and Its Applications, Proceedings of the Institute of Radio Engineers, Oct. 1936, pp. 1388-1398, vol. 24, No. 10, IEEE, New York, NY, USA.
Wells, C.B., CFA Experiments, Electronics World + Wireless World, Mar. 1990, pp. 253-255, vol. 96.
Wells, C.B., The Cross-Field Antenna in Practice, Electronics World + Wireless World, Nov. 1989, pp. 1109-1111, vol. 95.
Wait, J.R., Theory of Ground Wave Propagation, Electromagnetic Probing in Geophysics, 1971, pp. 163-207, Golem Press.
Sarkar et al., History of Wireless, Jan. 17, 2006, Wiley-IEEE Press, Hoboken, NJ, USA. (submitted in 4 parts).
Stark III, J.C., Wireless Power Transmission Utilizing a Phased Array of Tesla Coils (Master's Thesis), May 13, 2004, pp. 1-247, MIT, Cambridge, MA, USA. (submitted in 2 parts).
Hardesty et al., Electrical Storms in Tesla's Colorado Springs Notes (& the Transmission of Energy w/o Wires), Tesla Science Center Conference, Nov. 5, 2011, Long Island, NY, USA. (Power Point Presentation).
Corum et al., A Technical Analysis of the Extra Coil as a Slow Wave Helical Resonator, Proceedings of the 2nd International Tesla Symposium, 1986, pp. 2-1 to 2-24, International Tesla Society, Colorado Springs, CO, USA.
Corum et al., Dr. Mahlon Loomis: Terra Alta's Neglected Discoverer of RF Communication, Proceedings of the 1992 International Tesla Symposium, pp. 19-34, International Tesla Society, Colorado Springs, CO, USA.
Corum et al., Summary Notes on Tesla Coils, Tesla Conference 2011, Published as Appendix 8 in Electrical Storms in Tesla's Colorado Springs Notes and the Transmission of Energy Without Wires, Nov. 5, 2011, pp. 1-14, Tesla Science Center at Wardenclyffe, Shoreham, NY, USA.
Hardesty et al., Franklin—Loomis—Tesla: The Origin and Development of Wireless Technology, Tesla Science Foundation Conference, Jul. 9-11, 2010, Philadelphia, PA, USA. (Power Point Presentation).
Hardesty et al., Franklin—Loomis—Tesla: The Origin of Modern Wireless Phenomena, Tesla Science Foundation Conference, Jul. 9-11, 2010, pp. 1-99, Philadelphia, PA, USA.
Corum et al., Goodness, Q and Power Factor in Electrical Science and Machinery, Infinite Energy Magazine, Jan./Feb. 2010, p. 1-17, vol. 15, No. 89, New Energy Foundation, Concord, NH, USA.
Marriott, R. H., How Radio Grew Up, Radio Broadcast, Dec. 1925, pp. 159-162, vol. VIII, No. 2, Doubleday, Page & Co., Garden City, Ny, USA.
Goubau, G., Über die Zennecksche Bodenwelle (On the Zenneeck Surface Wave), Zeitschrift fur Angewandte Physik, 1951, pp. 103-107, vol. 3, No. 3/4, as translated by James F. Corum.
Pinzone, B.F., Pinzone Antiskywave Design, Radio World, May 15, 1988, pp. 45-46.
Corum et al., Experimental Replication of Loomis' RF Experiments, AAPT Summer Meeting, Jul. 24, 2006, Syracuse, NY, USA. (Power Point Presentation).
Corum et al., Tesla Coil Research, U.S. Army Armament Research, Development and Engineering Center, Contract No. DAAA21-90-C-0084, Jun. 1992.
Lebo, J.R., The Man Before Marconi: A Biography of Dr. Mahlon Loomis, QST, Aug. 1948, pp. 42-44.
Winters, S.R., The Story of Mahlon Loomis: Pioneer of Radio, Radio News, Nov. 1922, pp. 836-837, 966-980.
Kogan, S.H., Distribution of Waves Along an Infinite Helix, Reports of the Academy of Sciences of the USSR, 1949, pp. 1-5, vol. 66, No. 5, as translated by P.J. Pesavento and E. Corum.
Niessen, K.F., Zur Entscheidung zwischen den Beiden Sommerfeldschen Formeln für die Fortpflanzeng von Drahtlosen Wellen, Ann. der Physik, 1937, pp. 585-596, vol. 29 (Includes English Translation and German Original).
Niessen, K.F., Über die Enffemtun Raumwellen eines vertikalen Dipolesenders oberhalb einer ebenen Erde von beliebiger Dielektrizitätskonstante und beliebiger Lightfähigkeit, Ann. der Physik, Dec. 24, 1933, pp. 893-912, Series 5, vol. 18 (Includes English Translation and German Original).
Niessen, K.F., Bemerkung zu einer Arbeit von Murry und einer Arbeit von van der Pol und Niessen uber die Ausbreitung elektromagnitischen Wellen, Ann. der Physik, Apr. 3, 1933, pp. 810-820, Series 5, vol. 16 (Includes English Translation and German Original).
Hack, F., Die Ausbreitung ebener elektromagnetischer Wellen längs eines geschrichteten Leiters, besonders in den Fällen der drahtlosen Telegraphie, Annallen der Physik, 1908, pp. 43-63, vol. 27 (Includes English Translation and German Original).
True, H., Über die Erdström in der Nahe einer Sendeantenne für drahtlose Telegraphie,Jahrbuch der drahtlose Telegraphie und Telephonie, Feb. 1911, pp. 125-175, vol. 5, No. 2 (Includes English Translation and German Original).
Van Der Pol et al., Über die Ausbreitung Elektromagnetischer Wellen üeber eine Ebene Erde, Ann. der Physik, Aug. 22, 1930, pp. 273-294, Ser. 5, vol. 6 (Includes English Translation and German Original).
Van Der Pol, B., Über die Ausbreitung Elektromagnetischer Wellen, Jahrbuch für Drahtlosen Telegraphie und Telephonie, Apr. 1931, pp. 152-156, vol. 37 (Includes English Translation and German Original).
Zenneck, J., "Über die Fortpflanzung ebener elektromagnetischer Wellen längs einer ebenen Leiterfläche und ihre Beziehung zur drahtlosen Telegraphie," (On the propagation of plane electromagnetic waves along a flat conducting surface and their relation to wireless telegraphy), Annalen der Physik, Sep. 20, 1907, pp. 846-866, Serial 4, vol. 23 (Includes English Translation and German Original).
Sommerfeld, A., Uber die Ausbreitung der Wellen in der Drahtlosen Telegraphie, Annalen der Physik, 1909, pp. 665-737, vol. 28, No. 4 (Includes English Translation and German Original).
Weyl, H., Ausbreitung elektromagnetischer Wellen über einem ebenen Leiter (Propagation of Electromagnetic Waves Over a Plane Conductor), Annalen der Physik, Nov. 1919, pp. 97-109, vol. 60 (Includes English Translation and German Original).
Sommerfeld, A., Ausbreitung der Wellen in der Drahtlosen Telegraphie. Einfluss der Bodenbeschaffenheit auf gerichtete und un gerichtete Wellenzuge, Jahrbuch der drahtlose Telegraphie und Telephonie, Dec. 1910, pp. 157-176 (Includes English Translation and German Original).
Van Der Pol et al., Über die Raum Wellen von einem vertikalen Dipolesender auf Ebene Erde, Ann. der Physik, Jul. 21, 1931, pp. 485-510, Ser. 5, vol. 10 (Includes English Translation and German Original).
Sommerfeld, A., Uber die Fortplfanzung elektrodynamischer Wellen läangs eines Drahtes, Annalen der Physik, 1899, pp. 233-290, vol. 67 (Includes English Translation and German Original).

(56) References Cited

OTHER PUBLICATIONS

Sommerfeld, A., Uber die Ausbreitung der Wellen in der Drahtlosen Telegraphie, Annalen der Physik, Dec. 1926, pp. 1135-1153, vol. 81 (Includes English Translation and German Original).
Weyl, H., Erwiderung auf Herrn Sommerfelds Bemerkungen über die Ausbreitung der Wellen in der drahtlosen Telegraphie, Annalen der Physik, 1920, pp. 110-112, vol. 62 (Includes English Translation and German Original).
Sommerfeld, A., Uber die Ausbreitung der Wellen in der Drahtlosen Telegraphi, Annalen der Physik, 1920 , pp. 95-96, vol. 367, No. 9 (Includes English Translation and German Original).
Wu, Ke et al., Wireless Power Transmission, Technology, and Applications, Proceedings of the IEEE, Jun. 2013, pp. 1271-1275, vol. 101, No. 6.
Massa, Andrea et al., Array Designs for Long-Distance Wireless Power Transmission: State-of-the-Art and Innovative Solutions, Proceedings of the IEEE, Jun. 2013, pp. 1464-1481, vol. 101, No. 6.
Norton, K. A., The Propagation of Radio Waves Over the Surface of the Earth and in the Upper Atmosphere: Part I Ground-Wave Propagation from Short Antennas, Proc. IRE, Oct. 1936, pp. 1367-1387, vol. 24, No. 10.
Shinohara, Naoki, Beam Control Technologies with a High-Efficiency Phased Array for Microwave Power Transmission in Japan, Proceedings of the IEEE, Jun. 2013, pp. 1448-1463, vol. 101, No. 6.
Written Opinion dated April 16, 2018, dated April 17, 2018 (Singapore Application No. 11201701355Q).
Japanese Office Action with Partial Translation, dated Jan. 9, 2018 (Japanese Patent Application No. 2015-561472).
U.S. Appl. No. 14/728,507, filed Jun. 2, 2015, Non-Final Office Action dated Apr. 6, 2018.
Ranfagni, A. et al, Observation of Zenneck-type Waves in Microwave Propagation Experiments, Journal of Applied Physics, Jul. 2006, pp. 024910-1-024910-5, vol. 100, No. 2, US.
Mahmoud, S. F. et al, Reflection of Surface Waves on a Dielectric Image Line with Application to 'Guided RADAR', Microwave Symposium, 1972 IEEE GMTT International, May 22, 1972, pp. 139-141, Piscataway, NJ, US.
Examination Report issued in New Zealand Application No. 720048 dated May 22, 2017.
Examination Report issued in New Zealand Application No. 720048 dated Jan. 25, 2017.
Patent Application PCT/US2016/047350 filed on Aug. 17, 2016, International Search Report dated Mar. 9, 2017.
Patent Application PCT/US2015/049171 filed on Sep. 9, 2015, International Search Report and Written Opinion dated Dec. 16, 2015.
International Search Report and Written Opinion for PCT/US2016/047677 dated Oct. 18, 2016.
International Search Report and Written Opinion for PCT/US2016/047956 dated Oct. 21, 2016.
U.S. Appl. No. 13/789.525, filed Mar. 7, 2013, Restriction Requirement dated Oct. 7, 2015.
U.S. Appl. No. 13/789,525, filed Mar. 7, 2013, Response to Restriction Requirement dated Oct. 7, 2015.
U.S. Appl. No. 13/789,525, filed Mar. 7, 2013, Non-Final Office Action dated Feb. 11, 2016.
U.S. Appl. No. 13/789,525, filed Mar. 7, 2013, Response to Non-Final Office Action dated Feb. 11, 2016.
U.S. Appl. No. 13/789,525, filed Mar. 7, 2013, Final Office Action dated Sep. 16, 2016.
International Search Report and Written Opinion for PCT/US2015/053242 dated Jan. 25, 2016.
Examination Report issued in New Zealand Application No. 712566 dated Nov. 30, 2015.
Office Action Issued in Chilean Application No. 2506-2015 dated Sep. 29, 2016. (Partial English Translation included).
"Wireless Transmission Theory, the Tesla Effect," Tesla Radio, Dec. 23, 2011, pp. 1-6.
Peterson, Gary, "Comparing the Hertz-Wave and Tesla Wireless Systems," Feedline, Oct. 27, 2012, pp. 1-7, 9, 21st Century Books, Breckenridge, CO.
International Search Report and Written Opinion for PCT/US2015/035598 dated Sep. 11, 2015.
Examination Report issued in Australian Application No. 2014226221 dated Sep. 22, 2016.
U.S. Appl. No. 13/789,538, filed Mar. 7, 2013, Restriction Requirement dated Oct. 7, 2015.
U.S. Appl. No. 13/789,538, filed Mar. 7, 2013, Response to Restriction Requirement dated Oct. 7, 2015.
U.S. Appl. No. 13/789,538, filed Mar. 7, 2013, Non-Final Office Action dated Feb. 8, 2016.
U.S. Appl. No. 13/789,538, filed Mar. 7, 2013, Response to Non-Final Office Action dated Feb. 8, 2016.
U.S. Appl. No. 13/789,538, filed Mar. 7, 2013, Notice of Allowance dated Oct. 7, 2016.
Hill, et. al. "On the excitation of the Zenneck surface wave over the ground at 1OHz," May 1980, Ann ales des Telecommunications, vol. 35, Issue 5, pp. 179-182.
U.S. Appl. No. 13/789,525, filed Mar. 7, 2013, Response to Final Office Action dated Sep. 16, 2016.
Peterson, Gary, "Rediscovering the zenneck surface wave," 0/Feb. 8, 2008, Feedline No. 4, 1-5.
U.S. Appl. No. 14/728,492, filed Jun. 2, 2015, Non-Final Office Action dated Dec. 16, 2016.
U.S. Appl. No. 14/728,507, filed Jun. 2, 2015, Non-Final Office Action dated Jan. 3, 2017.
Wolff, Christian, "Over the Horizon Oceanography Radar WERA," Oct. 13, 2011, https://web.archive.org/web/20111013010047/http:/www.radartutorial.eu/19.kartei/karte712.en.html.
Kume, Hideyoshi, "Dengyo Converts Microwave Into Electricity with High Efficiency," Nikkei Electronics, May 17, 2011, http://techon.nikkeibp.co.jp/english/NEWS_EN/20110517/191846/.
Examination Report issued in New Zealand Application No. 712566 dated Jun. 10, 2016.
Examination Report issued in New Zealand for Application No. 720048 dated Jun. 10, 2016.
Singh A. K. et al., Excitation of surface electromagnetic waves on water, App Optics, Nov. 1, 1978, pp. 3459-3465, vol. 17, No. 21.
Olivier Balosso et al., Brief overview about Surface Wave theory and applications, 2012 15th International Symposium on Antenna Technology and Applied Electromagnetics (Antem), Jun. 25, 2012, pp. 1-7, IEEE.
International Search Report and Written Opinion for PCT/US2015/035598 dated Jul. 21, 2014.
Menelle M et al., Full digital high frequency surface wave radar: French trials in the Biscay bay, 2008 International Conference on RADAR, Sep. 2, 2008, pp. 224-229, IEEE, Piscataway, NJ, USA.
J. O. Hinz et al., A MIMO FMCW radar approach to HFSWR, Advances in Radio Science: ARS, Jul. 29, 2011, pp. 159-163, retrieved from the Internet: http://www.adv-radio-sci.net/9/159/2011/ars-9-159-2011.pdf (retrieved on Dec. 4, 2015), Katlenburg-Lindau, Germany.
Guohua Wang et al., High Resolution MIMO-HFSWR Radar Using Sparse Frequency Waveforms, Wireless Sensor Network, Oct. 1, 2009, pp. 152-162, vol. 1, No. 3.
International Search Report and Written Opinion for PCT/US2015/049505 dated Dec. 14, 2015.
International Search Report and Written Opinion for PCT/US2015/049394 dated Dec. 14, 2015.
International Search Report and Written Opinion for PCT/US2015/049064 dated Dec. 11, 2015.
International Search Report and Written Opinion for PCT/US2015/049509 dated Dec. 18, 2015.
H. M. Barlow et al., Surface Waves, Proceedings of the IRE, Nov. 1, 1953, pp. 329-341, vol. 100, No. 68, US.
International Search Report and Written Opinion for PCT/US2015/049171 dated Dec. 16, 2015.
International Search Report and Written Opinion for PCT/US2015/049435 dated Dec. 22, 2015.
International Search Report and Written Opinion for PCT/US2015/049424 dated Dec. 18, 2015.

(56) References Cited

OTHER PUBLICATIONS

International Search Report and Written Opinion for PCT/US2015/049151 dated Dec. 17, 2015.
International Search Report and Written Opinion for PCT/US2015/049161 dated Dec. 17, 2015.
Notice of Allowance dated Aug. 13, 2018 in U.S. Appl. No. 16/017,516.
Office Action dated Oct. 10, 2018 (Philippines Application No. 1-2015-501919).

EXCITATION AND USE OF GUIDED SURFACE WAVE MODES ON LOSSY MEDIA

CROSS REFERENCE TO RELATED APPLICATIONS

This application claims priority to, and the benefit of, co-pending U.S. non-provisional application having Ser. No. 14/483,089, filed Sep. 10, 2014, which is hereby incorporated by reference in its entirety.

BACKGROUND

For over a century, signals transmitted by radio waves involved radiation fields launched using conventional antenna structures. In contrast to radio science, electrical power distribution systems in the last century involved the transmission of energy guided along electrical conductors. This understanding of the distinction between radio frequency (RF) and power transmission has existed since the early 1900's.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
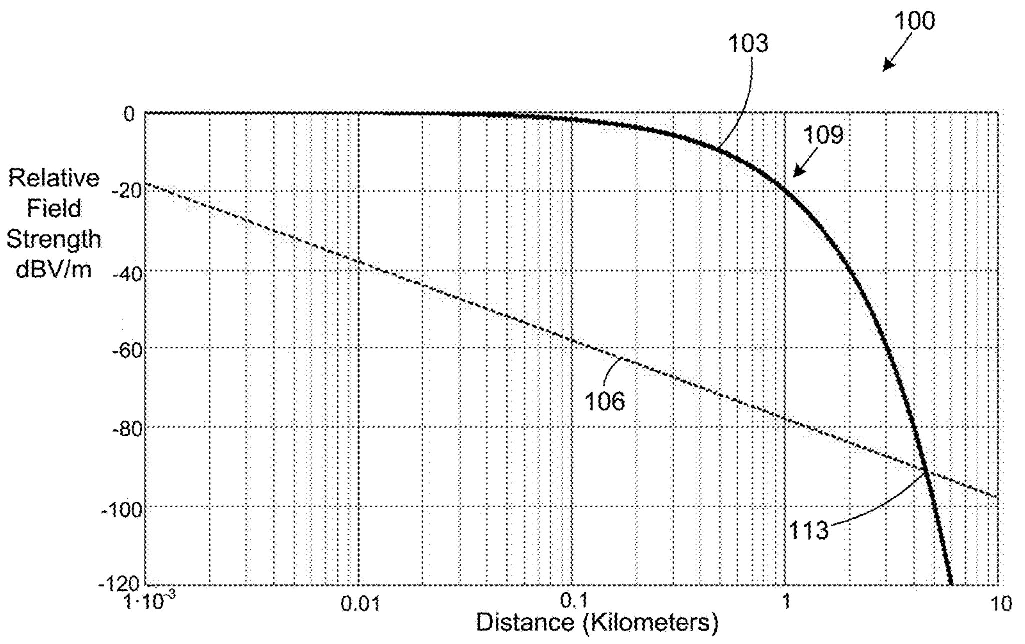
FIG. 1 is a chart that depicts field strength as a function of distance for a guided electromagnetic field and a radiated electromagnetic field.

To begin, some terminology shall be established to provide clarity in the discussion of concepts to follow. First, as contemplated herein, a formal distinction is drawn between radiated electromagnetic fields and guided electromagnetic fields.

As contemplated herein, a radiated electromagnetic field comprises electromagnetic energy that is emitted from a source structure in the form of waves that are not bound to a waveguide. For example, a radiated electromagnetic field is generally a field that leaves an electric structure such as an antenna and propagates through the atmosphere or other medium and is not bound to any waveguide structure. Once radiated electromagnetic waves leave an electric structure such as an antenna, they continue to propagate in the medium of propagation (such as air) independent of their source until they dissipate regardless of whether the source continues to operate. Once electromagnetic waves are radiated, they are not recoverable unless intercepted, and, if not intercepted, the energy inherent in radiated electromagnetic waves is lost forever. Electrical structures such as antennas are designed to radiate electromagnetic fields by maximizing the ratio of the radiation resistance to the structure loss resistance. Radiated energy spreads out in space and is lost regardless of whether a receiver is present. The energy density of radiated fields is a function of distance due to geometric spreading. Accordingly, the term "radiate" in all its forms as used herein refers to this form of electromagnetic propagation.

A guided electromagnetic field is a propagating electromagnetic wave whose energy is concentrated within or near boundaries between media having different electromagnetic properties. In this sense, a guided electromagnetic field is one that is bound to a waveguide and may be characterized as being conveyed by the current flowing in the waveguide. If there is no load to receive and/or dissipate the energy conveyed in a guided electromagnetic wave, then no energy is lost except for that dissipated in the conductivity of the guiding medium. Stated another way, if there is no load for a guided electromagnetic wave, then no energy is consumed. Thus, a generator or other source generating a guided electromagnetic field does not deliver real power unless a resistive load is present. To this end, such a generator or other source essentially runs idle until a load is presented. This is akin to running a generator to generate a 60 Hertz electromagnetic wave that is transmitted over power lines where there is no electrical load. It should be noted that a guided electromagnetic field or wave is the equivalent to what is termed a "transmission line mode." This contrasts with radiated electromagnetic waves in which real power is supplied at all times in order to generate radiated waves. Unlike radiated electromagnetic waves, guided electromagnetic energy does not continue to propagate along a finite length waveguide after the energy source is turned off. Accordingly, the term "guide" in all its forms as used herein refers to this transmission mode (TM) of electromagnetic propagation.

Referring now to FIG. 1, shown is a graph 100 of field strength in decibels (dB) above an arbitrary reference in volts per meter as a function of distance in kilometers on a log-dB plot to further illustrate the distinction between radiated and guided electromagnetic fields. The graph 100 of FIG. 1 depicts a guided field strength curve 103 that shows the field strength of a guided electromagnetic field as a function of distance. This guided field strength curve 103 is essentially the same as a transmission line mode. Also, the graph 100 of FIG. 1 depicts a radiated field strength curve 106 that shows the field strength of a radiated electromagnetic field as a function of distance.

Of interest are the shapes of the curves 103 and 106 for guided wave and for radiation propagation, respectively. The radiated field strength curve 106 falls off geometrically (1/d, where d is distance), which is depicted as a straight line on the log-log scale. The guided field strength curve 103, on the other hand, has a characteristic exponential decay of $e^{-\alpha d}/\sqrt{d}$ and exhibits a distinctive knee 109 on the log-log scale. The guided field strength curve 103 and the radiated field strength curve 106 intersect at point 113, which occurs at a crossing distance. At distances less than the crossing distance at intersection point 113, the field strength of a guided electromagnetic field is significantly greater at most locations than the field strength of a radiated electromagnetic field. At distances greater than the crossing distance, the opposite is true. Thus, the guided and radiated field strength curves 103 and 106 further illustrate the fundamental propagation difference between guided and radiated electromagnetic fields. For an informal discussion of the difference between guided and radiated electromagnetic fields, reference is made to Milligan, T., *Modern Antenna Design*, McGraw-Hill, 1st Edition, 1985, pp. 8-9, which is incorporated herein by reference in its entirety.

The distinction between radiated and guided electromagnetic waves, made above, is readily expressed formally and placed on a rigorous basis. That two such diverse solutions could emerge from one and the same linear partial differential equation, the wave equation, analytically follows from the boundary conditions imposed on the problem. The Green function for the wave equation, itself, contains the distinction between the nature of radiation and guided waves.

In empty space, the wave equation is a differential operator whose eigenfunctions possess a continuous spectrum of eigenvalues on the complex wave-number plane. This transverse electro-magnetic (TEM) field is called the radiation field, and those propagating fields are called "Hertzian waves". However, in the presence of a conducting boundary, the wave equation plus boundary conditions mathematically lead to a spectral representation of wave-numbers composed of a continuous spectrum plus a sum of discrete spectra. To this end, reference is made to Sommerfeld, A., "Uber die Ausbreitung der Wellen in der Drahtlosen Telegraphie," Annalen der Physik, Vol. 28, 1909, pp. 665-736. Also see Sommerfeld, A., "Problems of Radio," published as Chapter 6 in *Partial Differential Equations in Physics—Lectures on Theoretical Physics: Volume VI,* Academic Press, 1949, pp. 236-289, 295-296; Collin, R. E., "Hertzian Dipole Radiating Over a Lossy Earth or Sea: Some Early and Late 20$^{th}$ Century Controversies," *IEEE Antennas and Propagation Magazine*, Vol. 46, No. 2, April 2004, pp. 64-79; and Reich, H. J., Ordnung, P. F, Krauss, H. L., and Skalnik, J. G., *Microwave Theory and Techniques*, Van Nostrand, 1953, pp. 291-293, each of these references being incorporated herein by reference in their entirety.

To summarize the above, first, the continuous part of the wave-number eigenvalue spectrum, corresponding to branch-cut integrals, produces the radiation field, and second, the discrete spectra, and corresponding residue sum arising from the poles enclosed by the contour of integration, result in non-TEM traveling surface waves that are exponentially damped in the direction transverse to the propagation. Such surface waves are guided transmission line modes. For further explanation, reference is made to Friedman, B., *Principles and Techniques of Applied Mathematics*, Wiley, 1956, pp. pp. 214, 283-286, 290, 298-300.

In free space, antennas excite the continuum eigenvalues of the wave equation, which is a radiation field, where the outwardly propagating RF energy with $E_z$ and $H_\Phi$ in-phase is lost forever. On the other hand, waveguide probes excite discrete eigenvalues, which results in transmission line propagation. See Collin, R. E., *Field Theory of Guided Waves*, McGraw-Hill, 1960, pp. 453, 474-477. While such theoretical analyses have held out the hypothetical possibility of launching open surface guided waves over planar or spherical surfaces of lossy, homogeneous media, for more than a century no known structures in the engineering arts have existed for accomplishing this with any practical efficiency. Unfortunately, since it emerged in the early 1900's, the theoretical analysis set forth above has essentially remained a theory and there have been no known structures for practically accomplishing the launching of open surface guided waves over planar or spherical surfaces of lossy, homogeneous media.

According to the various embodiments of the present disclosure, various guided surface waveguide probes are described that are configured to excite electric fields that couple into a guided surface waveguide mode along the surface of a lossy conducting medium. Such guided electromagnetic fields are substantially mode-matched in magnitude and phase to a guided surface wave mode on the surface of the lossy conducting medium. Such a guided surface wave mode can also be termed a Zenneck waveguide mode. By virtue of the fact that the resultant fields excited by the guided surface waveguide probes described herein are substantially mode-matched to a guided surface waveguide mode on the surface of the lossy conducting medium, a guided electromagnetic field in the form of a guided surface wave is launched along the surface of the lossy conducting medium. According to one embodiment, the lossy conducting medium comprises a terrestrial medium such as the Earth.

Figure 2:
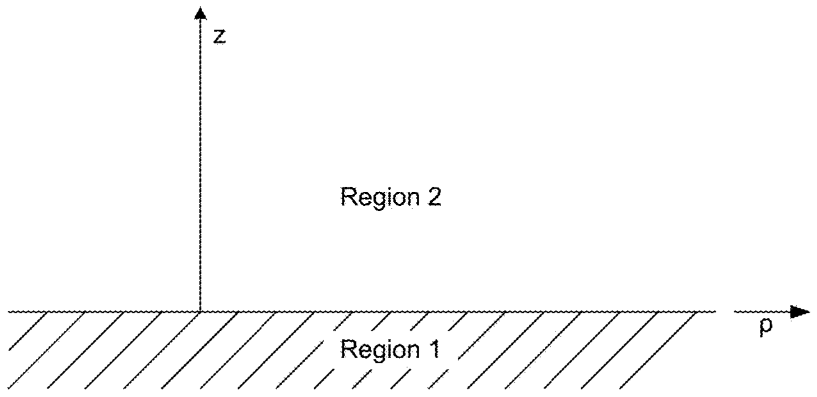
FIG. 2 is a drawing that illustrates a propagation interface with two regions employed for transmission of a guided surface wave according to various embodiments of the present disclosure.

Referring to FIG. 2, shown is a propagation interface that provides for an examination of the boundary value solution to Maxwell's equations derived in 1907 by Jonathan Zenneck as set forth in his paper Zenneck, J., "On the Propagation of Plane Electromagnetic Waves Along a Flat Conducting Surface and their Relation to Wireless Telegraphy," Annalen der Physik, Serial 4, Vol. 23, Sep. 20, 1907, pp. 846-866. FIG. 2 depicts cylindrical coordinates for radially propagating waves along the interface between a lossy conducting medium specified as Region 1 and an insulator specified as Region 2. Region 1 can comprise, for example, any lossy conducting medium. In one example, such a lossy conducting medium can comprise a terrestrial medium such as the Earth or other medium. Region 2 is a second medium that shares a boundary interface with Region 1 and has different constitutive parameters relative to Region 1. Region 2 can comprise, for example, any insulator such as the atmosphere or other medium. The reflection coefficient for such a boundary interface goes to zero only for incidence at a complex Brewster angle. See Stratton, J. A., *Electromagnetic Theory*, McGraw-Hill, 1941, p. 516.

According to various embodiments, the present disclosure sets forth various guided surface waveguide probes that generate electromagnetic fields that are substantially mode-matched to a guided surface waveguide mode on the surface of the lossy conducting medium comprising Region 1. According to various embodiments, such electromagnetic fields substantially synthesize a wave front incident at a complex Brewster angle of the lossy conducting medium that can result in zero reflection.

To explain further, in Region 2, where an $e^{j\omega t}$ field variation is assumed and where $\rho\neq0$ and $z\geq0$ (with z being the vertical coordinate normal to the surface of Region 1, and $\rho$ being the radial dimension in cylindrical coordinates), Zenneck's closed-form exact solution of Maxwell's equations satisfying the boundary conditions along the interface are expressed by the following electric field and magnetic field components:

$$H_{2\phi} = Ae^{-u_2 z}H_1^{(2)}(-j\gamma\rho), \tag{1}$$

$$E_{2\rho} = A\left(\frac{u_2}{j\omega\varepsilon_0}\right)e^{-u_2 z}H_1^{(2)}(-j\gamma\rho), \text{ and} \tag{2}$$

$$E_{2z} = A\left(\frac{-\gamma}{\omega\varepsilon_0}\right)e^{-u_2 z}H_0^{(2)}(-j\gamma\rho). \tag{3}$$

In Region 1, where the $e^{j\omega t}$ field variation is assumed and where $\rho\neq0$ and $z\leq0$, Zenneck's closed-form exact solution of Maxwell's equations satisfying the boundary conditions along the interface are expressed by the following electric field and magnetic field components:

$$H_{1\phi} = Ae^{u_1 z}H_1^{(2)}(-j\gamma\rho), \tag{4}$$

$$E_{1\rho} = A\left(\frac{-u_1}{\sigma_1 + j\omega\varepsilon_1}\right)e^{u_1 z}H_1^{(2)}(-j\gamma\rho), \text{ and} \tag{5}$$

$$E_{1z} = A\left(\frac{-j\gamma}{\sigma_1 + j\omega\varepsilon_1}\right)e^{u_1 z}H_0^{(2)}(-j\gamma\rho). \tag{6}$$

In these expressions, z is the vertical coordinate normal to the surface of Region 1 and $\rho$ is the radial coordinate, $H_n^{(2)}(-j\gamma\rho)$ is a complex argument Hankel function of the second kind and order n, $u_1$ is the propagation constant in the positive vertical (z) direction in Region 1, $u_2$ is the propagation constant in the vertical (z) direction in Region 2, $\sigma_1$ is the conductivity of Region 1, co is equal to $2\pi f$, where f is a frequency of excitation, $\varepsilon_0$ is the permittivity of free space, $\varepsilon_1$ is the permittivity of Region 1, A is a source constant imposed by the source, and $\gamma$ is a surface wave radial propagation constant.

The propagation constants in the $\pm z$ directions are determined by separating the wave equation above and below the interface between Regions 1 and 2, and imposing the boundary conditions. This exercise gives, in Region 2, $$u_2 = \frac{-jk_o}{\sqrt{1 + (\varepsilon_r - jx)}} \tag{7}$$

and gives, in Region 1, $$u_1 = -u_2(\varepsilon_r - jx). \tag{8}$$

The radial propagation constant $\gamma$ is given by $$\gamma = j\sqrt{k_o^2 + u_2^2} = j\frac{k_o n}{\sqrt{1 + n^2}}, \tag{9}$$

which is a complex expression where n is the complex index of refraction given by $$n = \sqrt{\varepsilon_r - jx}. \tag{10}$$

In all of the above Equations, $$x = \frac{\sigma_1}{\omega\varepsilon_o}, \text{ and} \tag{11}$$

$$k_o = \omega\sqrt{\mu_o\varepsilon_o} = \frac{\lambda_o}{2\pi}, \tag{12}$$

where $\mu_0$ comprises the permeability of free space, $\varepsilon_r$ comprises relative permittivity of Region 1. Thus, the generated surface wave propagates parallel to the interface and exponentially decays vertical to it. This is known as evanescence.

Thus, Equations (1)-(3) can be considered to be a cylindrically-symmetric, radially-propagating waveguide mode. See Barlow, H. M., and Brown, J., *Radio Surface Waves*, Oxford University Press, 1962, pp. 10-12, 29-33. The present disclosure details structures that excite this "open boundary" waveguide mode. Specifically, according to various embodiments, a guided surface waveguide probe is provided with a charge terminal of appropriate size that is fed with voltage and/or current and is positioned relative to the boundary interface between Region 2 and Region 1 to produce the complex Brewster angle at the boundary interface to excite the surface waveguide mode with no or minimal reflection. A compensation terminal of appropriate size can be positioned relative to the charge terminal, and fed with voltage and/or current, to refine the Brewster angle at the boundary interface.

To continue, the Leontovich impedance boundary condition between Region 1 and Region 2 is stated as $$\hat{n}\times\vec{H}_2(\rho,\varphi,0)=\vec{J}, \tag{13}$$

where $\hat{n}$ is a unit normal in the positive vertical (+z) direction and $\vec{H}_2$ is the magnetic field strength in Region 2 expressed by Equation (1) above. Equation (13) implies that the electric and magnetic fields specified in Equations (1)-(3) may result in a radial surface current density along the boundary interface, such radial surface current density being specified by $$J_\rho(\rho')=-A\,H_1^{(2)}(-j\gamma\rho') \tag{14}$$

where A is a constant. Further, it should be noted that close-in to the guided surface waveguide probe (for $\rho \ll \lambda$), Equation (14) above has the behavior $$J_{close}(\rho')=\frac{-A(j2)}{\pi(-j\gamma\rho')}=-H_\phi=-\frac{I_o}{2\pi\rho'}. \tag{15}$$

The negative sign means that when source current ($I_o$) flows vertically upward, the required "close-in" ground current flows radially inward. By field matching on $H_\phi$ "close-in" we find that $$A=-\frac{I_o\gamma}{4} \tag{16}$$

in Equations (1)-(6) and (14). Therefore, the radial surface current density of Equation (14) can be restated as $$J_\rho(\rho')=\frac{I_o\gamma}{4}H_1^{(2)}(-j\gamma\rho'). \tag{17}$$

The fields expressed by Equations (1)-(6) and (17) have the nature of a transmission line mode bound to a lossy interface, not radiation fields such as are associated with groundwave propagation. See Barlow, H. M. and Brown, J., *Radio Surface Waves*, Oxford University Press, 1962, pp. 1-5.

At this point, a review of the nature of the Hankel functions used in Equations (1)-(6) and (17) is provided for these solutions of the wave equation. One might observe that the Hankel functions of the first and second kind and order n are defined as complex combinations of the standard Bessel functions of the first and second kinds $$H_n^{(1)}(x)=J_n(x)+jN_n(x), \text{ and} \tag{18}$$

$$H_n^{(2)}(x)=J_n(x)+jN_n(x), \tag{19}$$

These functions represent cylindrical waves propagating radially inward ($H_n^{(1)}$) and outward ($H_n^{(2)}$), respectively. The definition is analogous to the relationship $e^{\pm jx}=\cos x\pm j \sin x$. See, for example, Harrington, R. F., *Time-Harmonic Fields*, McGraw-Hill, 1961, pp. 460-463.

That $(H_n^{(2)}(k_\rho\rho)$ is an outgoing wave can be recognized from its large argument asymptotic behavior that is obtained directly from the series definitions of $J_n(x)$ and $N_n(x)$. Far-out from the guided surface waveguide probe:

$$H_n^{(2)}(x)\xrightarrow[x\to\infty]{}\sqrt{\frac{2j}{\pi x}}\,j^n e^{-jx}=\sqrt{\frac{2}{\pi x}}\,j^n e^{-j(x-\frac{\pi}{4})}, \tag{20a}$$

which, when multiplied by $e^{j\omega t}$, is an outward propagating cylindrical wave of the form $e^{j(\omega t-k\rho)}$ with a $1/\sqrt{\rho}$ spatial variation. The first order (n=1) solution can be determined from Equation (20a) to be $$H_1^{(2)}(x)\xrightarrow[x\to\infty]{}\sqrt{\frac{2j}{\pi x}}\,e^{-jx}=\sqrt{\frac{2}{\pi x}}\,e^{-j(x-\frac{\pi}{2}-\frac{\pi}{4})}. \tag{20b}$$

Close-in to the guided surface waveguide probe (for $\rho \ll \lambda$), the Hankel function of first order and the second kind behaves as:

$$H_1^{(2)}(x)\xrightarrow[x\to 0]{}\frac{2j}{\pi x}. \tag{21}$$

Note that these asymptotic expressions are complex quantities. When x is a real quantity, Equations (20b) and (21) differ in phase by $\sqrt{j}$, which corresponds to an extra phase advance or "phase boost" of 45° or, equivalently, $\lambda/8$. The close-in and far-out asymptotes of the first order Hankel function of the second kind have a Hankel "crossover" or transition point where they are of equal magnitude at a distance of $\rho=R_x$. The distance to the Hankel crossover point can be found by equating Equations (20b) and (21), and solving for $R_x$. With $x=\sigma/\omega\varepsilon_o$, it can be seen that the far-out and close-in Hankel function asymptotes are frequency dependent, with the Hankel crossover point moving out as the frequency is lowered. It should also be noted that the Hankel function asymptotes may also vary as the conductivity ($\sigma$) of the lossy conducting medium changes. For example, the conductivity of the soil can vary with changes in weather conditions.

Guided surface waveguide probes can be configured to establish an electric field having a wave tilt that corresponds to a wave illuminating the surface of the lossy conducting medium at a complex angle, thereby exciting radial surface currents by substantially mode-matching to a guided surface wave mode at the Hankel crossover point at $R_x$.

Figure 3A:
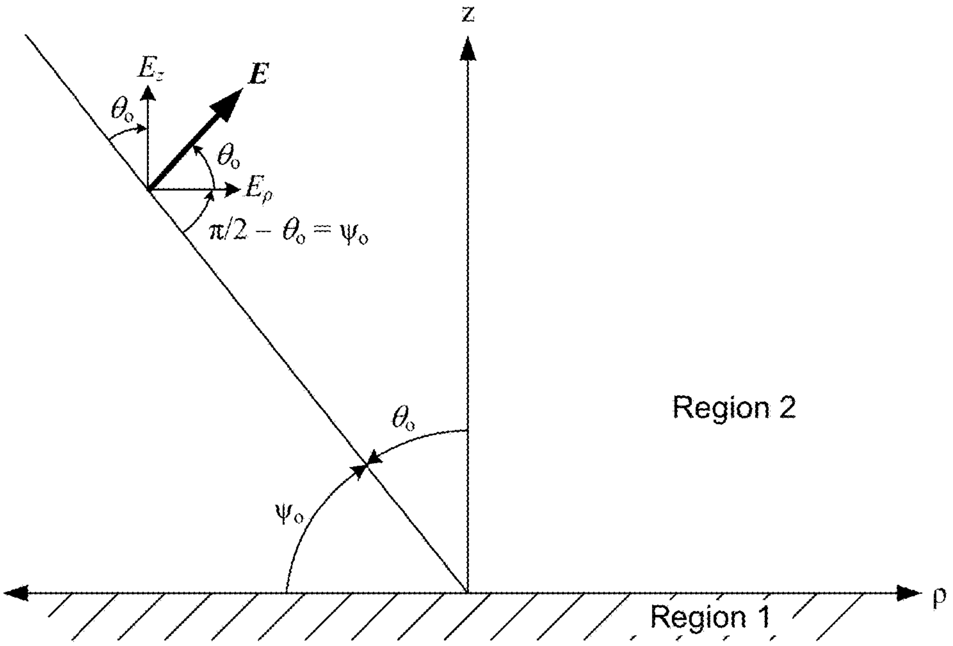
FIGS. 3A and 3B are drawings that illustrate a complex angle of insertion of an electric field synthesized by guided surface waveguide probes according to the various embodiments of the present disclosure.

Referring now to FIG. 3A, shown is a ray optic interpretation of an incident field (E) polarized parallel to a plane of incidence. The electric field vector E is to be synthesized as an incoming non-uniform plane wave, polarized parallel to the plane of incidence. The electric field vector E can be created from independent horizontal and vertical components as:

$$\vec{E}(\theta_o)=E_\rho\hat{\rho}+E_z\hat{z}. \quad (22)$$

Geometrically, the illustration in FIG. 3A suggests that the electric field vector E can be given by:

$$E_\rho(\rho, z) = E(\rho, z)\cos\theta_o, \text{ and} \quad (23a)$$

$$E_z(\rho, z) = E(\rho, z)\cos\left(\frac{\pi}{2} - \theta_o\right) = E(\rho, z)\sin\theta_o, \quad (23b)$$

which means that the field ratio is $$\frac{E_\rho}{E_z} = \tan\psi_o. \quad (24)$$

Using the electric field and magnetic field components from the electric field and magnetic field component solutions, the surface waveguide impedances can be expressed. The radial surface waveguide impedance can be written as $$Z_\rho = \frac{-E_z}{H_\phi} = \frac{\gamma}{j\omega\varepsilon_o}, \quad (25)$$

and the surface-normal impedance can be written as $$Z_z = \frac{-E_\rho}{H_\phi} = \frac{-u_2}{j\omega\varepsilon_o}. \quad (26)$$

A generalized parameter W, called "wave tilt," is noted herein as the ratio of the horizontal electric field component to the vertical electric field component given by $$W = \frac{E_\rho}{E_z} = |W|e^{j\Psi}, \quad (27)$$

which is complex and has both magnitude and phase.

For a TEM wave in Region 2, the wave tilt angle is equal to the angle between the normal of the wave-front at the boundary interface with Region 1 and the tangent to the boundary interface. This may be easier to see in FIG. 3B, which illustrates equi-phase surfaces of a TEM wave and their normals for a radial cylindrical guided surface wave. At the boundary interface (z=0) with a perfect conductor, the wave-front normal is parallel to the tangent of the boundary interface, resulting in W=0. However, in the case of a lossy dielectric, a wave tilt W exists because the wave-front normal is not parallel with the tangent of the boundary interface at z=0.

Figure 3B:
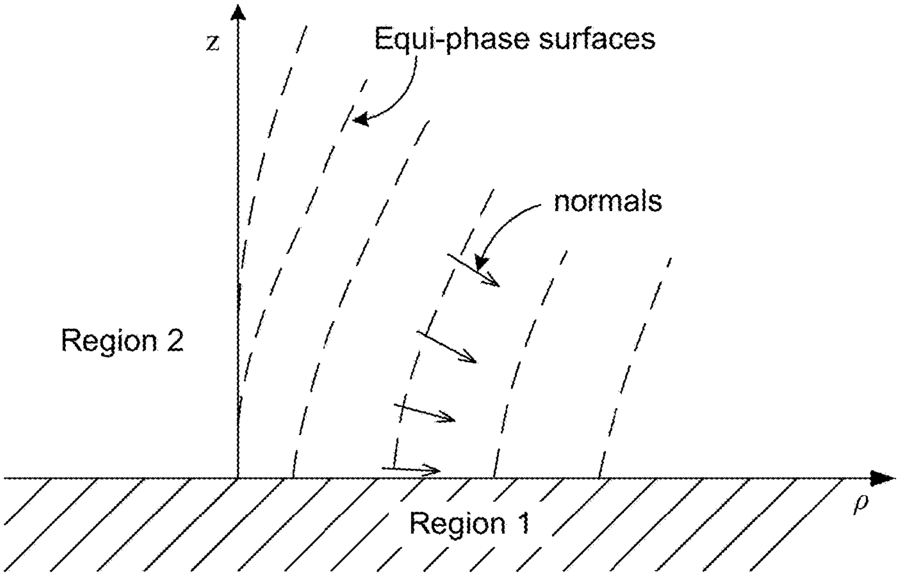
Figure 4:
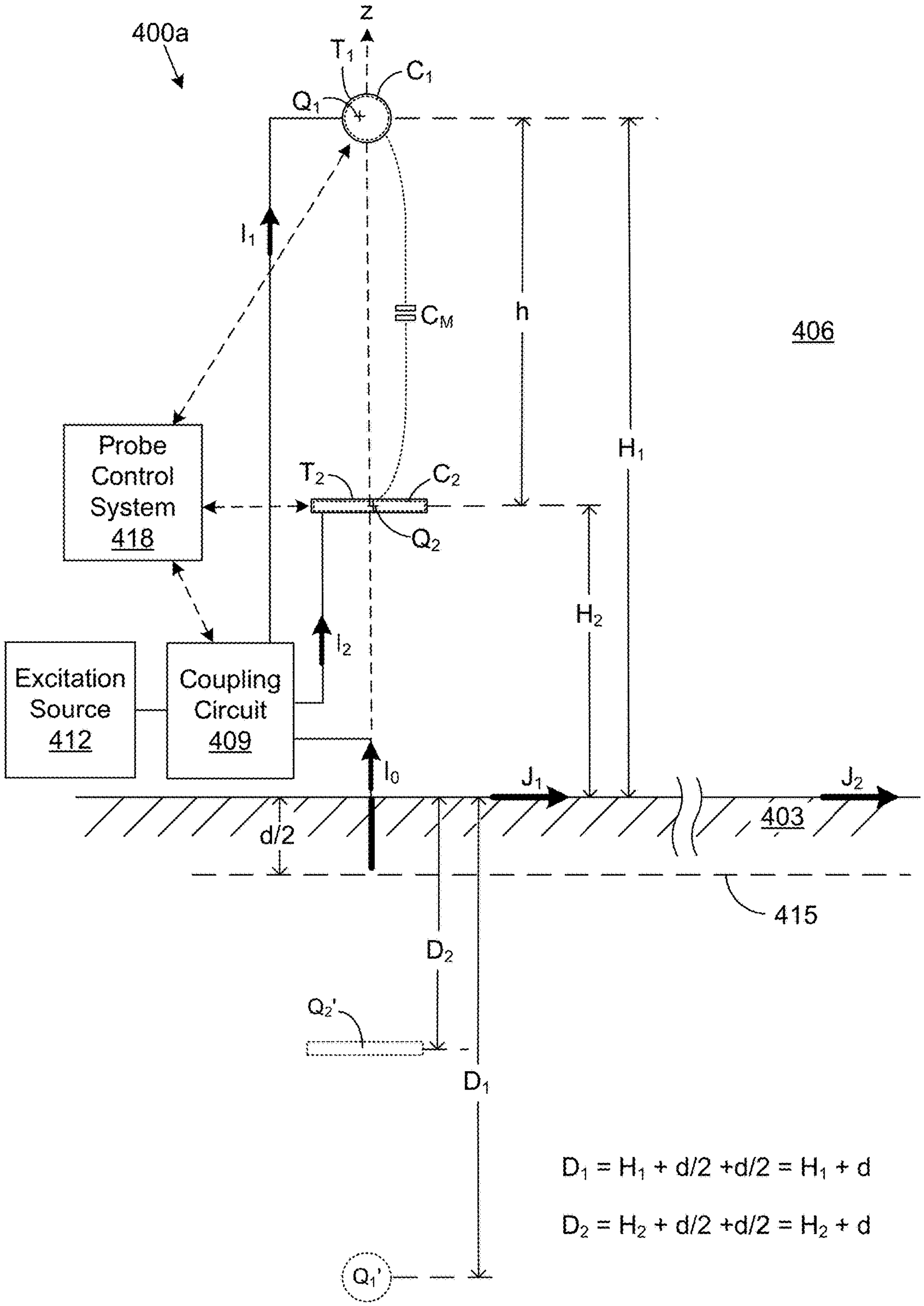
FIG. 4 is a drawing that illustrates a guided surface waveguide probe disposed with respect to a propagation interface of FIG. 2 according to an embodiment of the present disclosure.

This may be better understood with reference to FIG. 4, which shows an example of a guided surface waveguide probe 400*a* that includes an elevated charge terminal $T_1$ and a lower compensation terminal $T_2$ that are arranged along a vertical axis z that is normal to a plane presented by the lossy conducting medium 403. In this respect, the charge terminal $T_1$ is placed directly above the compensation terminal $T_2$ although it is possible that some other arrangement of two or more charge and/or compensation terminals TN can be used. The guided surface waveguide probe 400*a* is disposed above a lossy conducting medium 403 according to an embodiment of the present disclosure. The lossy conducting medium 403 makes up Region 1 (FIGS. 2, 3A and 3B) and a second medium 406 shares a boundary interface with the lossy conducting medium 403 and makes up Region 2 (FIGS. 2, 3A and 3B).

The guided surface waveguide probe 400*a* includes a coupling circuit 409 that couples an excitation source 412 to the charge and compensation terminals $T_1$ and $T_2$. According to various embodiments, charges $Q_1$ and $Q_2$ can be imposed on the respective charge and compensation terminals $T_1$ and $T_2$, depending on the voltages applied to terminals $T_1$ and $T_2$ at any given instant. $I_1$ is the conduction current feeding the charge $Q_1$ on the charge terminal $T_1$, and $I_2$ is the conduction current feeding the charge $Q_2$ on the compensation terminal $T_2$.

The concept of an electrical effective height can be used to provide insight into the construction and operation of the guided surface waveguide probe 400*a*. The electrical effective height ($h_{eff}$) has been defined as $$h_{eff} = \frac{1}{I_o}\int_0^{h_p} I(z)dz \quad (28a)$$

for a monopole with a physical height (or length) of $h_p$, and as $$h_{eff} = \frac{1}{I_o}\int_{-h_p}^{h_p} I(z)dz \quad (28b)$$

for a doublet or dipole. These expressions differ by a factor of 2 since the physical length of a dipole, $2h_p$, is twice the physical height of the monopole, $h_p$. Since the expressions depend upon the magnitude and phase of the source distribution, effective height (or length) is complex in general. The integration of the distributed current I(z) of the monopole antenna structure is performed over the physical height of the structure ($h_p$), and normalized to the ground current ($I_0$) flowing upward through the base (or input) of the structure. The distributed current along the structure can be expressed by $$I(z)=I_C\cos(\beta_0 z), \quad (29)$$

where $\beta_0$ is the propagation factor for free space. In the case of the guided surface waveguide probe 400*a* of FIG. 4, $I_C$ is the current distributed along the vertical structure.

This may be understood using a coupling circuit 409 that includes a low loss coil (e.g., a helical coil) at the bottom of the structure and a supply conductor connected to the charge terminal $T_1$. With a coil or a helical delay line of physical length $l_C$ and a propagation factor of $$\beta_p = \frac{2\pi}{\lambda_p} = \frac{2\pi}{V_f\lambda_0}, \quad (30)$$

where $V_f$ is the velocity factor on the structure, $\lambda_0$ is the wavelength at the supplied frequency, and $\lambda_p$ is the propagation wavelength resulting from any velocity factor $V_f$, the phase delay on the structure is $\Phi=\beta_p l_C$, and the current fed to the top of the coil from the bottom of the physical structure is $$I_C(\beta_p l_C)=I_0 e^{j\Phi}, \tag{31}$$

with the phase $\Phi$ measured relative to the ground (stake) current $I_0$. Consequently, the electrical effective height of the guided surface waveguide probe 400_a_ in FIG. 4 can be approximated by $$h_{eff} = \frac{1}{I_0}\int_0^{h_p} I_0 e^{j\Phi}\cos(\beta_0 z)dz \cong h_p e^{j\Phi}, \tag{32}$$

for the case where the physical height $h_p \ll \lambda_0$, the wavelength at the supplied frequency. A dipole antenna structure may be evaluated in a similar fashion. The complex effective height of a monopole, $h_{eff}=h_p$ at an angle $\Phi$ (or the complex effective length for a dipole $h_{eff}=2h_p e^{j\Phi}$), may be adjusted to cause the source fields to match a guided surface waveguide mode and cause a guided surface wave to be launched on the lossy conducting medium 403.

According to the embodiment of FIG. 4, the charge terminal $T_1$ is positioned over the lossy conducting medium 403 at a physical height $H_1$, and the compensation terminal $T_2$ is positioned directly below $T_1$ along the vertical axis z at a physical height $H_2$, where $H_2$ is less than $H_1$. The height h of the transmission structure may be calculated as $h=H_1-H_2$. The charge terminal $T_1$ has an isolated capacitance $C_1$, and the compensation terminal $T_2$ has an isolated capacitance $C_2$. A mutual capacitance CM can also exist between the terminals $T_1$ and $T_2$ depending on the distance therebetween. During operation, charges $Q_1$ and $Q_2$ are imposed on the charge terminal $T_1$ and compensation terminal $T_2$, respectively, depending on the voltages applied to the charge terminal $T_1$ and compensation terminal $T_2$ at any given instant.

According to one embodiment, the lossy conducting medium 403 comprises a terrestrial medium such as the planet Earth. To this end, such a terrestrial medium comprises all structures or formations included thereon whether natural or man-made. For example, such a terrestrial medium can comprise natural elements such as rock, soil, sand, fresh water, sea water, trees, vegetation, and all other natural elements that make up our planet. In addition, such a terrestrial medium can comprise man-made elements such as concrete, asphalt, building materials, and other man-made materials. In other embodiments, the lossy conducting medium 403 can comprise some medium other than the Earth, whether naturally occurring or man-made. In other embodiments, the lossy conducting medium 403 can comprise other media such as man-made surfaces and structures such as automobiles, aircraft, man-made materials (such as plywood, plastic sheeting, or other materials) or other media.

In the case that the lossy conducting medium 403 comprises a terrestrial medium or Earth, the second medium 406 can comprise the atmosphere above the ground. As such, the atmosphere can be termed an "atmospheric medium" that comprises air and other elements that make up the atmosphere of the Earth. In addition, it is possible that the second medium 406 can comprise other media relative to the lossy conducting medium 403.

Referring back to FIG. 4, the effect of the lossy conducting medium 403 in Region 1 can be examined using image theory analysis. This analysis with respect to the lossy conducting medium assumes the presence of induced effective image charges $Q_1'$ and $Q_2'$ beneath the guided surface waveguide probes coinciding with the charges $Q_1$ and $Q_2$ on the charge and compensation terminals $T_1$ and $T_2$ as illustrated in FIG. 4. Such image charges $Q_1'$ and $Q_2'$ are not merely 180° out of phase with the primary source charges $Q_1$ and $Q_2$ on the charge and compensation terminals $T_1$ and $T_2$, as they would be in the case of a perfect conductor. A lossy conducting medium such as, for example, a terrestrial medium presents phase shifted images. That is to say, the image charges $Q_1'$ and $Q_2'$ are at complex depths. For a discussion of complex images, reference is made to Wait, J. R., "Complex Image Theory—Revisited," *IEEE Antennas and Propagation Magazine*, Vol. 33, No. 4, August 1991, pp. 27-29, which is incorporated herein by reference in its entirety.

Instead of the image charges $Q_1'$ and $Q_2'$ being at a depth that is equal to the physical height ($H_n$) of the charges $Q_1$ and $Q_2$, a conducting image ground plane 415 (representing a perfect conductor) is placed at a complex depth of $z=-d/2$ and the image charges appear at complex depths (i.e., the "depth" has both magnitude and phase), given by $-D_n=-(d/2+d/2+H_n)\neq -H_n$, where n=1, 2, . . . , and for vertically polarized sources, $$d = \frac{2\sqrt{\gamma_e^2+k_0^2}}{\gamma_e^2} \approx \frac{2}{\gamma_e} = d_r + jd_i = |d|\angle\zeta, \tag{33}$$

where $$\gamma_e^2 = j\omega u_1\sigma_1 - \omega^2 u_1\varepsilon_1, \text{ and} \tag{34}$$

$$k_o = \omega\sqrt{u_o\varepsilon_o}\,. \tag{35}$$

as indicated in Equation (12). In the lossy conducting medium, the wave front normal is parallel to the tangent of the conducting image ground plane 415 at $z=-d/2$, and not at the boundary interface between Regions 1 and 2.

The complex spacing of image charges $Q_1'$ and $Q_2'$, in turn, implies that the external fields will experience extra phase shifts not encountered when the interface is either a lossless dielectric or a perfect conductor. The essence of the lossy dielectric image-theory technique is to replace the finitely conducting Earth (or lossy dielectric) by a perfect conductor located at the complex depth, $z=-d/2$ with source images located at complex depths of $D_n=d+H_n$. Thereafter, the fields above ground ($z\geq 0$) can be calculated using a superposition of the physical charge $Q_n$ (at $z=+H_n$) plus its image $Q_n'$ (at $z'=-D_n$).

Given the foregoing discussion, the asymptotes of the radial surface waveguide current at the surface of the lossy conducting medium $J_\rho(\rho)$ can be determined to be $J_1(\rho)$ when close-in and $J_2(\rho)$ when far-out, where $$\text{Close-in}(\rho < \lambda/8): \tag{36}$$

$$J_\rho(\rho) \sim J_1 = \frac{I_1+I_2}{2\pi\rho} + \frac{E_\rho^{QS}(Q_1)+E_\rho^{QS}(Q_2)}{Z_\rho}, \text{ and}$$

$$\text{Far-out}(\rho \gg \lambda/8): \tag{37}$$

$$J_\rho(\rho) \sim J_2 = \frac{j\gamma\omega Q_1}{4} \times \sqrt{\frac{2\gamma}{\pi}} \times \frac{e^{-(\alpha+j\beta)\rho}}{\sqrt{\rho}},$$

where α and β are constants related to the decay and propagation phase of the far-out radial surface current density, respectively. As shown in FIG. 4, $I_1$ is the conduction current feeding the charge $Q_1$ on the elevated charge terminal $T_1$, and $I_2$ is the conduction current feeding the charge $Q_2$ on the lower compensation terminal $T_2$.

According to one embodiment, the shape of the charge terminal $T_1$ is specified to hold as much charge as practically possible. Ultimately, the field strength of a guided surface wave launched by a guided surface waveguide probe 400*a* is directly proportional to the quantity of charge on the terminal $T_1$. In addition, bound capacitances may exist between the respective charge terminal $T_1$ and compensation terminal $T_2$ and the lossy conducting medium 403 depending on the heights of the respective charge terminal $T_1$ and compensation terminal $T_2$ with respect to the lossy conducting medium 403.

The charge $Q_1$ on the upper charge terminal $T_1$ may be determined by $Q_1=C_1V_1$, where $C_1$ is the isolated capacitance of the charge terminal $T_1$ and $V_1$ is the voltage applied to the charge terminal $T_1$. In the example of FIG. 4, the spherical charge terminal $T_1$ can be considered a capacitor, and the compensation terminal $T_2$ can comprise a disk or lower capacitor. However, in other embodiments the terminals $T_1$ and/or $T_2$ can comprise any conductive mass that can hold the electrical charge. For example, the terminals $T_1$ and/or $T_2$ can include any shape such as a sphere, a disk, a cylinder, a cone, a torus, a hood, one or more rings, or any other randomized shape or combination of shapes. If the terminals $T_1$ and/or $T_2$ are spheres or disks, the respective self-capacitance $C_1$ and $C_2$ can be calculated. The capacitance of a sphere at a physical height of h above a perfect ground is given by $$C_{elevated\ sphere}=4\pi\varepsilon_o a(1+M+M^2+M^3+2M^4+3M^5+\dots), \tag{38}$$

where the diameter of the sphere is 2a and $M=a/2h$.

In the case of a sufficiently isolated terminal, the self-capacitance of a conductive sphere can be approximated by $C=4\pi\varepsilon_o a$, where a comprises the radius of the sphere in meters, and the self-capacitance of a disk can be approximated by $C=8\varepsilon_o a$, where a comprises the radius of the disk in meters. Also note that the charge terminal $T_1$ and compensation terminal $T_2$ need not be identical as illustrated in FIG. 4. Each terminal can have a separate size and shape, and include different conducting materials. A probe control system 418 is configured to control the operation of the guided surface waveguide probe 400*a*.

Consider the geometry at the interface with the lossy conducting medium 403, with respect to the charge $Q_1$ on the elevated charge terminal $T_1$. As illustrated in FIG. 3A, the relationship between the field ratio and the wave tilt is $$\frac{E_\rho}{E_z} = \frac{E\sin\psi}{E\cos\psi} = \tan\psi = W = |W|e^{j\Psi}, \text{ and} \tag{39}$$

$$\frac{E_z}{E_\rho} = \frac{E\sin\theta}{E\cos\theta} = \tan\theta = \frac{1}{W} = \frac{1}{|W|}e^{-j\Psi}. \tag{40}$$

For the specific case of a guided surface wave launched in a transmission mode (TM), the wave tilt field ratio is given by $$W = \frac{E_\rho}{E_z} = \frac{u_1}{-j\gamma}\frac{H_1^{(2)}(-j\gamma\rho)}{H_0^{(2)}(-j\gamma\rho)} \cong \frac{1}{n}, \text{ when} \tag{41}$$

-continued $$H_n^{(2)}(x) \xrightarrow[x\to\infty]{} j^n H_0^{(2)}(x).$$

Applying Equation (40) to a guided surface wave gives $$\tan\theta_{i,B} = \frac{E_z}{E_\rho} = \frac{u_2}{\gamma} = \sqrt{\varepsilon_r - jx} = n = \frac{1}{W} = \frac{1}{|W|}e^{-j\Psi}. \tag{42}$$

With the angle of incidence equal to the complex Brewster angle ($\theta_{i,B}$), the reflection coefficient vanishes, as shown by $$\Gamma_{\|}(\theta_{iB}) = \left.\frac{\sqrt{(\varepsilon_r - jx) - \sin^2\theta_i} - (\varepsilon_r - jx)\cos\theta_i}{\sqrt{(\varepsilon_r - jx) - \sin^2\theta_i} + (\varepsilon_r - jx)\cos\theta_i}\right|_{\theta_i=\theta_{i,B}} = 0. \tag{43}$$

By adjusting the complex field ratio, an incident field can be synthesized to be incident at a complex angle at which the reflection is reduced or eliminated. As in optics, minimizing the reflection of the incident electric field can improve and/or maximize the energy coupled into the guided surface waveguide mode of the lossy conducting medium 403. A larger reflection can hinder and/or prevent a guided surface wave from being launched. Establishing this ratio as $n=\sqrt{\varepsilon_r - jx}$ gives an incidence at the complex Brewster angle, making the reflections vanish.

Figure 5:
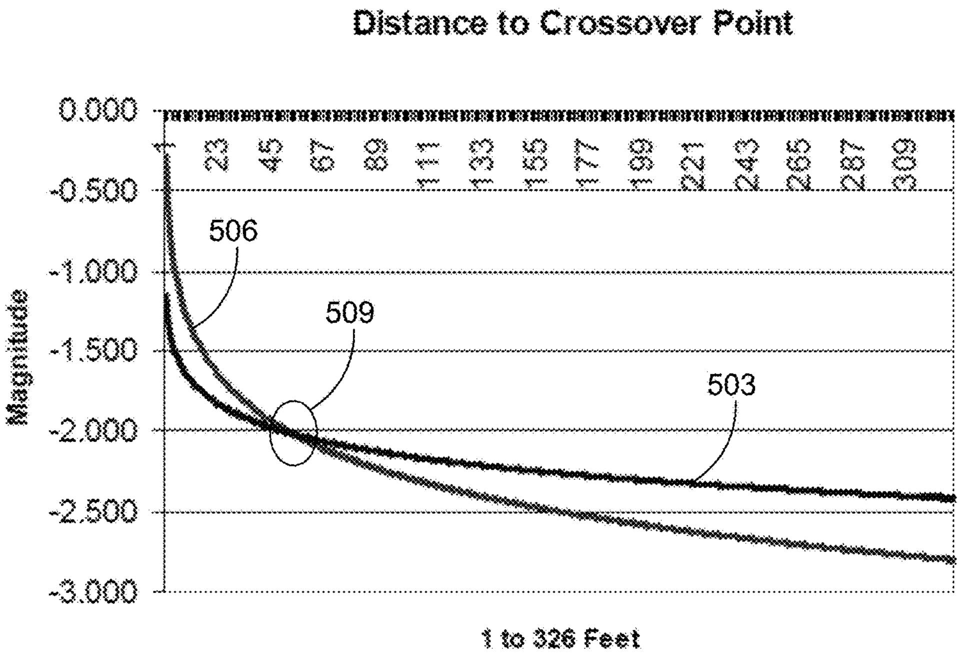
FIG. 5 is a plot of an example of the magnitudes of close-in and far-out asymptotes of first order Hankel functions according to various embodiments of the present disclosure.

Referring to FIG. 5, shown is an example of a plot of the magnitudes of the first order Hankel functions of Equations (20b) and (21) for a Region 1 conductivity of σ=0.010 mhos/m and relative permittivity $\varepsilon_r=15$, at an operating frequency of 1850 kHz. Curve 503 is the magnitude of the far-out asymptote of Equation (20b) and curve 506 is the magnitude of the close-in asymptote of Equation (21), with the Hankel crossover point 509 occurring at a distance of $R_x=54$ feet. While the magnitudes are equal, a phase offset exists between the two asymptotes at the Hankel crossover point 509. According to various embodiments, a guided electromagnetic field can be launched in the form of a guided surface wave along the surface of the lossy conducting medium with little or no reflection by matching the complex Brewster angle ($\theta_{i,B}$) at the Hankel crossover point 509.

Out beyond the Hankel crossover point 509, the large argument asymptote predominates over the "close-in" representation of the Hankel function, and the vertical component of the mode-matched electric field of Equation (3) asymptotically passes to $$E_{2z} \xrightarrow[\rho\to\infty]{} \left(\frac{q_{free}}{\varepsilon_o}\right)\sqrt{\frac{\gamma^3}{8\pi}}\, e^{-u_2 z}\frac{e^{-j(\gamma\rho-\pi/4)}}{\sqrt{\rho}}, \tag{44}$$

which is linearly proportional to free charge on the isolated component of the elevated charge terminal's capacitance at the terminal voltage, $q_{free}=C_{free}\times V_T$. The height $H_1$ of the elevated charge terminal $T_1$ (FIG. 4) affects the amount of free charge on the charge terminal $T_1$. When the charge terminal $T_1$ is near the image ground plane 415 (FIG. 4), most of the charge $Q_1$ on the terminal is "bound" to its image charge. As the charge terminal $T_1$ is elevated, the bound charge is lessened until the charge terminal $T_1$ reaches a height at which substantially all of the isolated charge is free.

The advantage of an increased capacitive elevation for the charge terminal $T_1$ is that the charge on the elevated charge terminal $T_1$ is further removed from the image ground plane 415, resulting in an increased amount of free charge $q_{free}$ to couple energy into the guided surface waveguide mode.

Figure 6A:
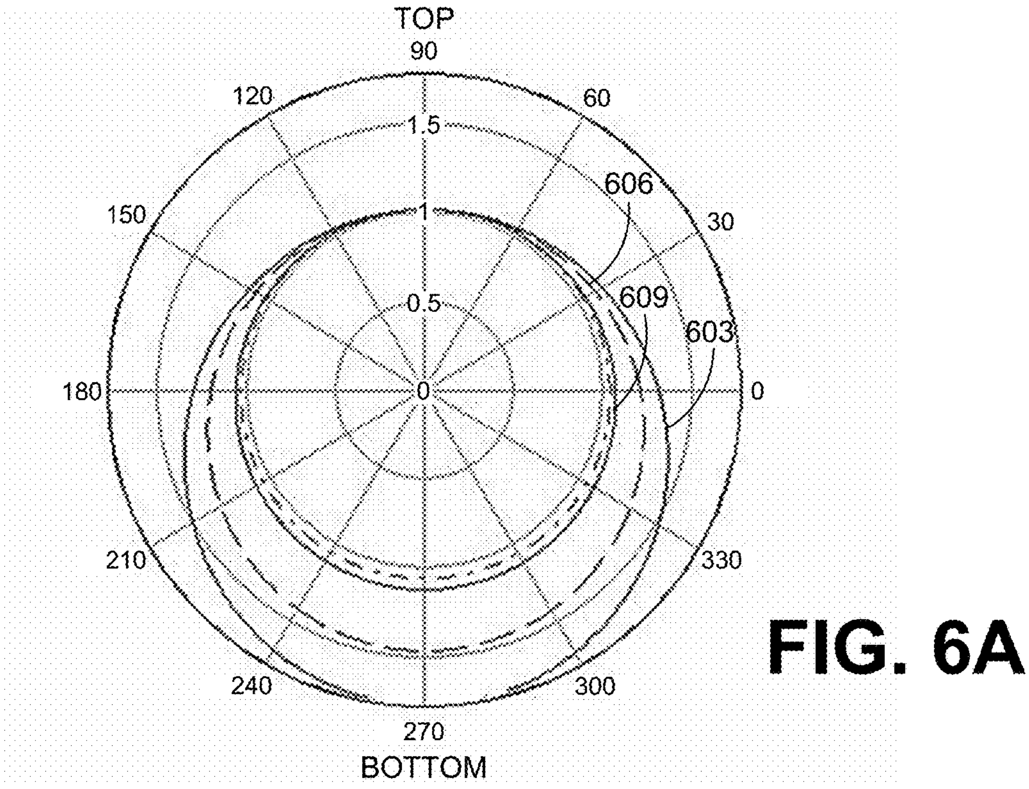
FIGS. 6A and 6B are plots illustrating bound charge on a sphere and the effect on capacitance according to various embodiments of the present disclosure.
Figure 6B:
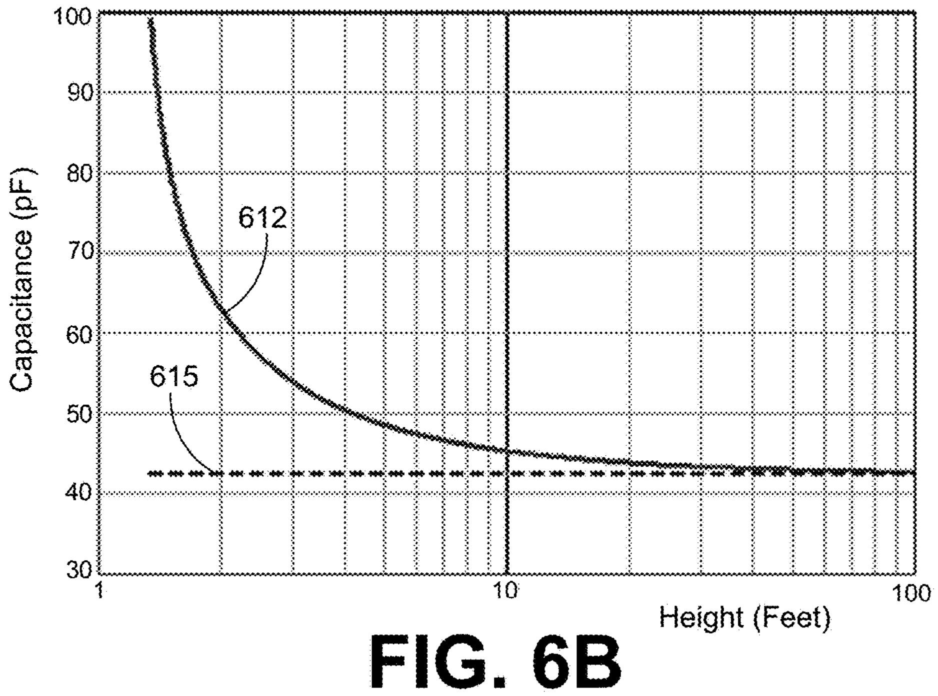

FIGS. 6A and 6B are plots illustrating the effect of elevation (h) on the free charge distribution on a spherical charge terminal with a diameter of D=32 inches. FIG. 6A shows the angular distribution of the charge around the spherical terminal for physical heights of 6 feet (curve 603), 10 feet (curve 606) and 34 feet (curve 609) above a perfect ground plane. As the charge terminal is moved away from the ground plane, the charge distribution becomes more uniformly distributed about the spherical terminal. In FIG. 6B, curve 612 is a plot of the capacitance of the spherical terminal as a function of physical height (h) in feet based upon Equation (38). For a sphere with a diameter of 32 inches, the isolated capacitance ($C_{iso}$) is 45.2 pF, which is illustrated in FIG. 6B as line 615. From FIGS. 6A and 6B, it can be seen that for elevations of the charge terminal $T_1$ that are about four diameters (4D) or greater, the charge distribution is approximately uniform about the spherical terminal, which can improve the coupling into the guided surface waveguide mode. The amount of coupling may be expressed as the efficiency at which a guided surface wave is launched (or "launching efficiency") in the guided surface waveguide mode. A launching efficiency of close to 100% is possible. For example, launching efficiencies of greater than 99%, greater than 98%, greater than 95%, greater than 90%, greater than 85%, greater than 80%, and greater than 75% can be achieved.

Figure 7:
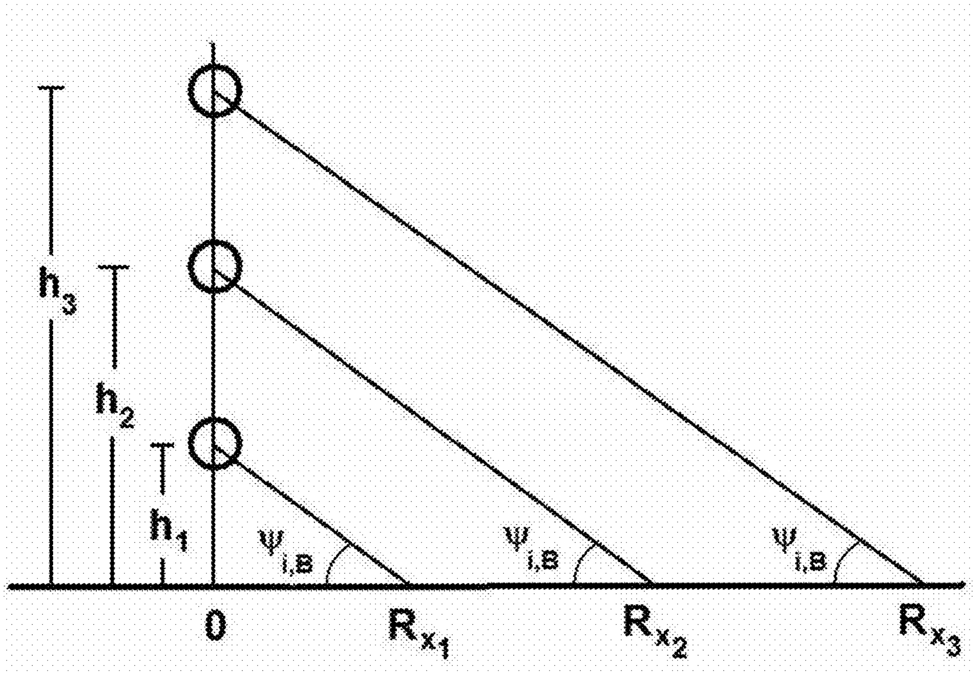
FIG. 7 is a graphical representation illustrating the effect of elevation of a charge terminal on the location where a Brewster angle intersects with the lossy conductive medium according to various embodiments of the present disclosure.

However, with the ray optic interpretation of the incident field (E), at greater charge terminal heights, the rays intersecting the lossy conducting medium at the Brewster angle do so at substantially greater distances from the respective guided surface waveguide probe. FIG. 7 graphically illustrates the effect of increasing the physical height of the sphere on the distance where the electric field is incident at the Brewster angle. As the height is increased from $h_1$ through $h_2$ to $h_3$, the point where the electric field intersects with the lossy conducting medium (e.g., the earth) at the Brewster angle moves further away from the charge. The weaker electric field strength resulting from geometric spreading at these greater distances reduces the effectiveness of coupling into the guided surface waveguide mode. Stated another way, the efficiency at which a guided surface wave is launched (or the "launching efficiency") is reduced. However, compensation can be provided that reduces the distance at which the electric field is incident with the lossy conducting medium at the Brewster angle as will be described.

Figure 8A:
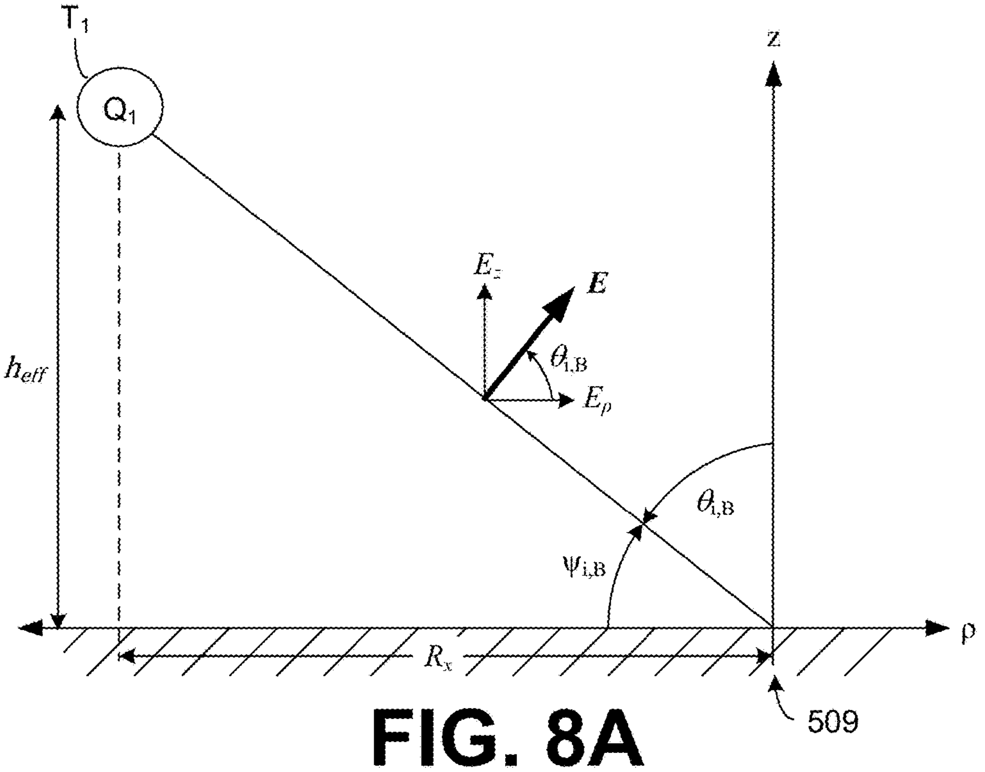
FIGS. 8A and 8B are graphical representations illustrating the incidence of a synthesized electric field at a complex Brewster angle to match the guided surface waveguide mode at the Hankel crossover distance according to various embodiments of the present disclosure.

Referring now to FIG. 8A, an example of the complex angle trigonometry is shown for the ray optic interpretation of the incident electric field (E) of the charge terminal $T_1$ with a complex Brewster angle ($\theta_{i,B}$) at the Hankel crossover distance ($R_x$). Recall from Equation (42) that, for a lossy conducting medium, the Brewster angle is complex and specified by $$\tan\theta_{i,B} = \sqrt{\varepsilon_r - j\frac{\sigma}{\omega\varepsilon_o}} = n. \tag{45}$$

Electrically, the geometric parameters are related by the electrical effective height ($h_{eff}$) of the charge terminal $T_1$ by $$R_x \tan\psi_{i,B} = R_x \times W = h_{eff} = h_p e^{j\Phi}, \tag{46}$$

where $\psi_{i,B}=(\pi/2)-\theta_{i,B}$ is the Brewster angle measured from the surface of the lossy conducting medium. To couple into the guided surface waveguide mode, the wave tilt of the electric field at the Hankel crossover distance can be expressed as the ratio of the electrical effective height and the Hankel crossover distance $$\frac{h_{eff}}{R_x} = \tan\psi_{i,B} = W_{Rx}. \tag{47}$$

Since both the physical height ($h_p$) and the Hankel crossover distance ($R_x$) are real quantities, the angle of the desired guided surface wave tilt at the Hankel crossover distance ($W_{Rx}$) is equal to the phase ($\Phi$) of the complex effective height ($h_{eff}$). This implies that by varying the phase at the supply point of the coil, and thus the phase shift in Equation (32), the complex effective height can be manipulated and the wave tilt adjusted to synthetically match the guided surface waveguide mode at the Hankel crossover point 509.

In FIG. 8A, a right triangle is depicted having an adjacent side of length $R_x$ along the lossy conducting medium surface and a complex Brewster angle $\psi_{i,B}$ measured between a ray extending between the Hankel crossover point at $R_x$ and the center of the charge terminal $T_1$, and the lossy conducting medium surface between the Hankel crossover point and the charge terminal With the charge terminal $T_1$ positioned at physical height $h_p$ and excited with a charge having the appropriate phase $\Phi$, the resulting electric field is incident with the lossy conducting medium boundary interface at the Hankel crossover distance $R_x$, and at the Brewster angle. Under these conditions, the guided surface waveguide mode can be excited without reflection or substantially negligible reflection.

However, Equation (46) means that the physical height of the guided surface waveguide probe 400*a* (FIG. 4) can be relatively small. While this will excite the guided surface waveguide mode, the proximity of the elevated charge $Q_1$ to its mirror image $Q_1'$ (see FIG. 4) can result in an unduly large bound charge with little free charge. To compensate, the charge terminal $T_1$ can be raised to an appropriate elevation to increase the amount of free charge. As one example rule of thumb, the charge terminal $T_1$ can be positioned at an elevation of about 4-5 times (or more) the effective diameter of the charge terminal $T_1$. The challenge is that as the charge terminal height increases, the rays intersecting the lossy conductive medium at the Brewster angle do so at greater distances as shown in FIG. 7, where the electric field is weaker by a factor of $\sqrt{R_x/R_{xn}}$.

Figure 8B:
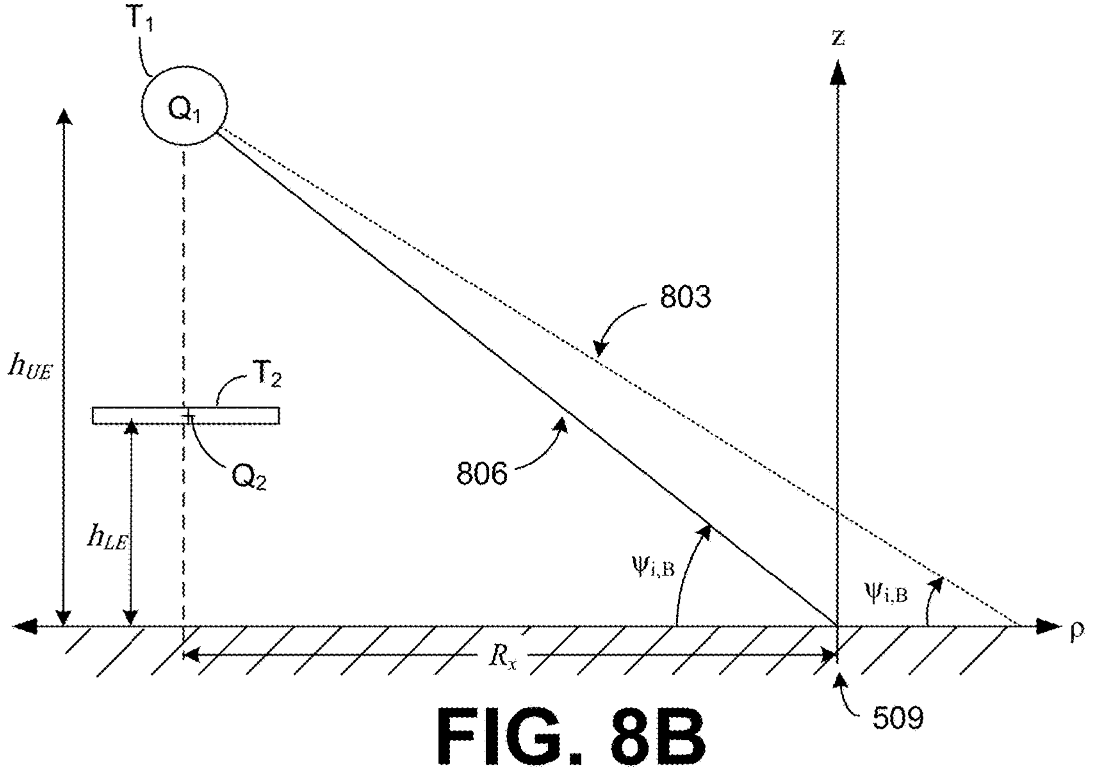

FIG. 8B illustrates the effect of raising the charge terminal $T_1$ above the height of FIG. 8A. The increased elevation causes the distance at which the wave tilt is incident with the lossy conductive medium to move beyond the Hankel crossover point 509. To improve coupling in the guide surface waveguide mode, and thus provide for a greater launching efficiency of the guided surface wave, a lower compensation terminal $T_2$ can be used to adjust the total effective height ($h_{TE}$) of the charge terminal $T_1$ such that the wave tilt at the Hankel crossover distance is at the Brewster angle. For example, if the charge terminal $T_1$ has been elevated to a height where the electric field intersects with the lossy conductive medium at the Brewster angle at a distance greater than the Hankel crossover point 509, as illustrated by line 803, then the compensation terminal $T_2$ can be used to adjust $h_{TE}$ by compensating for the increased height. The effect of the compensation terminal $T_2$ is to reduce the electrical effective height of the guided surface waveguide probe (or effectively raise the lossy medium interface) such that the wave tilt at the Hankel crossover distance is at the Brewster angle, as illustrated by line 806.

The total effective height can be written as the superposition of an upper effective height ($h_{UE}$) associated with the charge terminal $T_1$ and a lower effective height ($h_{LE}$) associated with the compensation terminal $T_2$ such that $$h_{TE}=h_{UE}+h_{LE}=h_p e^{j(\beta h_p+\Phi_U)}+h_d e^{j(\beta h_d+\Phi_L)}=R_x \times W, \quad (48)$$

where $\Phi_U$ is the phase delay applied to the upper charge terminal $T_1$, $\Phi_L$ is the phase delay applied to the lower compensation terminal $T_2$, and $\beta=2\pi/\lambda_p$ is the propagation factor from Equation (30). If extra lead lengths are taken into consideration, they can be accounted for by adding the charge terminal lead length z to the physical height $h_p$ of the charge terminal $T_1$ and the compensation terminal lead length y to the physical height $h_d$ of the compensation terminal $T_2$ as shown in $$h_{TE}=(h_p+z)e^{j(\beta(h_p+z)+\Phi_U)}+(h_d+y)e^{j(\beta(h_d+y)+\Phi_L)}=R_x \times W, \quad (49)$$

The lower effective height can be used to adjust the total effective height ($h_{TE}$) to equal the complex effective height ($h_{eff}$) of FIG. 8A.

Equations (48) or (49) can be used to determine the physical height of the lower disk of the compensation terminal $T_2$ and the phase angles to feed the terminals in order to obtain the desired wave tilt at the Hankel crossover distance. For example, Equation (49) can be rewritten as the phase shift applied to the charge terminal $T_1$ as a function of the compensation terminal height ($h_d$) to give $$\Phi_U(h_d) = -\beta(h_p+z) - j\ln\left(\frac{R_x \times W - (h_d+y)e^{j(\beta h_d+\beta y+\Phi_L)}}{(h_p+z)}\right). \quad (50)$$

To determine the positioning of the compensation terminal $T_2$, the relationships discussed above can be utilized. First, the total effective height ($h_{TE}$) is the superposition of the complex effective height ($h_{UE}$) of the upper charge terminal $T_1$ and the complex effective height ($h_{LE}$) of the lower compensation terminal $T_2$ as expressed in Equation (49). Next, the tangent of the angle of incidence can be expressed geometrically as $$\tan\psi_E = \frac{h_{TE}}{R_x}, \quad (51)$$

which is the definition of the wave tilt, W. Finally, given the desired Hankel crossover distance $R_x$, the $h_{TE}$ can be adjusted to make the wave tilt of the incident electric field match the complex Brewster angle at the Hankel crossover point 509. This can be accomplished by adjusting $h_p$, $\Phi_U$, and/or $h_d$.

Figure 9A:
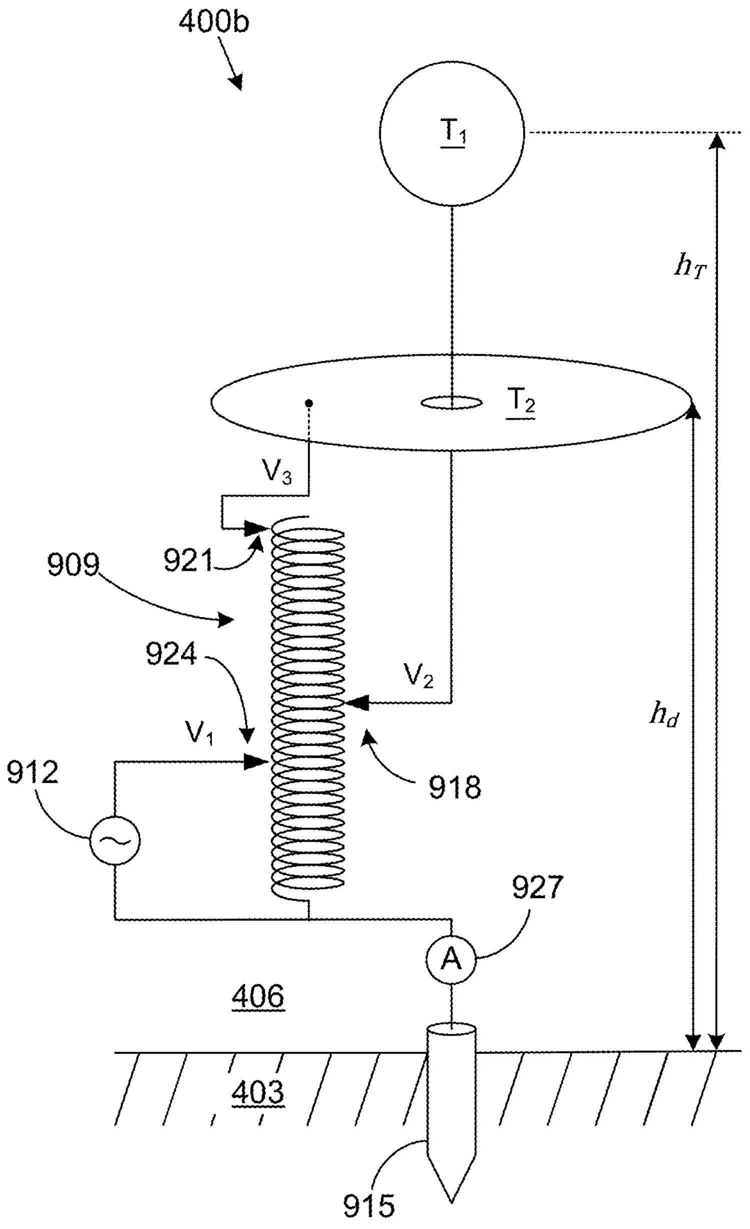
FIGS. 9A and 9B are graphical representations of examples of a guided surface waveguide probe according to an embodiment of the present disclosure.
Figure 9B:
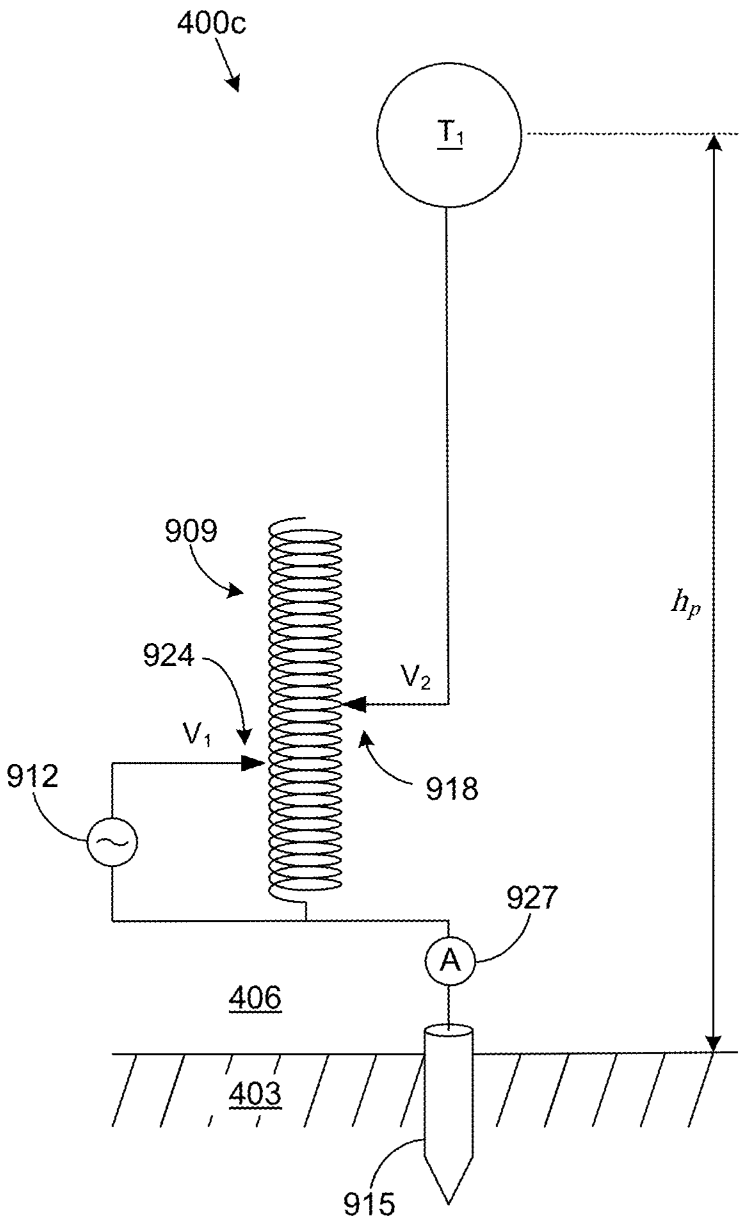

These concepts may be better understood when discussed in the context of an example of a guided surface waveguide probe. Referring to FIGS. 9A and 9B, shown are graphical representations of examples of guided surface waveguide probes 400*b* and 400*c* that include a charge terminal $T_1$. An AC source 912 acts as the excitation source (412 of FIG. 4) for the charge terminal which is coupled to the guided surface waveguide probe 400*b* through a coupling circuit (409 of FIG. 4) comprising a coil 909 such as, e.g., a helical coil. As shown in FIG. 9A, the guided surface waveguide probe 400*b* can include the upper charge terminal $T_1$ (e.g., a sphere at height $h_T$) and a lower compensation terminal $T_2$ (e.g., a disk at height $h_d$) that are positioned along a vertical axis z that is substantially normal to the plane presented by the lossy conducting medium 403. A second medium 406 is located above the lossy conducting medium 403. The charge terminal $T_1$ has a self-capacitance $C_p$, and the compensation terminal $T_2$ has a self-capacitance $C_d$. During operation, charges $Q_1$ and $Q_2$ are imposed on the terminals $T_1$ and $T_2$, respectively, depending on the voltages applied to the terminals $T_1$ and $T_2$ at any given instant.

In the example of FIG. 9A, the coil 909 is coupled to a ground stake 915 at a first end and the compensation terminal $T_2$ at a second end. In some implementations, the connection to the compensation terminal $T_2$ can be adjusted using a tap 921 at the second end of the coil 909 as shown in FIG. 9A. The coil 909 can be energized at an operating frequency by the AC source 912 through a tap 924 at a lower portion of the coil 909. In other implementations, the AC source 912 can be inductively coupled to the coil 909 through a primary coil. The charge terminal $T_1$ is energized through a tap 918 coupled to the coil 909. An ammeter 927 located between the coil 909 and ground stake 915 can be used to provide an indication of the magnitude of the current flow at the base of the guided surface waveguide probe. Alternatively, a current clamp may be used around the conductor coupled to the ground stake 915 to obtain an indication of the magnitude of the current flow. The compensation terminal $T_2$ is positioned above and substantially parallel with the lossy conducting medium 403 (e.g., the ground).

The construction and adjustment of the guided surface waveguide probe 400 is based upon various operating conditions, such as the transmission frequency, conditions of the lossy conductive medium (e.g., soil conductivity a and relative permittivity $\varepsilon_r$), and size of the charge terminal $T_1$. The index of refraction can be calculated from Equations (10) and (11) as $$n=\sqrt{\varepsilon_r - jx}, \quad (52)$$

where $x=\sigma/\omega\varepsilon_o$ with $\omega=2\pi f$, and complex Brewster angle ($\theta_{i,B}$) measured from the surface normal can be determined from Equation (42) as $$\theta_{i,B}=\arctan(\sqrt{\varepsilon_r - jx}), \quad (53)$$

or measured from the surface as shown in FIG. 8A as $$\psi_{i,B} = \frac{\pi}{2} - \theta_{i,B}. \quad (54)$$

The wave tilt at the Hankel crossover distance can also be found using Equation (47).

The Hankel crossover distance can also be found by equating Equations (20b) and (21), and solving for $R_x$. The electrical effective height can then be determined from Equation (46) using the Hankel crossover distance and the complex Brewster angle as $$h_{eff}=R_x \tan \psi_{i,B}=h_p e^{j\Phi}. \quad (55)$$

As can be seen from Equation (55), the complex effective height ($h_{eff}$) includes a magnitude that is associated with the physical height ($h_p$) of charge terminal $T_1$ and a phase ($\Phi$) that is to be associated with the angle of the wave tilt at the Hankel crossover distance ($\psi$). With these variables and the selected charge terminal $T_1$ configuration, it is possible to determine the configuration of a guided surface waveguide probe 400.

With the selected charge terminal $T_1$ configuration, a spherical diameter (or the effective spherical diameter) can be determined. For example, if the charge terminal $T_1$ is not configured as a sphere, then the terminal configuration may be modeled as a spherical capacitance having an effective spherical diameter. The size of the charge terminal $T_1$ can be chosen to provide a sufficiently large surface for the charge $Q_1$ imposed on the terminals. In general, it is desirable to make the charge terminal $T_1$ as large as practical. The size of the charge terminal $T_1$ should be large enough to avoid ionization of the surrounding air, which can result in electrical discharge or sparking around the charge terminal. As previously discussed with respect to FIGS. 6A and 6B, to reduce the amount of bound charge on the charge terminal $T_1$, the desired elevation of the charge terminal $T_1$ should be 4-5 times the effective spherical diameter (or more). If the elevation of the charge terminal $T_1$ is less than the physical height ($h_p$) indicated by the complex effective height ($h_{eff}$) determined using Equation (55), then the charge terminal $T_1$ should be positioned at a physical height of $h_T=h_p$ above the lossy conductive medium (e.g., the earth). If the charge terminal $T_1$ is located at $h_p$, then a guided surface wave tilt can be produced at the Hankel crossover distance ($R_x$) without the use of a compensation terminal $T_2$. FIG. 9B illustrates an example of the guided surface waveguide probe 400*c* without a compensation terminal $T_2$.

Referring back to FIG. 9A, a compensation terminal $T_2$ can be included when the elevation of the charge terminal $T_1$ is greater than the physical height ($h_p$) indicated by the determined complex effective height ($h_{eff}$). As discussed with respect to FIG. 8B, the compensation terminal $T_2$ can be used to adjust the total effective height ($h_{TE}$) of the guided surface waveguide probe 400 to excite an electric field having a guided surface wave tilt at $R_x$. The compensation terminal $T_2$ can be positioned below the charge terminal $T_1$ at a physical height of $h_d=h_T-h_p$, where $h_T$ is the total physical height of the charge terminal $T_1$. With the position of the compensation terminal $T_2$ fixed and the phase delay $\Phi_L$ applied to the lower compensation terminal $T_2$, the phase delay $\Phi_U$ applied to the upper charge terminal $T_1$ can be determined using Equation (50).

When installing a guided surface waveguide probe 400, the phase delays $\Phi_U$ and $\Phi_L$ of Equations (48)-(50) may be adjusted as follows. Initially, the complex effective height ($h_{eff}$) and the Hankel crossover distance ($R_x$) are determined for the operational frequency ($f_o$). To minimize bound capacitance and corresponding bound charge, the upper charge terminal $T_1$ is positioned at a total physical height ($h_T$) that is at least four times the spherical diameter (or equivalent spherical diameter) of the charge terminal $T_1$. Note that, at the same time, the upper charge terminal $T_1$ should also be positioned at a height that is at least the magnitude ($h_p$) of the complex effective height ($h_{eff}$). If $h_T>h_p$, then the lower compensation terminal $T_2$ can be positioned at a physical height of $h_d=h_T-h_p$ as shown in FIG. 9A. The compensation terminal $T_2$ can then be coupled to the coil 909, where the upper charge terminal $T_1$ is not yet coupled to the coil 909. The AC source 912 is coupled to the coil 909 in such a manner so as to minimize reflection and maximize coupling into the coil 909. To this end, the AC source 912 may be coupled to the coil 909 at an appropriate point such as at the 50Ω point to maximize coupling. In some embodiments, the AC source 912 may be coupled to the coil 909 via an impedance matching network. For example, a simple L-network comprising capacitors (e.g., tapped or variable) and/or a capacitor/inductor combination (e.g., tapped or variable) can be matched to the operational frequency so that the AC source 912 sees a 50Ω load when coupled to the coil 909. The compensation terminal $T_2$ can then be adjusted for parallel resonance with at least a portion of the coil at the frequency of operation. For example, the tap 921 at the second end of the coil 909 may be repositioned. While adjusting the compensation terminal circuit for resonance aids the subsequent adjustment of the charge terminal connection, it is not necessary to establish the guided surface wave tilt ($W_{Rx}$) at the Hankel crossover distance ($R_x$). The upper charge terminal $T_1$ may then be coupled to the coil 909.

Figure 10:
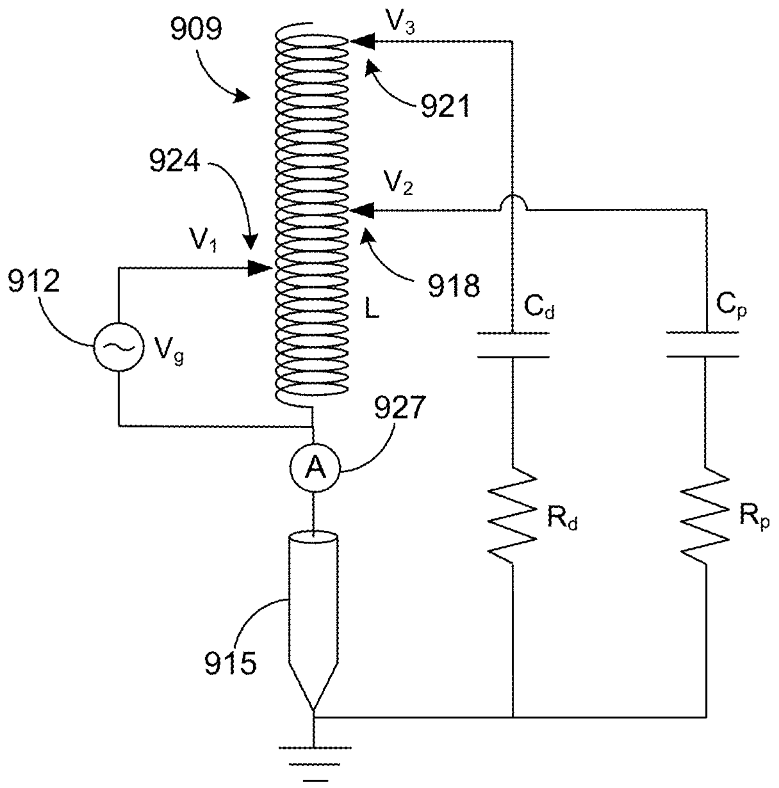
FIG. 10 is a schematic diagram of the guided surface waveguide probe of FIG. 9A according to an embodiment of the present disclosure.

In this context, FIG. 10 shows a schematic diagram of the general electrical hookup of FIG. 9A in which $V_1$ is the voltage applied to the lower portion of the coil 909 from the AC source 912 through tap 924, $V_2$ is the voltage at tap 918 that is supplied to the upper charge terminal $T_1$, and $V_3$ is the voltage applied to the lower compensation terminal $T_2$ through tap 921. The resistances $R_p$ and $R_d$ represent the ground return resistances of the charge terminal $T_1$ and compensation terminal $T_2$, respectively. The charge and compensation terminals $T_1$ and $T_2$ may be configured as spheres, cylinders, toroids, rings, hoods, or any other combination of capacitive structures. The size of the charge and compensation terminals $T_1$ and $T_2$ can be chosen to provide a sufficiently large surface for the charges $Q_1$ and $Q_2$ imposed on the terminals. In general, it is desirable to make the charge terminal $T_1$ as large as practical. The size of the charge terminal $T_1$ should be large enough to avoid ionization of the surrounding air, which can result in electrical discharge or sparking around the charge terminal. The self-capacitance $C_p$ and $C_d$ can be determined for the sphere and disk as disclosed, for example, with respect to Equation (38).

As can be seen in FIG. 10, a resonant circuit is formed by at least a portion of the inductance of the coil 909, the self-capacitance $C_d$ of the compensation terminal $T_2$, and the ground return resistance $R_d$ associated with the compensation terminal $T_2$. The parallel resonance can be established by adjusting the voltage $V_3$ applied to the compensation terminal $T_2$ (e.g., by adjusting a tap 921 position on the coil 909) or by adjusting the height and/or size of the compensation terminal $T_2$ to adjust $C_d$. The position of the coil tap 921 can be adjusted for parallel resonance, which will result in the ground current through the ground stake 915 and through the ammeter 927 reaching a maximum point. After parallel resonance of the compensation terminal $T_2$ has been established, the position of the tap 924 for the AC source 912 can be adjusted to the 50Ω point on the coil 909.

Voltage $V_2$ from the coil 909 may then be applied to the charge terminal $T_1$ through the tap 918. The position of tap 918 can be adjusted such that the phase (Φ) of the total effective height ($h_{TE}$) approximately equals the angle of the guided surface wave tilt (Ψ) at the Hankel crossover distance ($R_x$). The position of the coil tap 918 is adjusted until this operating point is reached, which results in the ground current through the ammeter 927 increasing to a maximum. At this point, the resultant fields excited by the guided surface waveguide probe 400*b* (FIG. 9A) are substantially mode-matched to a guided surface waveguide mode on the surface of the lossy conducting medium 403, resulting in the launching of a guided surface wave along the surface of the lossy conducting medium 403 (FIGS. 4, 9A, 9B). This can be verified by measuring field strength along a radial extending from the guided surface waveguide probe 400 (FIGS. 4, 9A, 9B). Resonance of the circuit including the compensation terminal $T_2$ may change with the attachment of the charge terminal $T_1$ and/or with adjustment of the voltage applied to the charge terminal $T_1$ through tap 921. While adjusting the compensation terminal circuit for resonance aids the subsequent adjustment of the charge terminal connection, it is not necessary to establish the guided surface wave tilt ($W_{Rx}$) at the Hankel crossover distance ($R_x$). The system may be further adjusted to improve coupling by iteratively adjusting the position of the tap 924 for the AC source 912 to be at the 50Ω point on the coil 909 and adjusting the position of tap 918 to maximize the ground current through the ammeter 927. Resonance of the circuit including the compensation terminal $T_2$ may drift as the positions of taps 918 and 924 are adjusted, or when other components are attached to the coil 909.

If $h_T \leq h_p$, then a compensation terminal $T_2$ is not needed to adjust the total effective height ($h_{TE}$) of the guided surface waveguide probe 400*c* as shown in FIG. 9B. With the charge terminal positioned at $h_p$, the voltage $V_2$ can be applied to the charge terminal $T_1$ from the coil 909 through the tap 918. The position of tap 918 that results in the phase (Φ) of the total effective height ($h_{TE}$) approximately equal to the angle of the guided surface wave tilt (Ψ) at the Hankel crossover distance ($R_x$) can then be determined. The position of the coil tap 918 is adjusted until this operating point is reached, which results in the ground current through the ammeter 927 increasing to a maximum. At that point, the resultant fields are substantially mode-matched to the guided surface waveguide mode on the surface of the lossy conducting medium 403, thereby launching the guided surface wave along the surface of the lossy conducting medium 403. This can be verified by measuring field strength along a radial extending from the guided surface waveguide probe 400. The system may be further adjusted to improve coupling by iteratively adjusting the position of the tap 924 for the AC source 912 to be at the 50Ω point on the coil 909 and adjusting the position of tap 918 to maximize the ground current through the ammeter 927.

In one experimental example, a guided surface waveguide probe 400*b* was constructed to verify the operation of the proposed structure at 1.879 MHz. The soil conductivity at the site of the guided surface waveguide probe 400*b* was determined to be σ=0.0053 mhos/m and the relative permittivity was $\varepsilon_r$=28. Using these values, the index of refraction given by Equation (52) was determined to be n=6.555−j3.869. Based upon Equations (53) and (54), the complex Brewster angle was found to be $\theta_{i,B}$=83.517−j3.783 degrees, or $\psi_{i,B}$=6.483+j3.783 degrees.

Using Equation (47), the guided surface wave tilt was calculated as $W_{Rx}=0.113+j0.067=0.131\ e^{j(30.551°)}$. A Hankel crossover distance of $R_x$=54 feet was found by equating Equations (20b) and (21), and solving for $R_x$. Using Equation (55), the complex effective height ($h_{eff}=h_p e^{j\Phi}$) was determined to be $h_p$=7.094 feet (relative to the lossy conducting medium) and Φ=30.551 degrees (relative to the ground current). Note that the phase Φ is equal to the argument of the guided surface wave tilt T. However, the physical height of $h_p$=7.094 feet is relatively small. While this will excite a guided surface waveguide mode, the proximity of the elevated charge terminal $T_1$ to the earth (and its mirror image) will result in a large amount of bound charge and very little free charge. Since the guided surface wave field strength is proportional to the free charge on the charge terminal, an increased elevation was desirable.

Figure 11:
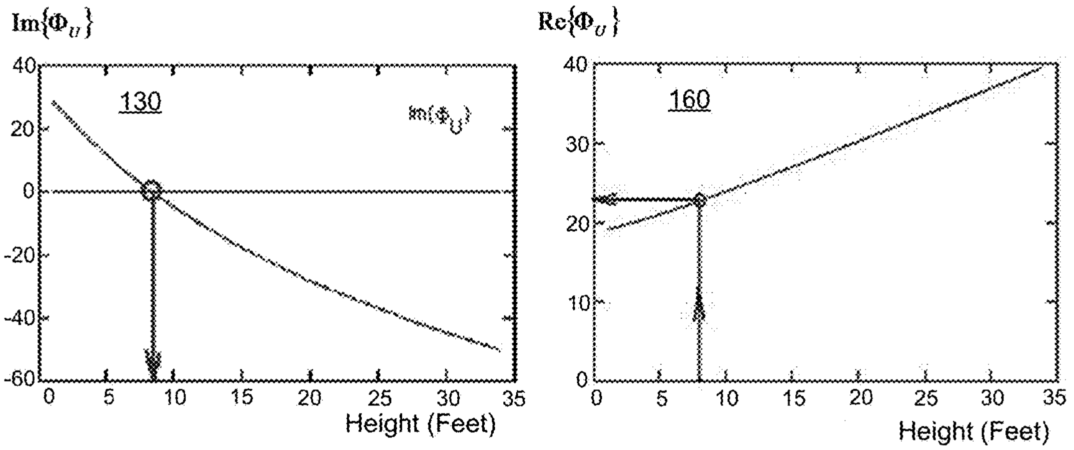
FIG. 11 includes plots of an example of the imaginary and real parts of a phase delay ($\Phi_U$) of a charge terminal $T_1$ of a guided surface waveguide probe of FIG. 9A according to an embodiment of the present disclosure.

To increase the amount of free charge, the physical height of the charge terminal $T_1$ was set to be $h_p$=17 feet, with the compensation terminal $T_2$ positioned below the charge terminal $T_1$. The extra lead lengths for connections were approximately y=2.7 feet and z=1 foot. Using these values, the height of the compensation terminal $T_2$ ($h_d$) was determined using Equation (50). This is graphically illustrated in FIG. 11, which shows plots 130 and 160 of the imaginary and real parts of $\Phi_U$, respectively. The compensation terminal $T_2$ is positioned at a height $h_d$ where $\{\Phi_U\}$=0, as graphically illustrated in plot 130. In this case, setting the imaginary part to zero gives a height of $h_d$=8.25 feet. At this fixed height, the coil phase $\Phi_U$ can be determined from $\mathrm{Re}\{\Phi_U\}$ as +22.84 degrees, as graphically illustrated in plot 160.

As previously discussed, the total effective height is the superposition of the upper effective height ($h_{UE}$) associated with the charge terminal $T_1$ and the lower effective height ($h_{LE}$) associated with the compensation terminal $T_2$ as expressed in Equation (49). With the coil tap adjusted to 22.84 degrees, the complex upper effective height is given as $h_{UE}$=

$$h_{UE}=(h_p+z)e^{j(\beta(h_p+z)+\Phi_U)}=14.711+j10.832 \qquad (56)$$

(or 18.006 at 35.21°) and the complex lower effective height is given as $$h_{LE}=(h_d+y)e^{j(\beta(h_d+y)+\Phi_L)}=8.602+j6.776 \qquad (57)$$

(or 10.950 at)−141.773°. The total effective height ($h_{TE}$) is the superposition of these two values, which gives $$h_{TE}=h_{UE}+h_{LE}=6.109-j3.606=7.094e^{j(30.551°)}. \qquad (58)$$

As can be seen, the coil phase matches the calculated angle of the guided surface wave tilt, $W_{Rx}$. The guided surface waveguide probe can then be adjusted to maximize the ground current. As previously discussed with respect to FIG. 9A, the guided surface waveguide mode coupling can be improved by iteratively adjusting the position of the tap 924 for the AC source 912 to be at the 50Ω point on the coil 909 and adjusting the position of tap 918 to maximize the ground current through the ammeter 927.

Figure 12:
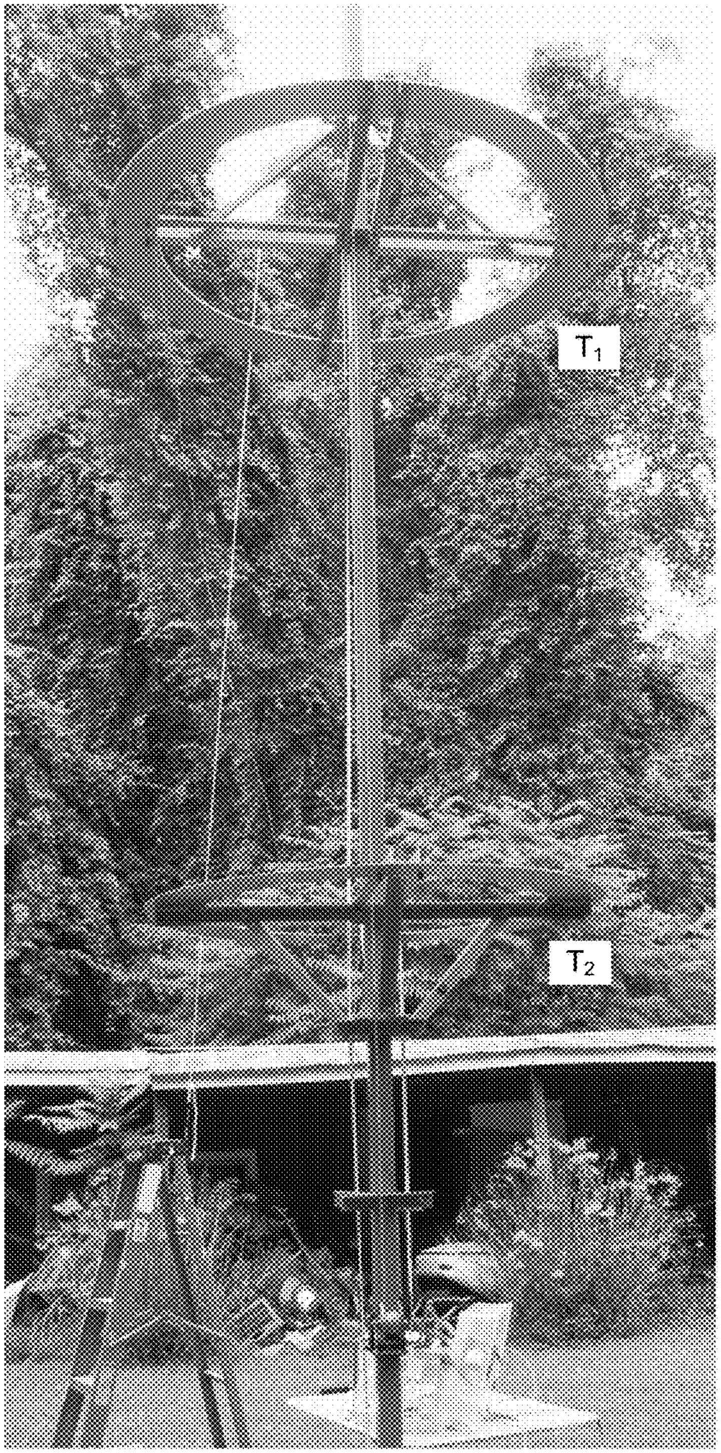
FIG. 12 is an image of an example of an implemented guided surface waveguide probe of FIG. 9A according to an embodiment of the present disclosure.

Field strength measurements were carried out to verify the ability of the guided surface waveguide probe 400*b* (FIG. 9A) to couple into a guided surface wave or a transmission line mode. Referring to FIG. 12, shown is an image of the guided surface waveguide probe used for the field strength measurements. FIG. 12 shows the guided surface waveguide probe 400*b* including an upper charge terminal $T_1$ and a lower compensation terminal $T_2$, which were both fabricated as rings. An insulating structure supports the charge terminal $T_1$ above the compensation terminal $T_2$. For example, an RF insulating fiberglass mast can be used to support the charge and compensation terminals $T_1$ and $T_2$. The insulating support structure can be configured to adjust the position of the charge and compensation terminals $T_1$ and $T_2$ using, e.g., insulated guy wires and pulleys, screw gears, or other appropriate mechanism as can be understood. A coil was used in the coupling circuit with one end of the coil grounded to an 8 foot ground rod near the base of the RF insulating fiberglass mast. The AC source was coupled to the right side of the coil by a tap connection ($V_1$), and taps for the charge terminal $T_1$ and compensation terminal $T_2$ were located at the center ($V_2$) and the left of the coil ($V_3$). FIG. 9A graphically illustrates the tap locations on the coil 909.

Figure 13:
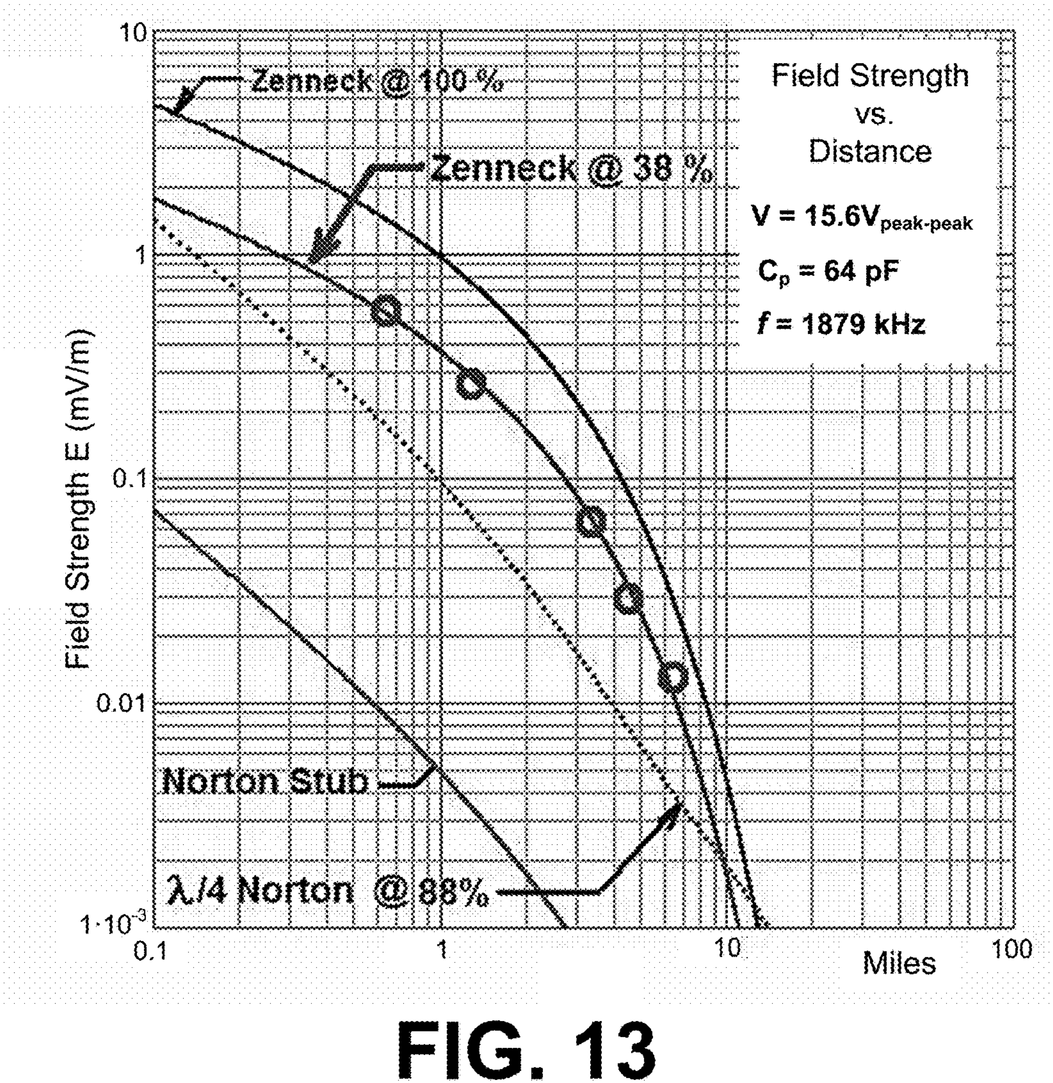
FIG. 13 is a plot comparing measured and theoretical field strength of the guided surface waveguide probe of FIG. 12 according to an embodiment of the present disclosure.

The guided surface waveguide probe 400*b* was supplied with power at a frequency of 1879 kHz. The voltage on the upper charge terminal $T_1$ was 15.6$V_{peak\text{-}peak}$ (5.515$V_{RMS}$) with a capacitance of 64 pF. Field strength (FS) measurements were taken at predetermined distances along a radial extending from the guided surface waveguide probe 400*b* using a FIM-41 FS meter (Potomac Instruments, Inc., Silver Spring, Md.). The measured data and predicted values for a guided surface wave transmission mode with an electrical launching efficiency of 35% are indicated in TABLE 1 below. Beyond the Hankel crossover distance ($R_x$), the large argument asymptote predominates over the "close-in" representation of the Hankel function, and the vertical component of the mode-matched electric asymptotically passes to Equation (44), which is linearly proportional to free charge on the charge terminal. TABLE 1 shows the measured values and predicted data. When plotted using an accurate plotting application (Mathcad), the measured values were found to fit an electrical launching efficiency curve corresponding to 38%, as illustrated in FIG. 13. For $15.6V_{pp}$ on the charge terminal $T_1$, the field strength curve (Zenneck @ 38%) passes through 363 μV/m at 1 mile (and 553 μV/m at 1 km) and scales linearly with the capacitance ($C_p$) and applied terminal voltage.

TABLE 1

| Range (miles) | Measured FS w/FIM-41 (μV/m) | Predicted FS (μV/m) |
|---|---|---|
| 0.64 | 550 | 546 |
| 1.25 | 265 | 263 |
| 3.15 | 67 | 74 |
| 4.48 | 30 | 35 |
| 6.19 | 14 | 13 |

The lower electrical launching efficiency may be attributed to the height of the upper charge terminal $T_1$. Even with the charge terminal $T_1$ elevated to a physical height of 17 feet, the bound charge reduces the efficiency of the guided surface waveguide probe 400*b*. While increasing the height of the charge terminal $T_1$ would improve the launching efficiency of the guided surface waveguide probe 400*b*, even at such a low height ($h_d/\lambda$=0.032) the coupled wave was found to match a 38% electric launching efficiency curve. In addition, it can be seen in FIG. 13 that the modest 17 foot guided surface waveguide probe 400*b* of FIG. 9A (with no ground system other than an 8 foot ground rod) exhibits better field strength than a full quarter-wave tower (λ/4 Norton=131 feet tall) with an extensive ground system by more than 10 dB in the range of 1-6 miles at 1879 kHz. Increasing the elevation of the charge terminal $T_1$, and adjusting the height of the compensation terminal $T_2$ and the coil phase $\Phi_U$, can improve the guided surface waveguide mode coupling, and thus the resulting electric field strength.

Figure 14A:
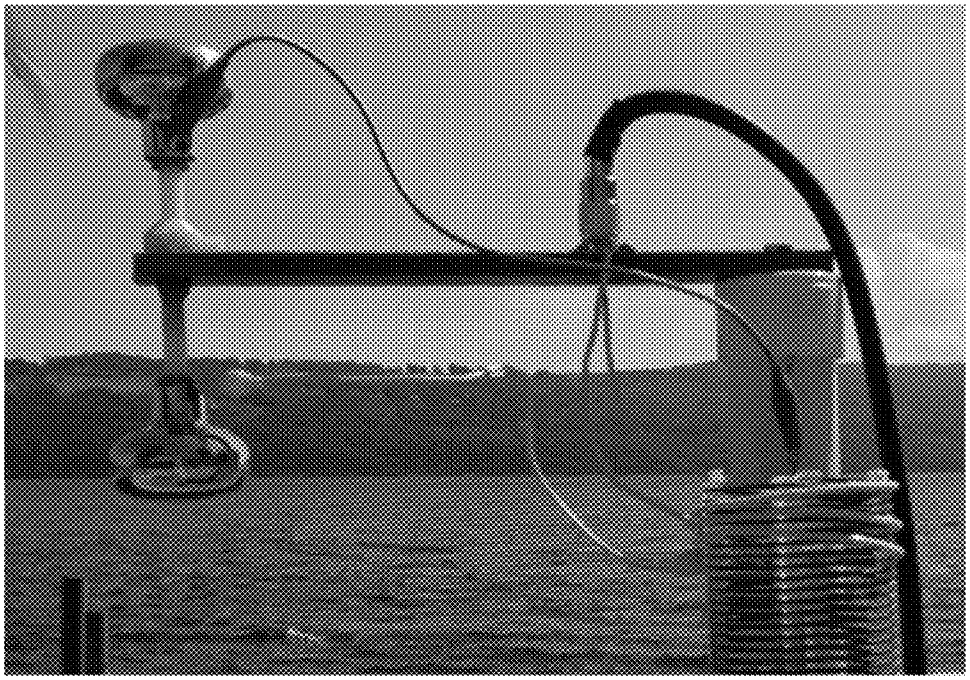
FIGS. 14A and 14B are an image and graphical representation of a guided surface waveguide probe according to an embodiment of the present disclosure.
Figure 14B:
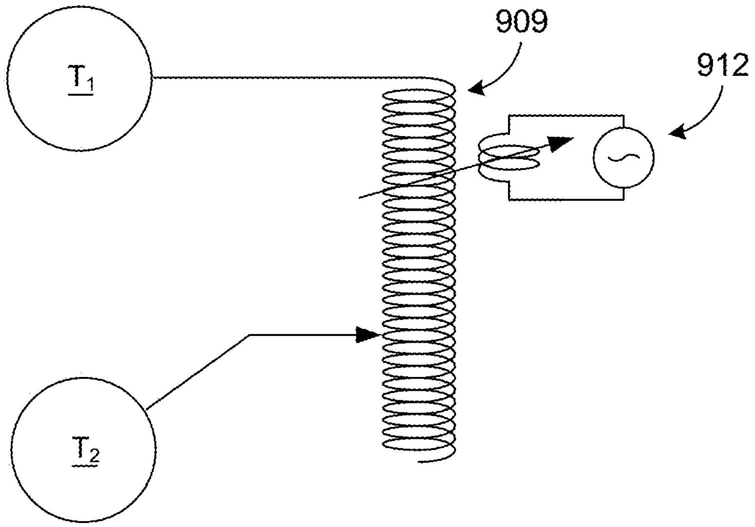

In another experimental example, a guided surface waveguide probe 400 was constructed to verify the operation of the proposed structure at 52 MHz (corresponding to $\omega=2\pi f=3.267\times10^8$ radians/sec). FIG. 14A shows an image of the guided surface waveguide probe 400. FIG. 14B is a schematic diagram of the guided surface waveguide probe 400 of FIG. 14A. The complex effective height between the charge and compensation terminals $T_1$ and $T_2$ of the doublet probe was adjusted to match $R_x$ times the guided surface wave tilt, $W_{Rx}$, at the Hankel crossover distance to launch a guided surface wave. This can be accomplished by changing the physical spacing between terminals, the magnetic link coupling and its position between the AC source 912 and the coil 909, the relative phase of the voltage between the terminals $T_1$ and $T_2$, the height of the charge and compensation terminal $T_1$ and $T_2$ relative to ground or the lossy conducting medium, or a combination thereof. The conductivity of the lossy conducting medium at the site of the guided surface waveguide probe 400 was determined to be $\sigma$=0.067 mhos/m and the relative permittivity was $\varepsilon_r$=82.5. Using these values, the index of refraction was determined to be n=9.170−j1.263. The complex Brewster angle was found to be $\psi_{i,B}$=6.110+j0.8835 degrees.

Figure 15:
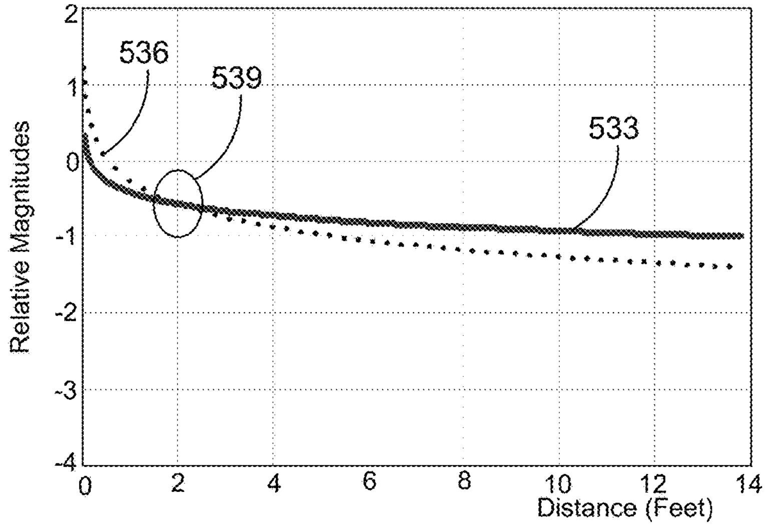
FIG. 15 is a plot of an example of the magnitudes of close-in and far-out asymptotes of first order Hankel functions according to various embodiments of the present disclosure.

A Hankel crossover distance of $R_x$=2 feet was found by equating Equations (20b) and (21), and solving for $R_x$. FIG. 15 shows a graphical representation of the crossover distance $R_x$ at 52 Hz. Curve 533 is a plot of the "far-out" asymptote. Curve 536 is a plot of the "close-in" asymptote. The magnitudes of the two sets of mathematical asymptotes in this example are equal at a Hankel crossover point 539 of two feet. The graph was calculated for water with a conductivity of 0.067 mhos/m and a relative dielectric constant (permittivity) of $\varepsilon_r$=82.5, at an operating frequency of 52 MHz. At lower frequencies, the Hankel crossover point 539 moves farther out. The guided surface wave tilt was calculated as $W_{Rx}=0.108\ e^{j(7.851°)}$. For the doublet configuration with a total height of 6 feet, the complex effective height ($h_{eff}=2h_pe^{j\Phi}=R_x \tan \psi_{i,B}$) was determined to be $2h_p$=6 inches with Φ=−172 degrees. When adjusting the phase delay of the compensation terminal $T_2$ to the actual conditions, it was found that Φ=−174 degrees maximized the mode matching of the guided surface wave, which was within experimental error.

Figure 16:
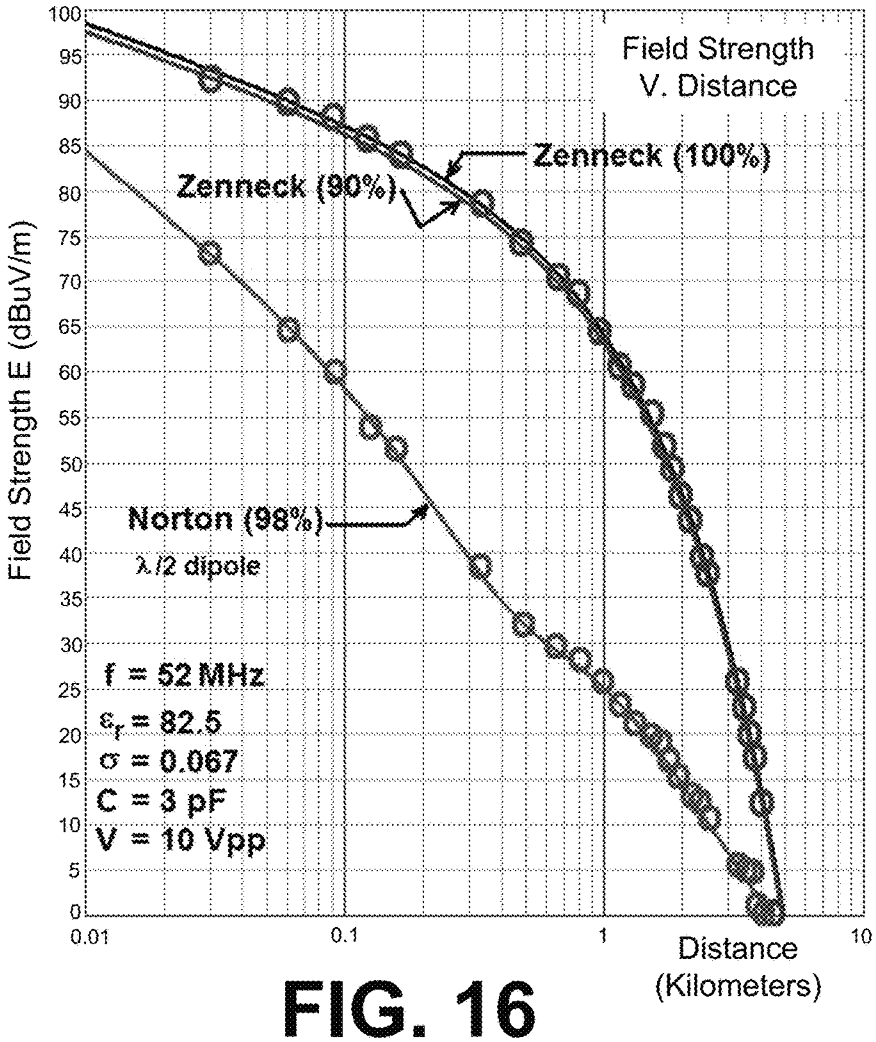
FIG. 16 is a plot comparing measured and theoretical field strength of the guided surface waveguide probe of FIGS. 14A and 14B according to an embodiment of the present disclosure

Field strength measurements were carried out to verify the ability of the guided surface waveguide probe 400 of FIGS. 14A and 14B to couple into a guided surface wave or a transmission line mode. With 10V peak-to-peak applied to the 3.5 pF terminals $T_1$ and $T_2$, the electric fields excited by the guided surface waveguide probe 400 were measured and plotted in FIG. 16. As can be seen, the measured field strengths fell between the Zenneck curves for 90% and 100%. The measured values for a Norton half wave dipole antenna were significantly less.

Figure 17:
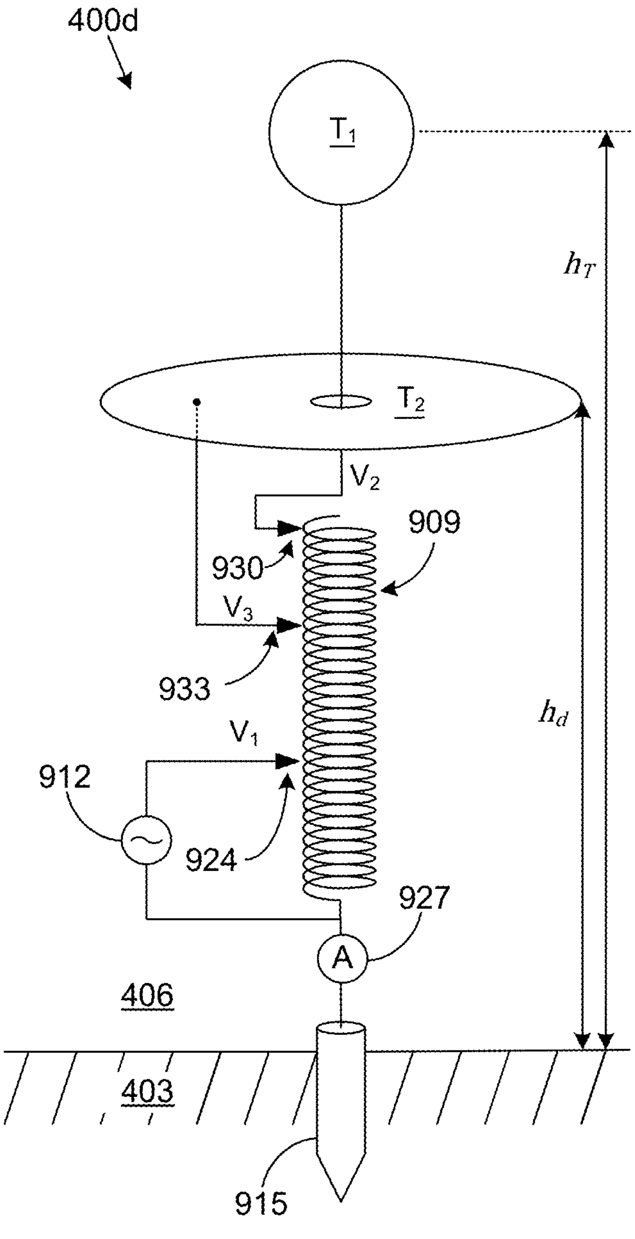
FIGS. 17 and 18 are graphical representations of examples of guided surface waveguide probes according to embodiments of the present disclosure.

Referring next to FIG. 17, shown is a graphical representation of another example of a guided surface waveguide probe 400*d* including an upper charge terminal $T_1$ (e.g., a sphere at height $h_T$) and a lower compensation terminal $T_2$ (e.g., a disk at height $h_d$) that are positioned along a vertical axis z that is substantially normal to the plane presented by the lossy conducting medium 403. During operation, charges $Q_1$ and $Q_2$ are imposed on the charge and compensation terminals $T_1$ and $T_2$, respectively, depending on the voltages applied to the terminals $T_1$ and $T_2$ at any given instant.

As in FIGS. 9A and 9B, an AC source 912 acts as the excitation source (412 of FIG. 4) for the charge terminal $T_1$. The AC source 912 is coupled to the guided surface waveguide probe 400*d* through a coupling circuit (409 of FIG. 4) comprising a coil 909. The AC source 912 can be connected across a lower portion of the coil 909 through a tap 924, as shown in FIG. 17, or can be inductively coupled to the coil 909 by way of a primary coil. The coil 909 can be coupled to a ground stake 915 at a first end and the charge terminal $T_1$ at a second end. In some implementations, the connection to the charge terminal $T_1$ can be adjusted using a tap 930 at the second end of the coil 909. The compensation terminal $T_2$ is positioned above and substantially parallel with the lossy conducting medium 403 (e.g., the ground or earth), and energized through a tap 933 coupled to the coil 909. An ammeter 927 located between the coil 909 and ground stake 915 can be used to provide an indication of the magnitude of the current flow ($I_0$) at the base of the guided surface waveguide probe. Alternatively, a current clamp may be used around the conductor coupled to the ground stake 915 to obtain an indication of the magnitude of the current flow ($I_0$).

In the embodiment of FIG. 17, the connection to the charge terminal $T_1$ (tap 930) has been moved up above the connection point of tap 933 for the compensation terminal $T_2$ as compared to the configuration of FIG. 9A. Such an adjustment allows an increased voltage (and thus a higher charge $Q_1$) to be applied to the upper charge terminal $T_1$. As with the guided surface waveguide probe 400*b* of FIG. 9A, it is possible to adjust the total effective height ($h_{TE}$) of the guided surface waveguide probe 400*d* to excite an electric field having a guided surface wave tilt at the Hankel crossover distance $R_x$. The Hankel crossover distance can also be found by equating Equations (20b) and (21), and solving for $R_x$. The index of refraction (n), the complex Brewster angle ($\theta_{i,B}$ and $\psi_{i,B}$), the wave tilt ($|W|e^{j\Psi}$) and the complex effective height ($h_{eff}=h_p e^{j\Phi}$) can be determined as described with respect to Equations (52)-(55) above.

With the selected charge terminal $T_1$ configuration, a spherical diameter (or the effective spherical diameter) can be determined. For example, if the charge terminal $T_1$ is not configured as a sphere, then the terminal configuration may be modeled as a spherical capacitance having an effective spherical diameter. The size of the charge terminal $T_1$ can be chosen to provide a sufficiently large surface for the charge $Q_1$ imposed on the terminals. In general, it is desirable to make the charge terminal $T_1$ as large as practical. The size of the charge terminal $T_1$ should be large enough to avoid ionization of the surrounding air, which can result in electrical discharge or sparking around the charge terminal. To reduce the amount of bound charge on the charge terminal the desired elevation to provide free charge on the charge terminal $T_1$ for launching a guided surface wave should be at least 4-5 times the effective spherical diameter above the lossy conductive medium (e.g., the earth). The compensation terminal $T_2$ can be used to adjust the total effective height ($h_{TE}$) of the guided surface waveguide probe 400*d* to excite an electric field having a guided surface wave tilt at $R_x$. The compensation terminal $T_2$ can be positioned below the charge terminal $T_1$ at $h_d=h_T-h_p$, where $h_T$ is the total physical height of the charge terminal $T_1$. With the position of the compensation terminal $T_2$ fixed and the phase delay $\Phi_U$ applied to the upper charge terminal $T_1$, the phase delay $\Phi_L$ applied to the lower compensation terminal $T_2$ can be determined using the relationships of Equation (49).

$$\Phi_U(h_d) = -\beta(h_d+y) - j\ln\left(\frac{R_x \times W - (h_p+z)e^{j(\beta h_p+\beta z+\Phi_L)}}{(h_d+y)}\right). \quad (59)$$

In alternative embodiments, the compensation terminal $T_2$ can be positioned at a height $h_d$ where $\mathrm{Im}\{\Phi_L\}=0$.

With the AC source 912 coupled to the coil 909 (e.g., at the 50Ω point to maximize coupling), the position of tap 933 may be adjusted for parallel resonance of the compensation terminal $T_2$ with at least a portion of the coil at the frequency of operation. Voltage $V_2$ from the coil 909 can be applied to the charge terminal $T_1$, and the position of tap 930 can be adjusted such that the phase (W) of the total effective height ($h_{TE}$) approximately equals the angle of the guided surface wave tilt ($W_{Rx}$) at the Hankel crossover distance ($R_x$). The position of the coil tap 930 can be adjusted until this operating point is reached, which results in the ground current through the ammeter 927 increasing to a maximum. At this point, the resultant fields excited by the guided surface waveguide probe 400*d* are substantially mode-matched to a guided surface waveguide mode on the surface of the lossy conducting medium 403, resulting in the launching of a guided surface wave along the surface of the lossy conducting medium 403. This can be verified by measuring field strength along a radial extending from the guided surface waveguide probe 400.

In other implementations, the voltage $V_2$ from the coil 909 can be applied to the charge terminal $T_1$, and the position of tap 933 can be adjusted such that the phase (Φ) of the total effective height ($h_{TE}$) approximately equals the angle of the guided surface wave tilt (Ψ) at $R_x$. The position of the coil tap 930 can be adjusted until the operating point is reached, resulting in the ground current through the ammeter 927 substantially reaching a maximum. The resultant fields are substantially mode-matched to a guided surface waveguide mode on the surface of the lossy conducting medium 403, and a guided surface wave is launched along the surface of the lossy conducting medium 403. This can be verified by measuring field strength along a radial extending from the guided surface waveguide probe 400. The system may be further adjusted to improve coupling by iteratively adjusting the position of the tap 924 for the AC source 912 to be at the 50Ω point on the coil 909 and adjusting the position of tap 930 and/or 933 to maximize the ground current through the ammeter 927.

Figure 18:
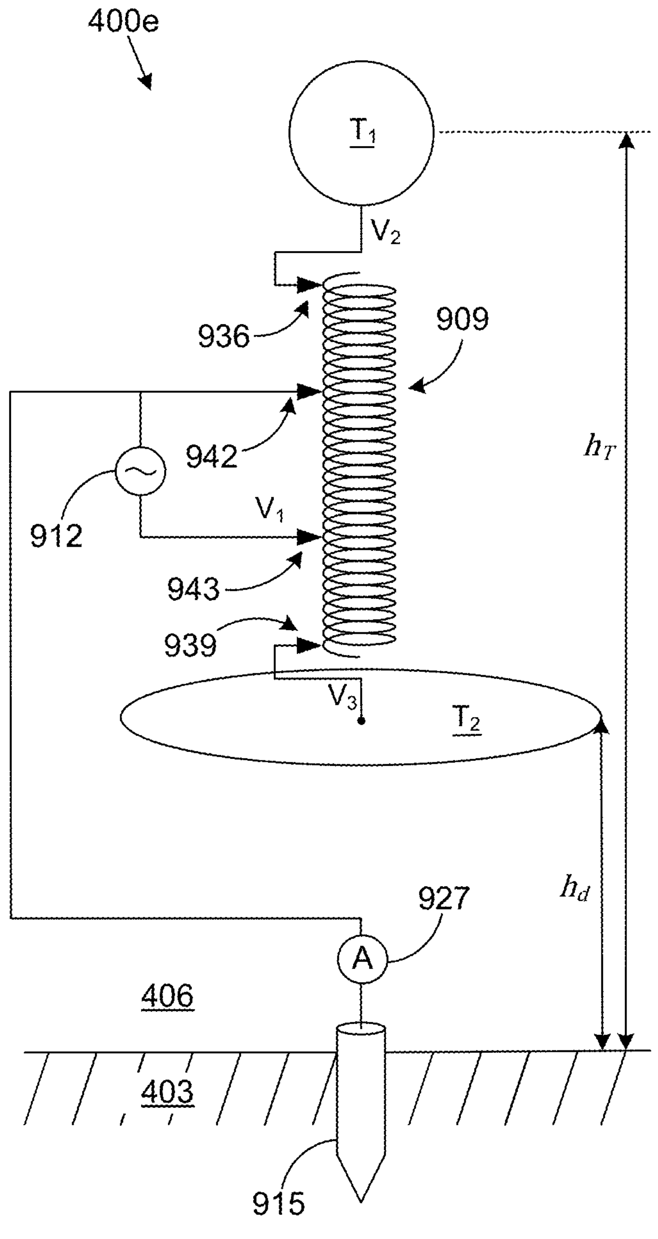

FIG. 18 is a graphical representation illustrating another example of a guided surface waveguide probe 400*e* including an upper charge terminal $T_1$ (e.g., a sphere at height $h_T$) and a lower compensation terminal $T_2$ (e.g., a disk at height $h_d$) that are positioned along a vertical axis z that is substantially normal to the plane presented by the lossy conducting medium 403. In the example of FIG. 18, the charge terminal $T_1$ (e.g., a sphere at height $h_T$) and compensation terminal $T_2$ (e.g., a disk at height $h_d$) are coupled to opposite ends of the coil 909. For example, charge terminal $T_1$ can be connected via tap 936 at a first end of coil 909 and compensation terminal $T_2$ can be connected via tap 939 at a second end of coil 909 as shown in FIG. 18. The compensation terminal $T_2$ is positioned above and substantially parallel with the lossy conducting medium 403 (e.g., the ground or earth). During operation, charges $Q_1$ and $Q_2$ are imposed on the charge and compensation terminals $T_1$ and $T_2$, respectively, depending on the voltages applied to the terminals $T_1$ and $T_2$ at any given instant.

An AC source 912 acts as the excitation source (412 of FIG. 4) for the charge terminal $T_1$. The AC source 912 is coupled to the guided surface waveguide probe 400*e* through a coupling circuit (409 of FIG. 4) comprising a coil 909. In the example of FIG. 18, the AC source 912 is connected across a middle portion of the coil 909 through tapped connections 942 and 943. In other embodiments, the AC source 912 can be inductively coupled to the coil 909 through a primary coil. One side of the AC source 912 is also coupled to a ground stake 915, which provides a ground point on the coil 909. An ammeter 927 located between the coil 909 and ground stake 915 can be used to provide an indication of the magnitude of the current flow at the base of the guided surface waveguide probe 400*e*. Alternatively, a current clamp may be used around the conductor coupled to the ground stake 915 to obtain an indication of the magnitude of the current flow.

It is possible to adjust the total effective height ($h_{TE}$) of the guided surface waveguide probe 400*e* to excite an electric field having a guided surface wave tilt at the Hankel crossover distance $R_x$, as has been previously discussed. The Hankel crossover distance can also be found by equating Equations (20b) and (21), and solving for $R_x$. The index of refraction (n), the complex Brewster angle ($\theta_{i,B}$ and $\psi_{i,B}$) and the complex effective height ($h_{eff}=h_p e^{j\Phi}$) can be determined as described with respect to Equations (52)-(55) above.

A spherical diameter (or the effective spherical diameter) can be determined for the selected charge terminal $T_1$ configuration. For example, if the charge terminal $T_1$ is not configured as a sphere, then the terminal configuration may be modeled as a spherical capacitance having an effective spherical diameter. To reduce the amount of bound charge on the charge terminal $T_1$, the desired elevation to provide free charge on the charge terminal $T_1$ for launching a guided surface wave should be at least 4-5 times the effective spherical diameter above the lossy conductive medium (e.g., the earth). The compensation terminal $T_2$ can be positioned below the charge terminal $T_1$ at $h_d=h_T-h_p$, where $h_T$ is the total physical height of the charge terminal $T_1$. With the positions of the charge terminal $T_1$ and the compensation terminal $T_2$ fixed and the AC source 912 coupled to the coil 909 (e.g., at the 50Ω point to maximize coupling), the position of tap 939 may be adjusted for parallel resonance of the compensation terminal $T_2$ with at least a portion of the coil at the frequency of operation. While adjusting the compensation terminal circuit for resonance aids the subsequent adjustment of the charge terminal connection, it is not necessary to establish the guided surface wave tilt ($W_{Rx}$) at the Hankel crossover distance ($R_x$). One or both of the phase delays $\Phi_L$ and $\Phi_U$ applied to the upper charge terminal $T_1$ and lower compensation terminal $T_2$ can be adjusted by repositioning one or both of the taps 936 and/or 939 on the coil 909. In addition, the phase delays $\Phi_L$ and $\Phi_U$ may be adjusted by repositioning one or both of the taps 942 of the AC source 912. The position of the coil tap(s) 936, 939 and/or 942 can be adjusted until this operating point is reached, which results in the ground current through the ammeter 927 increasing to a maximum. This can be verified by measuring field strength along a radial extending from the guided surface waveguide probe 400. The phase delays may then be adjusted by repositioning these tap(s) to increase (or maximize) the ground current.

When the electric fields produced by a guided surface waveguide probe 400 has a guided surface wave tilt at the Hankel crossover distance $R_x$, they are substantially mode-matched to a guided surface waveguide mode on the surface of the lossy conducting medium, and a guided electromagnetic field in the form of a guided surface wave is launched along the surface of the lossy conducting medium. As illustrated in FIG. 1, the guided field strength curve 103 of the guided electromagnetic field has a characteristic exponential decay of $e^{-\alpha d}/\sqrt{d}$ and exhibits a distinctive knee 109 on the log-log scale. Receive circuits can be utilized with one or more guided surface waveguide probe to facilitate wireless transmission and/or power delivery systems.

Figure 19A:
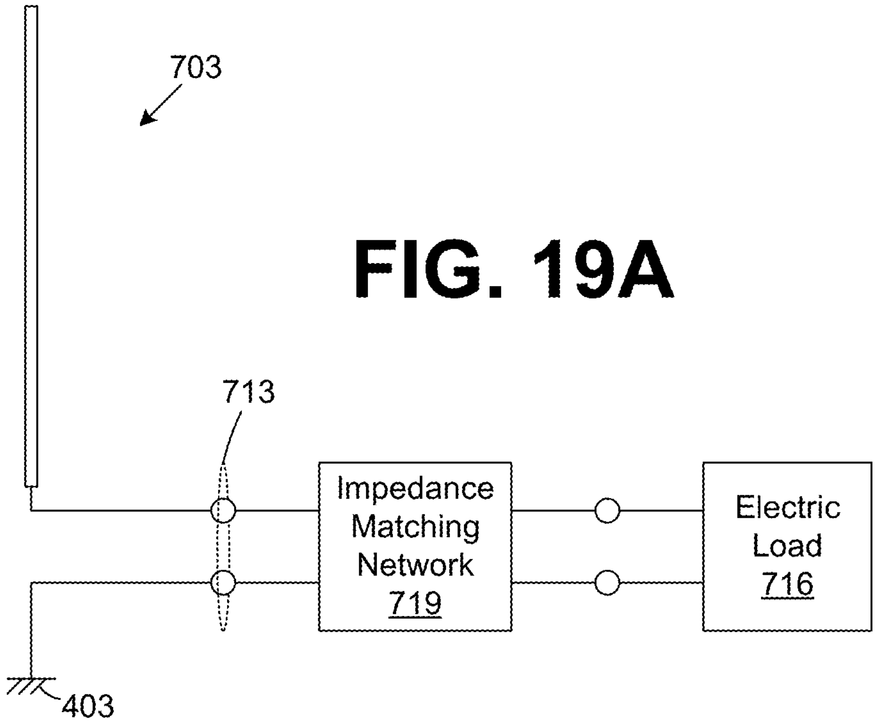
FIGS. 19A and 19B depict examples of receivers that can be employed to receive energy transmitted in the form of a guided surface wave launched by a guided surface waveguide probe according to the various embodiments of the present disclosure.
Figure 19B:
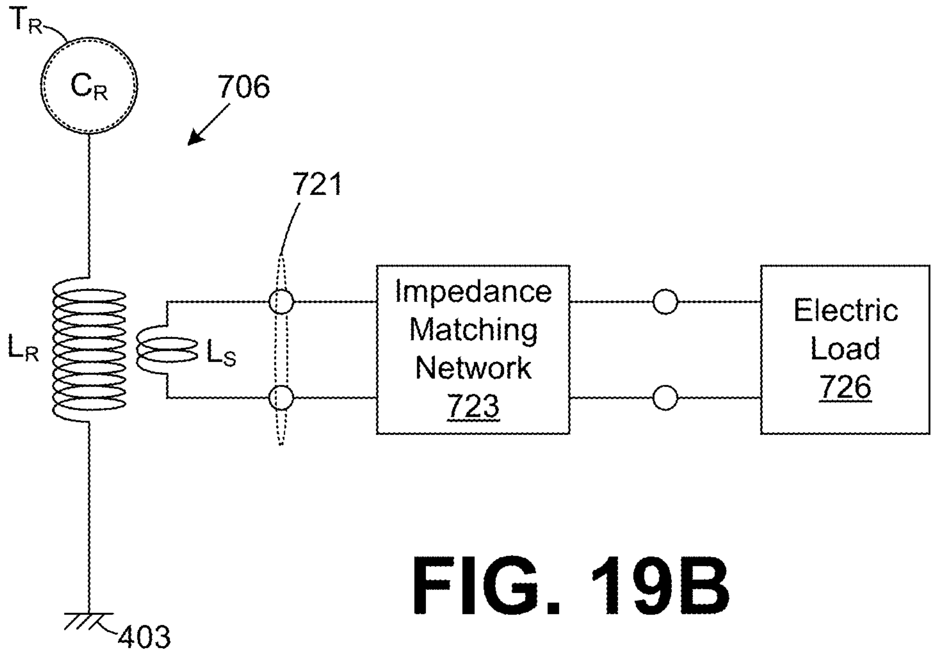
Figure 20:
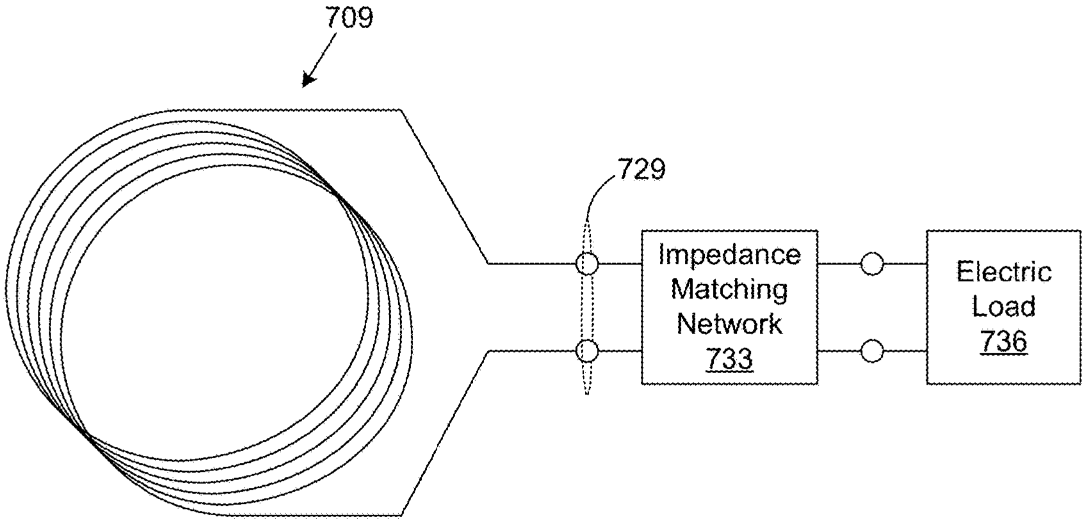
FIG. 20 depicts an example of an additional receiver that can be employed to receive energy transmitted in the form of a guided surface wave launched by a guided surface waveguide probe according to the various embodiments of the present disclosure.

Referring next to FIGS. 19A, 19B, and 20, shown are examples of generalized receive circuits for using the surface-guided waves in wireless power delivery systems. FIGS. 19A and 19B include a linear probe 703 and a tuned resonator 706, respectively. FIG. 20 is a magnetic coil 709 according to various embodiments of the present disclosure. According to various embodiments, each one of the linear probe 703, the tuned resonator 706, and the magnetic coil 709 may be employed to receive power transmitted in the form of a guided surface wave on the surface of a lossy conducting medium 403 (FIG. 4) according to various embodiments. As mentioned above, in one embodiment the lossy conducting medium 403 comprises a terrestrial medium (or earth).

With specific reference to FIG. 19A, the open-circuit terminal voltage at the output terminals 713 of the linear probe 703 depends upon the effective height of the linear probe 703. To this end, the terminal point voltage may be calculated as $h_e$ $$V_T=\int_0^{h_e} E_{inc}\cdot dl, \tag{60}$$

where $E_{inc}$ is the strength of the electric field on the linear probe 703 in Volts per meter, dl is an element of integration along the direction of the linear probe 703, and $h_e$ is the effective height of the linear probe 703. An electrical load 716 is coupled to the output terminals 713 through an impedance matching network 719.

When the linear probe 703 is subjected to a guided surface wave as described above, a voltage is developed across the output terminals 713 that may be applied to the electrical load 716 through a conjugate impedance matching network 719 as the case may be. In order to facilitate the flow of power to the electrical load 716, the electrical load 716 should be substantially impedance matched to the linear probe 703 as will be described below.

Referring to FIG. 19B, the tuned resonator 706 includes a charge terminal $T_R$ that is elevated above the lossy conducting medium 403. The charge terminal $T_R$ has a self-capacitance $C_R$. In addition, there may also be a bound capacitance (not shown) between the charge terminal $T_R$ and the lossy conducting medium 403 depending on the height of the charge terminal $T_R$ above the lossy conducting medium 403. The bound capacitance should preferably be minimized as much as is practicable, although this may not be entirely necessary in every instance of a guided surface waveguide probe 400.

The tuned resonator 706 also includes a coil $L_R$. One end of the coil $L_R$ is coupled to the charge terminal $T_R$, and the other end of the coil $L_R$ is coupled to the lossy conducting medium 403. To this end, the tuned resonator 706 (which may also be referred to as tuned resonator $L_R$-$C_R$) comprises a series-tuned resonator as the charge terminal $C_R$ and the coil $L_R$ are situated in series. The tuned resonator 706 is tuned by adjusting the size and/or height of the charge terminal $T_R$, and/or adjusting the size of the coil $L_R$ so that the reactive impedance of the structure is substantially eliminated.

For example, the reactance presented by the self-capacitance $C_R$ is calculated as $1/j\omega C_R$. Note that the total capacitance of the tuned resonator 706 may also include capacitance between the charge terminal $T_R$ and the lossy conducting medium 403, where the total capacitance of the tuned resonator 706 may be calculated from both the self-capacitance $C_R$ and any bound capacitance as can be appreciated. According to one embodiment, the charge terminal $T_R$ may be raised to a height so as to substantially reduce or eliminate any bound capacitance. The existence of a bound capacitance may be determined from capacitance measurements between the charge terminal $T_R$ and the lossy conducting medium 403.

The inductive reactance presented by a discrete-element coil $L_R$ may be calculated as $j\omega L$, where L is the lumped-element inductance of the coil $L_R$. If the coil $L_R$ is a distributed element, its equivalent terminal-point inductive reactance may be determined by conventional approaches. To tune the tuned resonator 706, one would make adjustments so that the inductive reactance presented by the coil $L_R$ equals the capacitive reactance presented by the tuned resonator 706 so that the resulting net reactance of the tuned resonator 706 is substantially zero at the frequency of operation. An impedance matching network 723 may be inserted between the probe terminals 721 and the electrical load 726 in order to effect a conjugate-match condition for maxim power transfer to the electrical load 726.

When placed in the presence of a guided surface wave, generated at the frequency of the tuned resonator 706 and the conjugate matching network 723, as described above, maximum power will be delivered from the surface guided wave to the electrical load 726. That is, once conjugate impedance matching is established between the tuned resonator 706 and the electrical load 726, power will be delivered from the structure to the electrical load 726. To this end, an electrical load 726 may be coupled to the tuned resonator 706 by way of magnetic coupling, capacitive coupling, or conductive (direct tap) coupling. The elements of the coupling network may be lumped components or distributed elements as can be appreciated. In the embodiment shown in FIG. 19B, magnetic coupling is employed where a coil Ls is positioned as a secondary relative to the coil $L_R$ that acts as a transformer primary. The coil Ls may be link coupled to the coil $L_R$ by geometrically winding it around the same core structure and adjusting the coupled magnetic flux as can be appreciated. In addition, while the tuned resonator 706 comprises a series-tuned resonator, a parallel-tuned resonator or even a distributed-element resonator may also be used.

Referring to FIG. 20, the magnetic coil 709 comprises a receive circuit that is coupled through an impedance matching network 733 to an electrical load 736. In order to facilitate reception and/or extraction of electrical power from a guided surface wave, the magnetic coil 709 may be positioned so that the magnetic flux of the guided surface wave, $H_\varphi$, passes through the magnetic coil 709, thereby inducing a current in the magnetic coil 709 and producing a terminal point voltage at its output terminals 729. The magnetic flux of the guided surface wave coupled to a single turn coil is expressed by $$\Psi=\iint_{A_{CS}}\mu_r\mu_o\vec{H}\cdot\hat{n}\,dA \qquad (61)$$

where $\Psi$ is the coupled magnetic flux, $\mu_r$, is the effective relative permeability of the core of the magnetic coil 709, $\mu_o$, is the permeability of free space, $\vec{H}$ is the incident magnetic field strength vector, $\hat{n}$ is a unit vector normal to the cross-sectional area of the turns, and $\lambda_{CS}$ is the area enclosed by each loop. For an N-turn magnetic coil 709 oriented for maximum coupling to an incident magnetic field that is uniform over the cross-sectional area of the magnetic coil 709, the open-circuit induced voltage appearing at the output terminals 729 of the magnetic coil 709 is $$V=-N\frac{d\Psi}{dt}\approx-j\omega\mu_r\mu_0HA_{CS}, \qquad (62)$$

where the variables are defined above. The magnetic coil 709 may be tuned to the guided surface wave frequency either as a distributed resonator or with an external capacitor across its output terminals 729, as the case may be, and then impedance-matched to an external electrical load 736 through a conjugate impedance matching network 733.

Assuming that the resulting circuit presented by the magnetic coil 709 and the electrical load 736 are properly adjusted and conjugate impedance matched, via impedance matching network 733, then the current induced in the magnetic coil 709 may be employed to optimally power the electrical load 736. The receive circuit presented by the magnetic coil 709 provides an advantage in that it does not have to be physically connected to the ground.

With reference to FIGS. 19A, 19B, and 20, the receive circuits presented by the linear probe 703, the tuned resonator 706, and the magnetic coil 709 each facilitate receiving electrical power transmitted from any one of the embodiments of guided surface waveguide probes 400 described above. To this end, the energy received may be used to supply power to an electrical load 716/726/736 via a conjugate matching network as can be appreciated. This contrasts with the signals that may be received in a receiver that were transmitted in the form of a radiated electromagnetic field. Such signals have very low available power and receivers of such signals do not load the transmitters.

It is also characteristic of the present guided surface waves generated using the guided surface waveguide probes 400 described above that the receive circuits presented by the linear probe 703, the tuned resonator 706, and the magnetic coil 709 will load the excitation source 413 (FIG. 4) that is applied to the guided surface waveguide probe 400, thereby generating the guided surface wave to which such receive circuits are subjected. This reflects the fact that the guided surface wave generated by a given guided surface waveguide probe 400 described above comprises a transmission line mode. By way of contrast, a power source that drives a radiating antenna that generates a radiated electromagnetic wave is not loaded by the receivers, regardless of the number of receivers employed.

Thus, together one or more guided surface waveguide probes 400 and one or more receive circuits in the form of the linear probe 703, the tuned resonator 706, and/or the magnetic coil 709 can together make up a wireless distribution system. Given that the distance of transmission of a guided surface wave using a guided surface waveguide probe 400 as set forth above depends upon the frequency, it is possible that wireless power distribution can be achieved across wide areas and even globally.

The conventional wireless-power transmission/distribution systems extensively investigated today include "energy harvesting" from radiation fields and also sensor coupling to inductive or reactive near-fields. In contrast, the present wireless-power system does not waste power in the form of radiation which, if not intercepted, is lost forever. Nor is the presently disclosed wireless-power system limited to extremely short ranges as with conventional mutual-reactance coupled near-field systems. The wireless-power system disclosed herein probe-couples to the novel surface-guided transmission line mode, which is equivalent to delivering power to a load by a wave-guide or a load directly wired to the distant power generator. Not counting the power required to maintain transmission field strength plus that dissipated in the surface waveguide, which at extremely low frequencies is insignificant relative to the transmission losses in conventional high-tension power lines at 60 Hz, all the generator power goes only to the desired electrical load. When the electrical load demand is terminated, the source power generation is relatively idle.

Figure 21A:
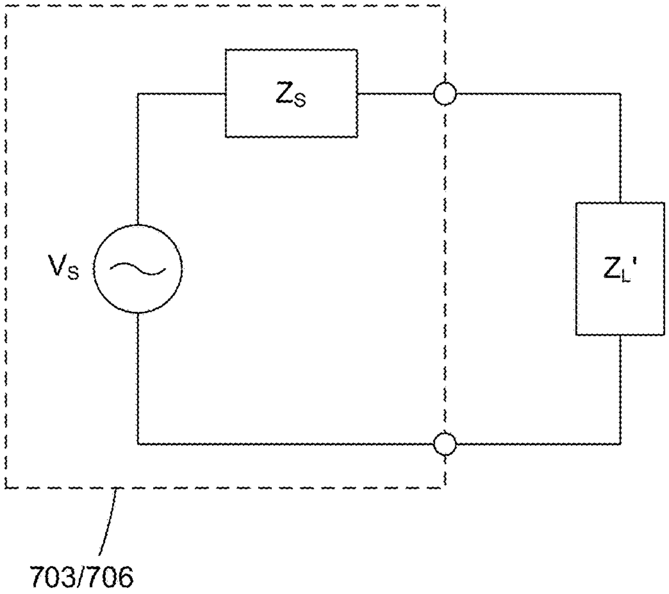
FIG. 21A depicts a schematic diagram representing the Thevenin-equivalent of the receivers depicted in FIGS. 19A and 19B according to an embodiment of the present disclosure.
Figure 21B:
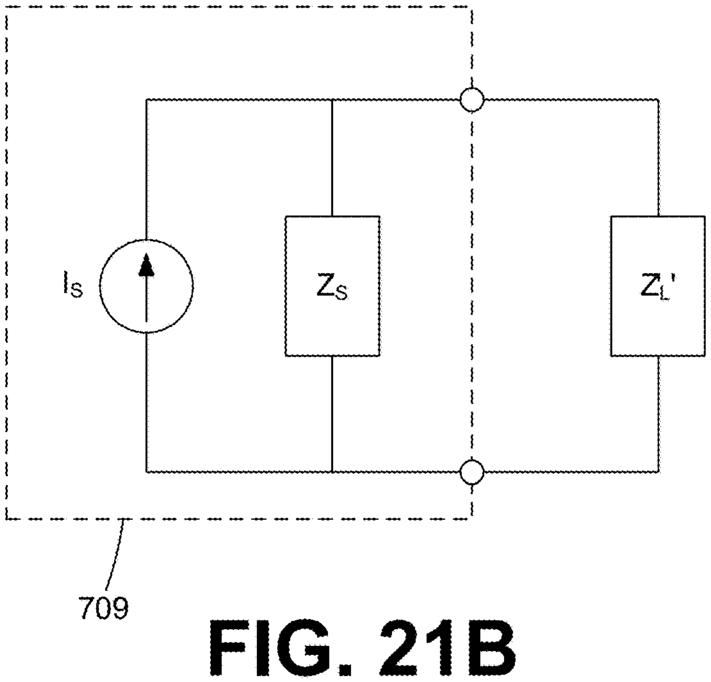
FIG. 21B depicts a schematic diagram representing the Norton-equivalent of the receiver depicted in FIG. 17 according to an embodiment of the present disclosure.

Referring next to FIG. 21A shown is a schematic that represents the linear probe 703 and the tuned resonator 706. FIG. 21B shows a schematic that represents the magnetic coil 709. The linear probe 703 and the tuned resonator 706 may each be considered a Thevenin equivalent represented by an open-circuit terminal voltage source Vs and a dead network terminal point impedance $Z_S$. The magnetic coil 709 may be viewed as a Norton equivalent represented by a short-circuit terminal current source $I_S$ and a dead network terminal point impedance $Z_S$. Each electrical load 716/726/736 (FIGS. 19A, 19B and 20) may be represented by a load impedance $Z_L$. The source impedance $Z_S$ comprises both real and imaginary components and takes the form $Z_S=R_S+jX_S$.

According to one embodiment, the electrical load 716/726/736 is impedance matched to each receive circuit, respectively. Specifically, each electrical load 716/726/736 presents through a respective impedance matching network 719/723/733 a load on the probe network specified as $Z_L'$ expressed as $Z_L'=R_L'+jX_L'$, which will be equal to $Z_L'=Z_S^*=R_S-j\,X_S$, where the presented load impedance $Z_L'$ is the complex conjugate of the actual source impedance $Z_S$. The conjugate match theorem, which states that if, in a cascaded network, a conjugate match occurs at any terminal pair then it will occur at all terminal pairs, then asserts that the actual electrical load 716/726/736 will also see a conjugate match to its impedance, $Z_L'$. See Everitt, W. L. and G. E. Anner, *Communication Engineering*, McGraw-Hill, 3rd edition, 1956, p. 407. This ensures that the respective electrical load 716/726/736 is impedance matched to the respective receive circuit and that maximum power transfer is established to the respective electrical load 716/726/736.

Operation of a guided surface waveguide probe 400 may be controlled to adjust for variations in operational conditions associated with the guided surface waveguide probe 400. For example, a probe control system 418 (FIG. 4) can be used to control the coupling circuit 409 and/or positioning of the charge terminal $T_1$ and/or compensation terminal $T_2$ to control the operation of the guided surface waveguide probe 400. Operational conditions can include, but are not limited to, variations in the characteristics of the lossy conducting medium 403 (e.g., conductivity σ and relative permittivity $\varepsilon_r$), variations in field strength and/or variations in loading of the guided surface waveguide probe 400. As can be seen from Equations (52)-(55), the index of refraction (n), the complex Brewster angle ($\theta_{i,B}$ and $\psi_{i,B}$), the wave tilt ($|W|e^{j\Psi}$) and the complex effective height ($h_{eff}=h_p e^{j\Phi}$) can be affected by changes in soil conductivity and permittivity resulting from, e.g., weather conditions.

Equipment such as, e.g., conductivity measurement probes, permittivity sensors, ground parameter meters, field meters, current monitors and/or load receivers can be used to monitor for changes in the operational conditions and provide information about current operational conditions to the probe control system 418. The probe control system 418 can then make one or more adjustments to the guided surface waveguide probe 400 to maintain specified operational conditions for the guided surface waveguide probe 400. For instance, as the moisture and temperature vary, the conductivity of the soil will also vary. Conductivity measurement probes and/or permittivity sensors may be located at multiple locations around the guided surface waveguide probe 400. Generally, it would be desirable to monitor the conductivity and/or permittivity at or about the Hankel crossover distance $R_x$ for the operational frequency. Conductivity measurement probes and/or permittivity sensors may be located at multiple locations (e.g., in each quadrant) around the guided surface waveguide probe 400.

Figure 22A:
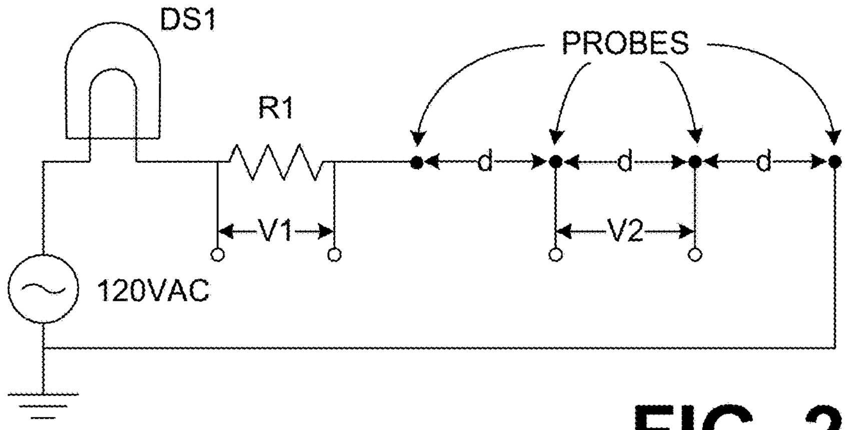
FIGS. 22A and 22B are schematic diagrams representing examples of a conductivity measurement probe and an open wire line probe, respectively, according to an embodiment of the present disclosure.

FIG. 22A shows an example of a conductivity measurement probe that can be installed for monitoring changes in soil conductivity. As shown in FIG. 22A, a series of measurement probes are inserted along a straight line in the soil. For example, the probes may be 9/16-inch diameter rods with a penetration depth of 12 inches or more, and spaced apart by d=18 inches. DS1 is a 100 Watt light bulb and R1 is a 5 Watt, 14.6 Ohm resistance. By applying an AC voltage to the circuit and measuring V1 across the resistance and V2 across the center probes, the conductivity can be determined by the weighted ratio of σ=21(V1/V2). The measurements can be filtered to obtain measurements related only to the AC voltage supply frequency. Different configurations using other voltages, frequencies, probe sizes, depths and/or spacing may also be utilized.

Figure 22B:
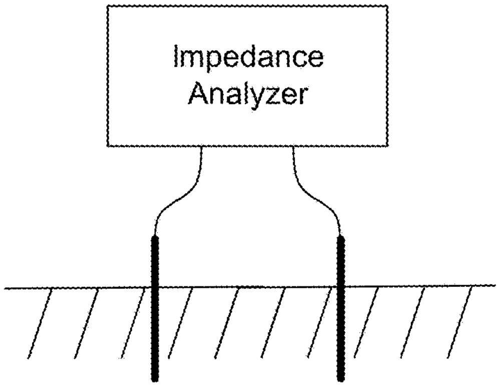

Open wire line probes can also be used to measure conductivity and permittivity of the soil. As illustrated in FIG. 22B, impedance is measured between the tops of two rods inserted into the soil (lossy medium) using, e.g., an impedance analyzer. If an impedance analyzer is utilized, measurements (R+jX) can be made over a range of frequencies and the conductivity and permittivity determined from the frequency dependent measurements using $$\sigma = \frac{8.84}{C_0}\left[\frac{R}{R^2+X^2}\right] \text{ and } \varepsilon_r = \frac{10^6}{2\pi f C_0}\left[\frac{R}{R^2+X^2}\right], \tag{63}$$

where $C_0$ is the capacitance in pF of the probe in air.

The conductivity measurement probes and/or permittivity sensors can be configured to evaluate the conductivity and/or permittivity on a periodic basis and communicate the information to the probe control system 418 (FIG. 4). The information may be communicated to the probe control system 418 through a network such as, but not limited to, a LAN, WLAN, cellular network, or other appropriate wired or wireless communication network. Based upon the monitored conductivity and/or permittivity, the probe control system 418 may evaluate the variation in the index of refraction (n), the complex Brewster angle ($\theta_{i,B}$ and $\psi_{i,B}$), the wave tilt ($|W|e^{j\Psi}$) and/or the complex effective height ($h_{eff}=h_p e^{j\Phi}$) and adjust the guided surface waveguide probe 400 to maintain the wave tilt at the Hankel crossover distance so that the illumination remains at the complex Brewster angle. This can be accomplished by adjusting, e.g., $h_p$, $\Phi_U$, $\Phi_L$ and/or $h_d$. For instance, the probe control system 418 can adjust the height ($h_d$) of the compensation terminal $T_2$ or the phase delay ($\Phi_U$, $\Phi_L$) applied to the charge terminal $T_1$ and/or compensation terminal $T_2$, respectively, to maintain the electrical launching efficiency of the guided surface wave at or near its maximum. The phase applied to the charge terminal $T_1$ and/or compensation terminal $T_2$ can be adjusted by varying the tap position on the coil 909, and/or by including a plurality of predefined taps along the coil 909 and switching between the different predefined tap locations to maximize the launching efficiency.

Field or field strength (FS) meters (e.g., a FIM-41 FS meter, Potomac Instruments, Inc., Silver Spring, Md.) may also be distributed about the guided surface waveguide probe 400 to measure field strength of fields associated with the guided surface wave. The field or FS meters can be configured to detect the field strength and/or changes in the field strength (e.g., electric field strength) and communicate that information to the probe control system 418. The information may be communicated to the probe control system 418 through a network such as, but not limited to, a LAN, WLAN, cellular network, or other appropriate communication network. As the load and/or environmental conditions change or vary during operation, the guided surface waveguide probe 400 may be adjusted to maintain specified field strength(s) at the FS meter locations to ensure appropriate power transmission to the receivers and the loads they supply.

For example, the phase delay ($\Phi_U$, $\Phi_L$) applied to the charge terminal $T_1$ and/or compensation terminal $T_2$, respectively, can be adjusted to improve and/or maximize the electrical launching efficiency of the guided surface waveguide probe 400. By adjusting one or both phase delays, the guided surface waveguide probe 400 can be adjusted to ensure the wave tilt at the Hankel crossover distance remains at the complex Brewster angle. This can be accomplished by adjusting a tap position on the coil 909 to change the phase delay supplied to the charge terminal $T_1$ and/or compensation terminal $T_2$. The voltage level supplied to the charge terminal $T_1$ can also be increased or decreased to adjust the electric field strength. This may be accomplished by adjusting the output voltage of the excitation source 412 (FIG. 4) or by adjusting or reconfiguring the coupling circuit 409 (FIG. 4). For instance, the position of the tap 924 (FIG. 4) for the AC source 912 (FIG. 4) can be adjusted to increase the voltage seen by the charge terminal $T_1$. Maintaining field strength levels within predefined ranges can improve coupling by the receivers, reduce ground current losses, and avoid interference with transmissions from other guided surface waveguide probes 400.

Figure 23A:
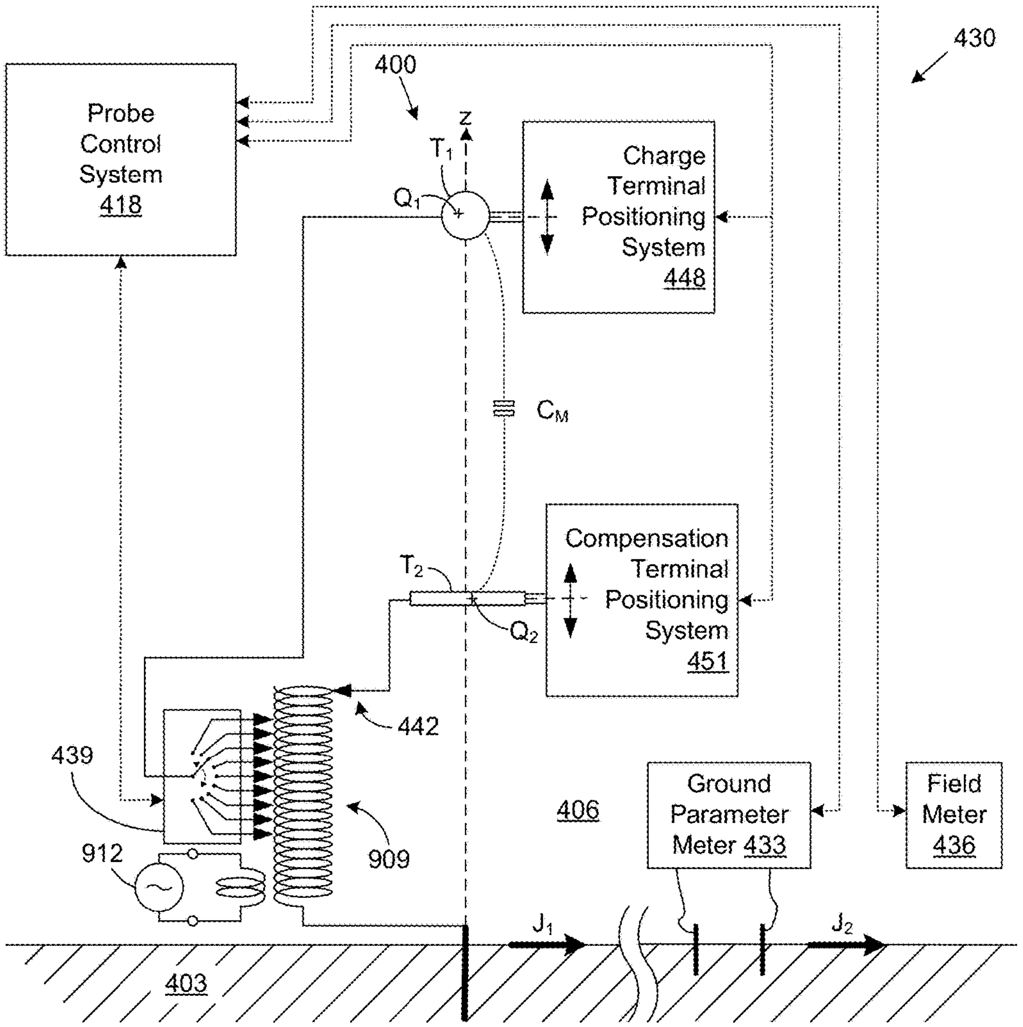
FIGS. 23A through 23C are schematic drawings of examples of an adaptive control system employed by the probe control system of FIG. 4 according to embodiments of the present disclosure.

Referring to FIG. 23A, shown is an example of an adaptive control system 430 including the probe control system 418 of FIG. 4, which is configured to adjust the operation of a guided surface waveguide probe 400, based upon monitored conditions. The probe control system 418 can be implemented with hardware, firmware, software executed by hardware, or a combination thereof. For example, the probe control system 418 can include processing circuitry including a processor and a memory, both of which can be coupled to a local interface such as, for example, a data bus with an accompanying control/address bus as can be appreciated by those with ordinary skill in the art. A probe control application may be executed by the processor to adjust the operation of the guided surface waveguide probe 400 based upon monitored conditions. The probe control system 418 can also include one or more network interfaces for communicating with the various monitoring devices. Communications can be through a network such as, but not limited to, a LAN, WLAN, cellular network, or other appropriate communication network. The probe control system 418 may comprise, for example, a computer system such as a server, desktop computer, laptop, or other system with like capability.

The adaptive control system 430 can include one or more ground parameter meter(s) 433 such as, but not limited to, a conductivity measurement probe of FIG. 22A and/or an open wire probe of FIG. 22B. The ground parameter meter(s) 433 can be distributed about the guided surface waveguide probe 400 at about the Hankel crossover distance ($R_x$) associated with the probe operating frequency. For example, an open wire probe of FIG. 22B may be located in each quadrant around the guided surface waveguide probe 400 to monitor the conductivity and permittivity of the lossy conducting medium as previously described. The ground parameter meter(s) 433 can be configured to determine the conductivity and permittivity of the lossy conducting medium on a periodic basis and communicate the information to the probe control system 418 for potential adjustment of the guided surface waveguide probe 400. In some cases, the ground parameter meter(s) 433 may communicate the information to the probe control system 418 only when a change in the monitored conditions is detected.

The adaptive control system 430 can also include one or more field meter(s) 436 such as, but not limited to, an electric field strength (FS) meter. The field meter(s) 436 can be distributed about the guided surface waveguide probe 400 beyond the Hankel crossover distance ($R_x$) where the guided field strength curve 103 (FIG. 1) dominates the radiated field strength curve 106 (FIG. 1). For example, a plurality of filed meters 436 may be located along one or more radials extending outward from the guided surface waveguide probe 400 to monitor the electric field strength as previously described. The field meter(s) 436 can be configured to determine the field strength on a periodic basis and communicate the information to the probe control system 418 for potential adjustment of the guided surface waveguide probe 400. In some cases, the field meter(s) 436 may communicate the information to the probe control system 418 only when a change in the monitored conditions is detected.

Other variables can also be monitored and used to adjust the operation of the guided surface waveguide probe 400. For instance, the ground current flowing through the ground stake 915 (FIGS. 9A-9B, 17 and 18) can be used to monitor the operation of the guided surface waveguide probe 400. For example, the ground current can provide an indication of changes in the loading of the guided surface waveguide probe 400 and/or the coupling of the electric field into the guided surface wave mode on the surface of the lossy conducting medium 403. Real power delivery may be determined by monitoring of the AC source 912 (or excitation source 412 of FIG. 4). In some implementations, the guided surface waveguide probe 400 may be adjusted to maximize coupling into the guided surface waveguide mode based at least in part upon the current indication. By adjusting the phase delay supplied to the charge terminal $T_1$ and/or compensation terminal $T_2$, the wave tilt at the Hankel crossover distance can be maintained for illumination at the complex Brewster angle for guided surface wave transmissions in the lossy conducting medium 403 (e.g., the earth). This can be accomplished by adjusting the tap position on the coil 909. However, the ground current can also be affected by receiver loading. If the ground current is above the expected current level, then this may indicate that unaccounted for loading of the guided surface waveguide probe 400 is taking place.

The excitation source 412 (or AC source 912) can also be monitored to ensure that overloading does not occur. As real load on the guided surface waveguide probe 400 increases, the output voltage of the excitation source 412, or the voltage supplied to the charge terminal $T_1$ from the coil, can be increased to increase field strength levels, thereby avoiding additional load currents. In some cases, the receivers themselves can be used as sensors monitoring the condition of the guided surface waveguide mode. For example, the receivers can monitor field strength and/or load demand at the receiver. The receivers can be configured to communicate information about current operational conditions to the probe control system 418. The information may be communicated to the probe control system 418 through a network such as, but not limited to, a LAN, WLAN, cellular network, or other appropriate communication network. Based upon the information, the probe control system 418 can then adjust the guided surface waveguide probe 400 for continued operation. For example, the phase delay ($\Phi_U$, $\Phi_L$) applied to the charge terminal $T_1$ and/or compensation terminal $T_2$, respectively, can be adjusted to improve and/or maximize the electrical launching efficiency of the guided surface waveguide probe 400, to supply the load demands of the receivers. In some cases, the probe control system 418 may adjust the guided surface waveguide probe 400 to reduce loading on the excitation source 412 and/or guided surface waveguide probe 400. For example, the voltage supplied to the charge terminal $T_1$ may be reduced to lower field strength and prevent coupling to a portion of the most distant load devices.

The guided surface waveguide probe 400 can be adjusted by the probe control system 418 using, e.g., one or more tap controllers 439. In FIG. 23A, the connection from the coil 909 to the upper charge terminal $T_1$ is controlled by a tap controller 439. In response to a change in the monitored conditions (e.g., a change in conductivity, permittivity, and/or electric field strength), the probe control system can communicate a control signal to the tap controller 439 to initiate a change in the tap position. The tap controller 439 can be configured to vary the tap position continuously along the coil 909 or incrementally based upon predefined tap connections. The control signal can include a specified tap position or indicate a change by a defined number of tap connections. By adjusting the tap position, the phase delay of the charge terminal $T_1$ can be adjusted to improve the launching efficiency of the guided surface waveguide mode.

Figure 23B:
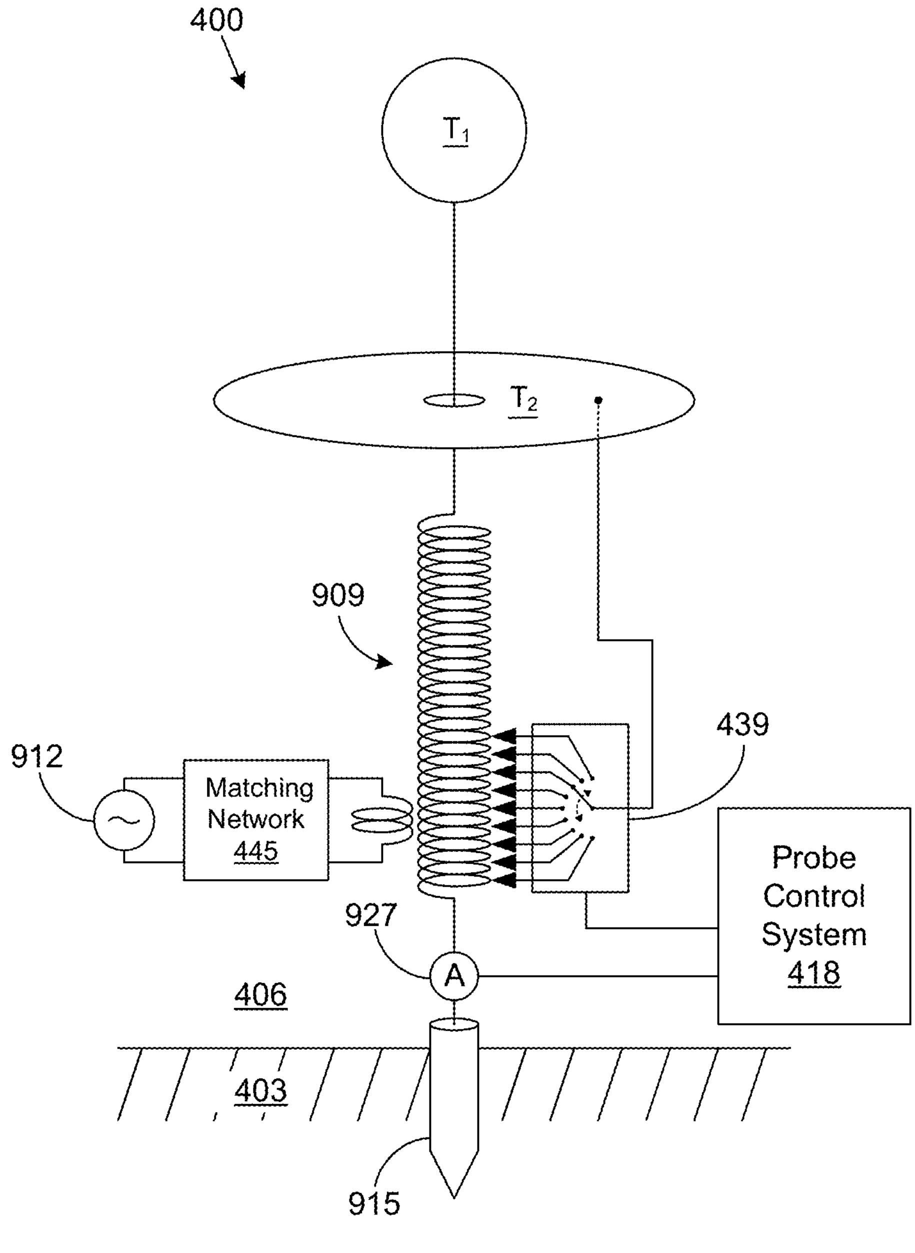
Figure 23C:
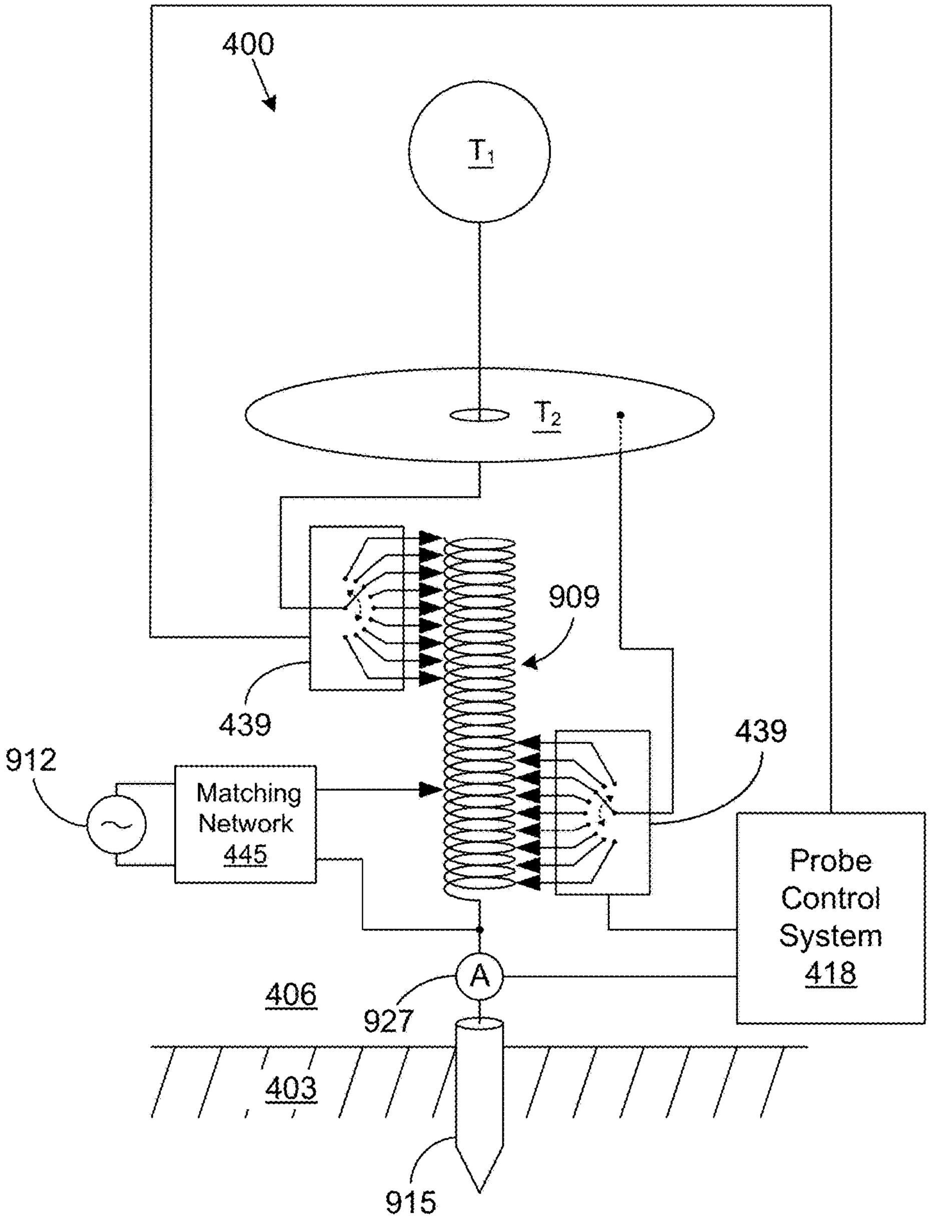

While FIG. 23A illustrates a tap controller 439 coupled between the coil 909 and the charge terminal $T_1$, in other embodiments the connection 442 from the coil 909 to the lower compensation terminal $T_2$ can also include a tap controller 439. FIG. 23B shows another embodiment of the guided surface waveguide probe 400 with a tap controller 439 for adjusting the phase delay of the compensation terminal $T_2$. FIG. 23C shows an embodiment of the guided surface waveguide probe 400 where the phase delay of both terminal $T_1$ and $T_2$ can be controlled using tap controllers 439. The tap controllers 439 may be controlled independently or concurrently by the probe control system 418. In both embodiments, an impedance matching network 445 is included for coupling the AC source 912 to the coil 909. In some implementations, the AC source 912 may be coupled to the coil 909 through a tap controller 439, which may be controlled by the probe control system 418 to maintain a matched condition for maximum power transfer from the AC source.

Referring back to FIG. 23A, the guided surface waveguide probe 400 can also be adjusted by the probe control system 418 using, e.g., a charge terminal positioning system 448 and/or a compensation terminal positioning system 451. By adjusting the height of the charge terminal $T_1$ and/or the compensation terminal $T_2$, and thus the distance between the two, it is possible to adjust the coupling into the guided surface waveguide mode. The terminal positioning systems 448 and 451 can be configured to change the height of the terminals $T_1$ and $T_2$ by linearly raising or lowering the terminal along the z-axis normal to the lossy conducting medium 403. For example, linear motors may be used to translate the charge and compensation terminals $T_1$ and $T_2$ upward or downward using insulated shafts coupled to the terminals. Other embodiments can include insulated gearing and/or guy wires and pulleys, screw gears, or other appropriate mechanism that can control the positioning of the charge and compensation terminals $T_1$ and $T_2$. Insulation of the terminal positioning systems 448 and 451 prevents discharge of the charge that is present on the charge and compensation terminals $T_1$ and $T_2$. For instance, an insulating structure can support the charge terminal $T_1$ above the compensation terminal $T_2$. For example, an RF insulating fiberglass mast can be used to support the charge and compensation terminals $T_1$ and $T_2$. The charge and compensation terminals $T_1$ and $T_2$ can be individually positioned using the charge terminal positioning system 448 and/or compensation terminal positioning system 451 to improve and/or maximize the electrical launching efficiency of the guided surface waveguide probe 400.

As has been discussed, the probe control system 418 of the adaptive control system 430 can monitor the operating conditions of the guided surface waveguide probe 400 by communicating with one or more remotely located monitoring devices such as, but not limited to, a ground parameter meter 433 and/or a field meter 436. The probe control system 418 can also monitor other conditions by accessing information from, e.g., the ground current ammeter 927 (FIGS. 23B and 23C) and/or the AC source 912 (or excitation source 412). Based upon the monitored information, the probe control system 418 can determine if adjustment of the guided surface waveguide probe 400 is needed to improve and/or maximize the launching efficiency. In response to a change in one or more of the monitored conditions, the probe control system 418 can initiate an adjustment of one or more of the phase delay ($\Phi_U$, $\Phi_L$) applied to the charge terminal $T_1$ and/or compensation terminal $T_2$, respectively, and/or the physical height ($h_p$, $h_d$) of the charge terminal $T_1$ and/or compensation terminal $T_2$, respectively. In some implantations, the probe control system 418 can evaluate the monitored conditions to identify the source of the change. If the monitored condition(s) was caused by a change in receiver load, then adjustment of the guided surface waveguide probe 400 may be avoided. If the monitored condition(s) affect the launching efficiency of the guided surface waveguide probe 400, then the probe control system 418 can initiate adjustments of the guided surface waveguide probe 400 to improve and/or maximize the launching efficiency.

In some embodiments, the size of the charge terminal $T_1$ may also be adjusted to control the coupling into the guided surface waveguide mode. For example, the self-capacitance of the charge terminal $T_1$ can be varied by changing the size of the terminal. The charge distribution can also be improved by increasing the size of the charge terminal $T_1$, which can reduce the chance of an electrical discharge from the charge terminal $T_1$. Control of the charge terminal $T_1$ size can be provided by the probe control system 418 through the charge terminal positioning system 448 or through a separate control system.

Figure 24A:
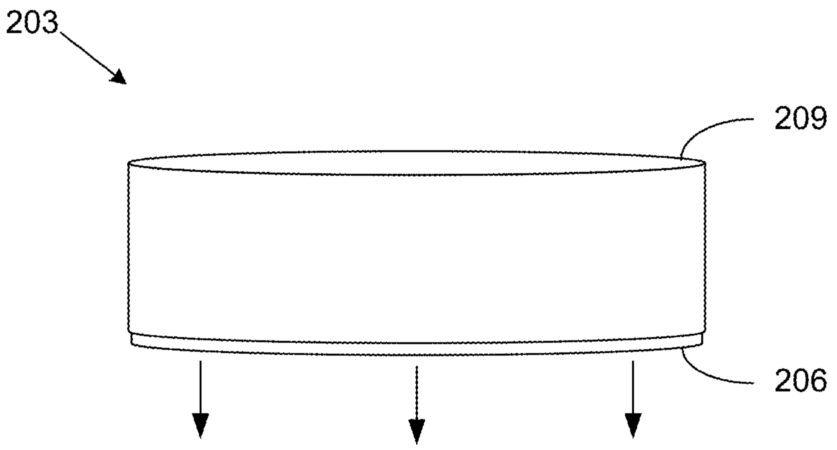
FIGS. 24A and 24B are drawings of an example of a variable terminal for use as a charging terminal according to an embodiment of the present disclosure.
Figure 24B:
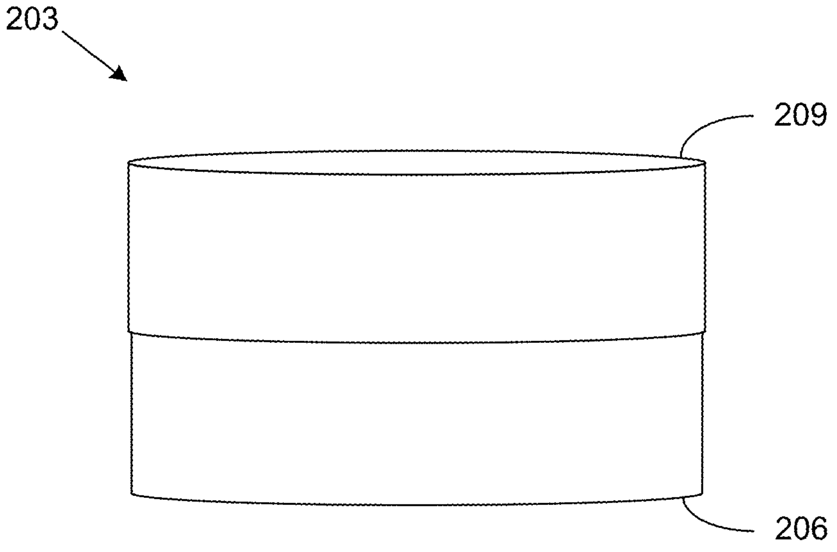

FIGS. 24A and 24B illustrate an example of a variable terminal 203 that can be used as a charge terminal $T_1$ of the guided surface waveguide probe 400. For example, the variable terminal 203 can include an inner cylindrical section 206 nested inside of an outer cylindrical section 209. The inner and outer cylindrical sections 206 and 209 can include plates across the bottom and top, respectively. In FIG. 24A, the cylindrically shaped variable terminal 203 is shown in a contracted condition having a first size, which can be associated with a first effective spherical diameter. To change the size of the terminal, and thus the effective spherical diameter, one or both sections of the variable terminal 203 can be extended to increase the surface area as shown in FIG. 24B. This may be accomplished using a driving mechanism such as an electric motor or hydraulic cylinder that is electrically isolated to prevent discharge of the charge on the terminal.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims. In addition, all optional and preferred features and modifications of the described embodiments and dependent claims are usable in all aspects of the disclosure taught herein. Furthermore, the individual features of the dependent claims, as well as all optional and preferred features and modifications of the described embodiments are combinable and interchangeable with one another.

Therefore, the following is claimed:

1. A guided surface waveguide probe, comprising:

a charge terminal elevated over a lossy conducting medium; and a coupling circuit configured to couple an excitation source to the charge terminal, the coupling circuit configured to provide a voltage to the charge terminal that establishes an electric field having a wave tilt (W) that intersects the lossy conducting medium at a tangent of a complex Brewster angle ($\psi_{i,B}$) at or beyond a Hankel crossover distance ($R_x$) from the guided surface waveguide probe.

2. The guided surface waveguide probe of claim 1, wherein the coupling circuit comprises a coil coupled between the excitation source and the charge terminal.

3. The guided surface waveguide probe of claim 2, wherein the coil is a helical coil.

4. The guided surface waveguide probe of claim 2, wherein the excitation source is coupled to the coil via a tap connection or is magnetically coupled to the coil.

5. The guided surface waveguide probe of claim 2, wherein the charge terminal is coupled to the coil via a tap connection.

6. The guided surface waveguide probe of claim 2, wherein a probe control system is configured to adjust the coupling circuit based at least in part upon characteristics of the lossy conducting medium.

7. The guided surface waveguide probe of claim 1, wherein the charge terminal is positioned at or above a physical height ($h_p$) corresponding to a magnitude of an effective height of the guided surface waveguide probe, where the effective height is given by $h_{eff}=R_x \tan \psi_{i,B}=h_p e^{j\Phi}$, with $\psi_{i,B}=(\pi/2)-\theta_{i,B}$ and $\Phi$ is a phase of the effective height.

8. The guided surface waveguide probe of claim 7, wherein the phase $\Phi$ is approximately equal to an angle $\Psi$ of the wave tilt of illumination that corresponds to the complex Brewster angle.

9. The guided surface waveguide probe of claim 1, wherein a height of the charge terminal is greater than a physical height ($h_p$) corresponding to a magnitude of an effective height of the guided surface waveguide probe, where the effective height is given by $h_{eff}=R_x \tan \psi_{i,B}=h_p e^{j\Phi}$, with $\psi_{i,B}=(\pi/2)-\theta_{i,B}$ and $\Phi$ is a phase of the effective height.

10. The guided surface waveguide probe of claim 9, further comprising a compensation terminal positioned below the charge terminal, the compensation terminal coupled to the coupling circuit.

11. The guided surface waveguide probe of claim 10, wherein the compensation terminal is positioned below the charge terminal at a distance equal to the physical height ($h_p$).

12. The guided surface waveguide probe of claim 11, wherein $\Phi$ is a complex phase difference between the compensation terminal and the charge terminal.

13. The guided surface waveguide probe of claim 10, wherein a probe control system is configured to adjust a position of the compensation terminal in response to a change in characteristics of the lossy conducting medium.

14. The guided surface waveguide probe of claim 1, wherein the lossy conducting medium is a terrestrial medium.

15. A method, comprising:

positioning a charge terminal at a defined height over a lossy conducting medium; and exciting the charge terminal with an excitation voltage having a phase delay, where the excitation voltage establishes an electric field having a wave tilt (W) that corresponds to a wave illuminating the lossy conducting medium at a complex Brewster angle ($\psi_{i,B}$) at or beyond a Hankel crossover distance ($R_x$) from the charge terminal.

16. The method of claim 15, wherein the charge terminal has an effective spherical diameter, and the charge terminal positioned at the defined height is at least four times the effective spherical diameter.

17. The method of claim 15, wherein the defined distance is equal to or greater than a physical height ($h_p$) corresponding to a magnitude of an effective height of the charge terminal, where the effective height is given by $h_{eff}=R_x \tan \psi_{i,B}=h_p e^{j\Phi}$, with $\psi_{i,B}=(\pi/2)-\theta_{i,B}$ and $\Phi$ is a phase of the effective height.

18. The method of claim 15, further comprising:

positioning a compensation terminal below the charge terminal and over the lossy conducting medium, the compensation terminal separated from the charge terminal by a defined distance; and exciting the charge terminal and the compensation terminal with excitation voltages having a complex phase difference, where the excitation voltages establish the electric field having the wave tilt (W) at the complex Brewster angle ($\psi_{i,B}$) at or beyond the Hankel crossover distance ($R_x$) from the charge terminal and the compensation terminal.

19. The method of claim 18, wherein the charge terminal and the compensation terminal are coupled to an excitation source via a helical coil.

20. The method of claim 19, further comprising adjusting one or both of the excitation voltages exciting the charge terminal and the compensation terminal to establish the electric field with the wave tilt intersecting the lossy conducting medium at the complex Brewster angle ($\psi_{i,B}$) at the Hankel crossover distance ($R_x$).

* * * * *